US012231735B2

(12) United States Patent
Shim et al.

(10) Patent No.: US 12,231,735 B2
(45) Date of Patent: *Feb. 18, 2025

(54) IMAGE DISPLAY APPARATUS

(71) Applicant: LG ELECTRONICS INC., Seoul (KR)

(72) Inventors: Seokjin Shim, Seoul (KR); Kiyun Kim, Seoul (KR); Kaeun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 41 days.

This patent is subject to a terminal disclaimer.

(21) Appl. No.: 18/102,475

(22) Filed: Jan. 27, 2023

(65) Prior Publication Data

US 2023/0247261 A1 Aug. 3, 2023

(30) Foreign Application Priority Data

Jan. 28, 2022 (KR) .......................... 10-2022-0013580
Oct. 25, 2022 (KR) .......................... 10-2022-0138149

(51) Int. Cl.
*H04N 21/4788* (2011.01)
*H04N 5/265* (2006.01)
(Continued)

(52) U.S. Cl.
CPC ......... *H04N 21/4788* (2013.01); *H04N 5/265* (2013.01); *H04N 21/43074* (2020.08);
(Continued)

(58) Field of Classification Search
CPC ......... H04N 21/43074; H04N 21/4312; H04N 21/4668; H04N 21/4722; H04N 21/6581
See application file for complete search history.

(56) References Cited

U.S. PATENT DOCUMENTS 8,700,714 B1   4/2014  Pan et al.
10,664,138 B2* 5/2020  Carney ............. H04N 21/6581
(Continued)

FOREIGN PATENT DOCUMENTS

KR   10-1667603 B1   10/2016

OTHER PUBLICATIONS

U.S. Appl. No. 18/102,421, filed Jan. 27, 2023, Not Yet Assigned.
(Continued)

*Primary Examiner* — Nnenna N Ekpo
(74) *Attorney, Agent, or Firm* — Birch, Stewart, Kolasch & Birch, LLP

(57) ABSTRACT

An image display apparatus can include a display configured to display an image; an image receiver configured to receive a broadcast signal; a signal processing device configured to output an image signal to the display based on the broadcast signal; and an interface configured to exchange data with a mobile terminal or a server. Also, the signal processing device is further configured to receive a broadcast image corresponding to a selected thumbnail from the image receiver, receive chatting conversation content corresponding to the broadcast image from the server through the interface, and overlay the chatting conversation content on the broadcast image, and in response to receiving input conversation content based on a signal from a remote controller or the mobile terminal, display the input conversation content.

19 Claims, 44 Drawing Sheets

(51) Int. Cl.
*H04N 21/43* (2011.01)
*H04N 21/431* (2011.01)
*H04N 21/466* (2011.01)
*H04N 21/4722* (2011.01)
*H04N 21/658* (2011.01)

(52) U.S. Cl.
CPC ..... *H04N 21/4312* (2013.01); *H04N 21/4668* (2013.01); *H04N 21/4722* (2013.01); *H04N 21/6581* (2013.01)

(56) References Cited

U.S. PATENT DOCUMENTS

| | | |
|---|---|---|
| 2005/0262542 A1* | 11/2005 | DeWeese ............ H04N 21/454 348/E7.071 |
| 2011/0202853 A1 | 8/2011 | Mujkic |
| 2012/0131441 A1 | 5/2012 | Jitkoff et al. |
| 2012/0144416 A1 | 6/2012 | Wetzer et al. |
| 2012/0284752 A1 | 11/2012 | Jung |
| 2013/0173710 A1 | 7/2013 | Seo |
| 2013/0218987 A1 | 8/2013 | Chudge et al. |
| 2014/0019958 A1 | 1/2014 | Sherman |
| 2014/0068692 A1 | 3/2014 | Archibong et al. |
| 2014/0082673 A1 | 3/2014 | Nishizawa et al. |
| 2014/0195675 A1 | 7/2014 | Silver |
| 2015/0271113 A1 | 9/2015 | Ahn |

OTHER PUBLICATIONS

U.S. Appl. No. 18/102,452, filed Jan. 27, 2023, Not Yet Assigned.

* cited by examiner

IMAGE DISPLAY APPARATUS

CROSS-REFERENCE TO RELATED APPLICATIONS

This application claims priority to Korean Patent Application No. 10-2022-0013580 filed in the Republic of Korea on Jan. 28, 2022 and Korean Patent Application No. 10-2022-0138149 filed in the Republic of Korea on Oct. 25, 2022, where the entirety of all these applications is hereby incorporated by reference into the present application.

BACKGROUND

1. Field

The present disclosure relates to an image display apparatus, and more specifically, an image display apparatus that accesses a server providing a chatting conversation content and can input or display a conversation content while displaying a broadcast image or broadcast program corresponding to a selected channel and the chatting conversation content together.

2. Description of the Related Art

The image display apparatus is a device that displays an image.

Various images can be displayed through the image display apparatus, and in particular, a broadcast image based on a broadcast signal can be displayed.

Korean Patent No. 10-1667603 (hereinafter, referred to as a "prior document") discloses a chatting providing method, system, and chatting server for each broadcast channel.

However, according to the prior document, when a chatting window is displayed on the TV, the TV does not connect to the URL, but uses a mobile terminal of a user to connect to the URL and perform chatting. Accordingly, there is a disadvantage that chatting input cannot be directly performed through the TV.

In addition, according to the prior document, there is a disadvantage in that it is difficult to select a broadcast channel from among various broadcast channels and to display a chatting window accordingly. Also, there are problems and inconveniences in the related art when trying to select or carry out a group chat conversation while viewing broadcast channels and coordinating actions between a mobile terminal and an image display apparatus.

SUMMARY OF THE DISCLOSURE

An object of the present disclosure is to provide an image display apparatus that accesses a server providing a chatting conversation content and can input or display a conversation content while displaying a broadcast image corresponding to a selected channel and the chatting conversation content together.

Another object of the present disclosure is to provide an image display apparatus capable of displaying the same chatting conversation content by accessing with the same login account as a mobile terminal.

A further object of the present disclosure is to provide an image display apparatus capable of conveniently selecting a broadcast channel and chatting conversation content through a plurality of broadcast channel thumbnails.

According to an aspect of the present disclosure, there is provided an image display apparatus including: a display; an image receiver configured to receive a broadcast signal from an outside; a signal processing device configured to output an image signal to the display based on the received broadcast signal; and an interface configured to exchange data with a mobile terminal or server, in which the signal processing is configured to device receive a broadcast image corresponding to the selected thumbnail from the image receiver, access the server to receive a chatting conversation content corresponding to the broadcast image from the server through the interface, synchronize the broadcast image and the chatting conversation content, and overlay the chatting conversation content on the broadcast image, and, in response to input of a conversation content based on a signal from a remote controller, display the input conversation content.

In response to execution of a broadcast chatting application, the signal processing device can synchronize the chatting conversation content from the server received through the interface with the broadcast image received from the image receiver, and can be configured to overlay the chatting conversation content on the broadcast image.

In response to execution of a broadcast chatting application based on a first login account and execution of the broadcast chatting application in the mobile terminal based on the first login account, the signal processing device can be configured to synchronize with the mobile terminal.

In response to input of the first conversation content based on the signal from the remote controller, the signal processing device can be configured to display the first conversation content and display the first conversation content on the mobile terminal.

When a second conversation content is input to the mobile terminal, the signal processing device can be configured to the second conversation content is displayed.

In response to selection of a first channel in the mobile terminal, the signal processing device can be configured to receive information on the first channel from the server and display a broadcast image of the first channel, based on the received first channel information.

In response to display of the broadcast image of the first channel, the signal processing device can be configured to display a chatting conversation content of the first channel.

In response to selection of a second channel in the mobile terminal, the signal processing device can be configured to receive information on the second channel from the server, and display a broadcast image of the second channel, based on the received second channel information.

In response to display of the broadcast image of the second channel, the signal processing device can be configured to display a chatting conversation content of the second channel.

In response to execution of a broadcast chatting application, the signal processing device can be configured to display a broadcast image and the plurality of broadcast channel thumbnails together, and in response to selection of a chatting window object in a thumbnail of a second channel from among the plurality of broadcast channel thumbnails while displaying a broadcast image of a first channel and a chatting conversation content of the first channel, the signal processing device can be configured to display the chatting conversation content of the second channel on the broadcast image of the first channel.

The signal processing device can be configured to display a broadcast image and the plurality of broadcast channel thumbnails together, and display a chatting conversation content corresponding to a first thumbnail on a preview screen in response to focus of the first thumbnail among the plurality of broadcast channel thumbnails.

The signal processing device can be configured to display a broadcast image and the plurality of broadcast channel thumbnails together, and in response to focus of a first thumbnail of the plurality of broadcast channel thumbnails, the signal processing device can be configured to display the most recommended conversation content or the most preferred conversation content among chatting conversation contents corresponding to the first thumbnail.

In response to input of the conversation content based on the signal from the remote controller, the signal processing device can be configured to transmit the conversation content input to the server and highlight and display the input conversation content in a chatting window.

In response to selection of a preference item or recommendation item for a first chatting conversation content from among the plurality of displayed chatting conversation contents based on the signal from the remote controller, the signal processing device can be configured to transmit preference or recommendation information for the first chatting conversation content to the server and display an increased number of preferences or recommendations of the first chatting conversation content.

In response to selection of a preference item or recommendation item for a first chatting conversation content from among a plurality of chatting conversation contents displayed on the mobile terminal, the signal processing device can be configured to display an increased number of preferences or recommendations of the first chatting conversation content.

In response to selection of a product item or a music item from the chatting conversation content, the signal processing device can be configured to display information on the product item or the music item in the mobile terminal.

The signal processing device can synchronize timing information of the chatting conversation content from the server received through the interface with timing information of the broadcast image received from the image receiver.

The plurality of broadcast channel thumbnails can include a thumbnail of a broadcast channel received from a tuner and a thumbnail of a broadcast channel received from an external input terminal.

According to one embodiment of the present disclosure, there is provided the image display apparatus including: the display; the image receiver configured to receive the broadcast signal from the outside; the signal processing device configured to output the image signal to the display based on the received broadcast signal; and the interface configured to exchange data with the mobile terminal or server, in which the signal processing device is configured to receive the broadcast image corresponding to the selected thumbnail from the image receiver, access the server to receive the chatting conversation content corresponding to the broadcast image from the server through the interface, synchronize the broadcast image and the chatting conversation content, and overlay the chatting conversation content on the broadcast image, and, in response to input of a conversation content based on the signal from the remote controller, display the input conversation content. Accordingly, the signal processing device accesses the server providing chatting conversation content, and the signal processing device can input or display the conversation content while displaying the broadcast image corresponding to the selected channel and the chatting conversation content together.

In response to execution of the broadcast chatting application, the signal processing device can synchronize the chatting conversation content from the server received through the interface with the broadcast image received from the image receiver, and can be configured to overlay the chatting conversation content on the broadcast image. Accordingly, it is possible to input or display the conversation content while displaying the broadcast image and the catting conversion content together.

In response to execution of the broadcast chatting application based on the first login account and execution of the broadcast chatting application in the mobile terminal based on the first login account, the signal processing device can be configured to synchronize with the mobile terminal. Accordingly, the chatting conversation content of the same broadcast image can be provided to the image display apparatus and the mobile terminal.

In response to input of the first conversation content based on the signal from the remote controller, the signal processing device can be configured to display the first conversation content and display the first conversation content on the mobile terminal. Accordingly, the same first conversation content can be provided to the image display apparatus and the mobile terminal.

In response to input of the second conversation content to the mobile terminal, the signal processing device can be configured to display the second conversation content. Accordingly, the same second conversation content can be provided to the image display apparatus and the mobile terminal.

In response to selection of the first channel in the mobile terminal, the signal processing device can be configured to receive information on the first channel from the server and display a broadcast image of the first channel, based on the received first channel information. Accordingly, the broadcast image of the first channel selected in the mobile terminal can be provided.

In response to display of the broadcast image of the first channel, the signal processing device can be configured to display a chatting conversation content of the first channel. Accordingly, the broadcast image of the first channel and the chatting conversation content can be provided together.

In response to selection of the second channel in the mobile terminal, the signal processing device can be configured to receive information on the second channel from the server, and display a broadcast image of the second channel, based on the received second channel information. Accordingly, the broadcast image of the second channel and the chatting conversation content can be provided together.

In response to display of the broadcast image of the second channel, the signal processing device can be configured to display the chatting conversation content of the second channel. Accordingly, the broadcast image of the second channel and the chatting conversation content can be provided together.

In response to execution of the broadcast chatting application, the signal processing device can be configured to display a broadcast image and the plurality of broadcast channel thumbnails together, and, in response to selection of the chatting window object in the thumbnail of the second channel from among the plurality of broadcast channel thumbnails while displaying the broadcast image of the first channel and the chatting conversation content of the first channel, the signal processing device can be configured to display the chatting conversation content of the second channel on the broadcast image of the first channel. Accordingly, it is possible to conveniently provide the chatting conversation content of another channel.

The signal processing device can be configured to display the broadcast image and the plurality of broadcast channel thumbnails together and display a chatting conversation content corresponding to a first thumbnail on a preview screen in response to focus of the first thumbnail among the plurality of broadcast channel thumbnails. Accordingly, the chatting conversation contents of other channels can be easily provided as a preview.

The signal processing device can be configured to display the broadcast image and the plurality of broadcast channel thumbnails together, and, in response to focus of the first thumbnail of the plurality of broadcast channel thumbnails, the signal processing device can be configured to display the most recommended conversation content or the most preferred conversation content among chatting conversation contents corresponding to the first thumbnail.

In response to input of the conversation content based on the signal from the remote controller, the signal processing device can be configured to transmit the conversation content input to the server, and highlight and display the input conversation content in the chatting window. Accordingly, it is possible to input or display the conversation content while displaying the broadcast image and the chatting conversation content together.

In response to selection of the preference item or recommendation item for the first chatting conversation content from among the plurality of displayed chatting conversation contents based on the signal from the remote controller, the signal processing device can be configured to transmit the preference or recommendation information for the first chatting conversation content to the server and display the increased number of preferences or recommendations of the first chatting conversation content. Accordingly, it is possible to provide the increased number of preferences or recommendations of the first chatting conversation content.

In response to selection of the preference item or recommendation item for the first chatting conversation content from among the plurality of chatting conversation contents displayed on the mobile terminal, the signal processing device can be configured to display an increased number of preferences or recommendations of the first chatting conversation content. Accordingly, it is possible to provide the increased number of preferences or recommendations of the first chatting conversation content.

In response to selection of the product item or the music item from the chatting conversation content, the signal processing device can be configured to display information on the product item or the music item in the mobile terminal. Accordingly, it is possible to obtain information on the product item or the music item using the mobile terminal.

The signal processing device can synchronize timing information of the chatting conversation content from the server received through the interface with timing information of the broadcast image received from the image receiver. Accordingly, it is possible to synchronize the broadcast image and the chatting conversation content.

The plurality of broadcast channel thumbnails can include the thumbnail of the broadcast channel received from the tuner and the thumbnail of the broadcast channel received from the external input terminal. Accordingly, it is possible to provide thumbnails of various broadcast channels.

BRIEF DESCRIPTION OF THE DRAWINGS

The above and other aspects, features, and advantages of the present disclosure will become apparent from the detailed description of the following aspects in conjunction with the accompanying drawings, described below.

DETAILED DESCRIPTION OF THE EMBODIMENTS

Hereinafter, the present disclosure will be described in detail with reference to the accompanying drawings.

As used herein, the suffixes "module" and "unit" are added to simply facilitate preparation of this specification and are not intended to suggest special meanings or functions. Therefore, the suffixes "module" and "unit" can be used interchangeably.

Figure 1:
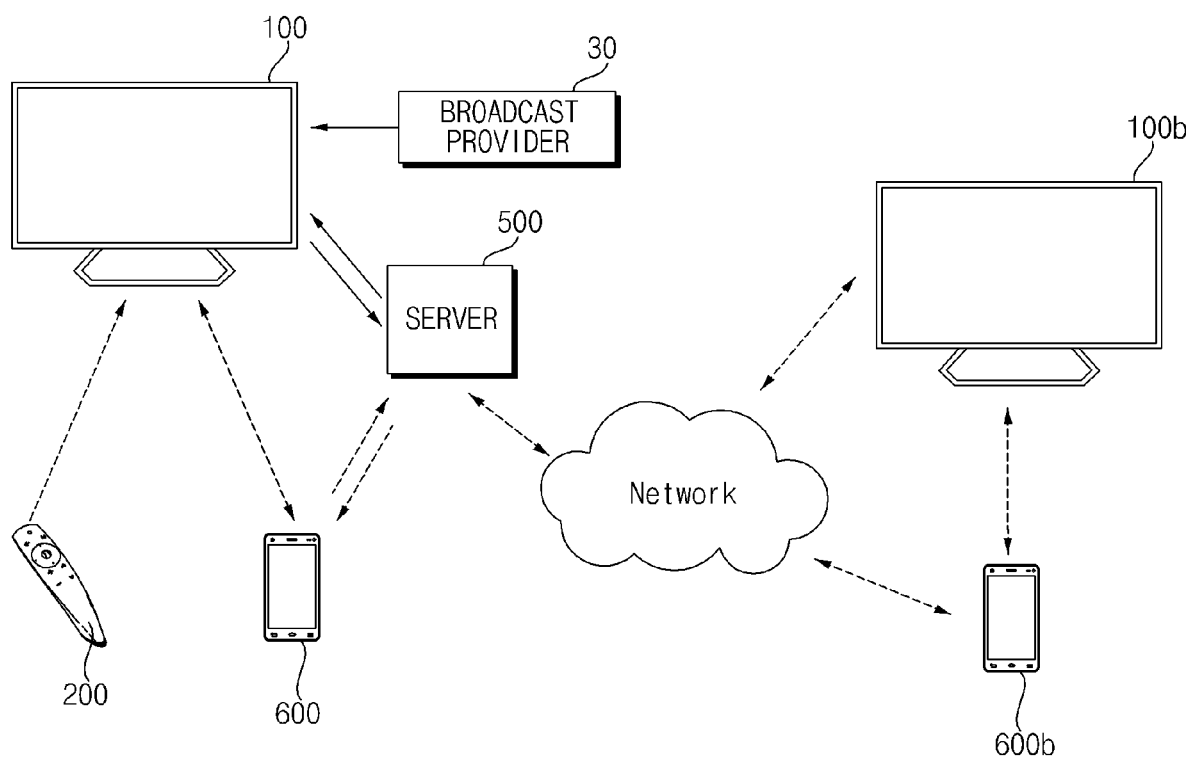
FIG. 1 is a diagram illustrating an image display system according to an embodiment of the present disclosure.

FIG. 1 is a diagram illustrating an image display system according to one embodiment of the present disclosure.

Referring to the drawing, an image display system 10 according one embodiment of the present disclosure can include an image display apparatus 100, a mobile terminal 600, a server 500, and a broadcast provider 30.

In addition, the image display system 10 can further include another image display apparatus 100*b* and another mobile terminal 600*b* that can access a network.

The image display apparatus 100 according to one embodiment of the present disclosure receives a broadcast signal from the broadcast provider 30, receives a chatting conversation content from the server 500, synchronizes a broadcast image corresponding to the broadcast signal and the chatting conversation content, displays the chatting conversation content for overlaying the chanting conversation convent on the broadcast image, and displays the conversation content and transmits the conversation content to the server 500 when the conversation content is input based on the signal from the remote controller 200.

Accordingly, the image display apparatus accesses the server 500, and can input or display the conversation content while displaying the broadcast image corresponding to the selected channel and the chatting conversation content together. For example, the broadcast image can be a broadcast program, a TV show, a news program, a movie, a streaming application and the like.

The image display apparatus 100 according to one embodiment of the present disclosure displays a plurality of broadcast channel thumbnails to display the chatting conversation content, and when any one of the plurality of broadcast channel thumbnails is selected, the display device 100 receives the broadcast image corresponding to the selected channel from the broadcast provider 30, accesses the server 500, and receives the chatting conversation content corresponding to the selected broadcast image from the server 500. Accordingly, it is possible to conveniently select the broadcast channel and chatting conversation content through the plurality of broadcast channel thumbnails.

The image display apparatus 100 according to one embodiment of the present disclosure accesses the server 500 based on first ID information and receives a first chatting conversation content corresponding to a first broadcast image selected from the server 500. Moreover, the image display apparatus 100 synchronizes the first broadcast image with the first chatting conversation content, overlays and displays the first chatting conversation content on the first broadcast image, and displays a first conversation content and transmits the first conversation content to the server 500 in response to input of the first conversation content based on the signal from the remote controller 200.

The mobile terminal 600 according to one embodiment of the present disclosure accesses the server 500 based on second ID information different from the first ID information, receives and displays the first chatting conversation content corresponding to a first broadcast image selected from the server 500, and displays a second conversation content and transmits the second conversation content to the server 500 when the second conversation content is input.

Another image display apparatus 100b according to one embodiment of the present disclosure accesses the server 500 based on third ID information and receives the first chatting conversation content corresponding to the first broadcast image selected from the server 500. Moreover, the image display apparatus 100b synchronizes the first broadcast image with the first chatting conversation content, overlays and displays the first chatting conversation content on the first broadcast image, and displays a third conversation content and transmits the third conversation content to the server 500 when the third conversation content is input based on the signal from the remote controller 200.

Meanwhile, another mobile terminal 600b according to one embodiment of the present disclosure accesses the server 500 based on fourth ID information different from the third ID information, receives and displays the first chatting conversation content corresponding to the first broadcast image selected from the server 500, and displays a fourth conversation content and transmits the fourth conversation content to the server 500 when the fourth conversation content is input.

In this way, the chatting conversation content corresponding to the same broadcast image can be shared by accessing the server 500 based on different ID information through each image display apparatus and mobile terminal according to one embodiment of the present disclosure.

In particular, each of the image display apparatuses 100 and 100b according to one embodiment of the present disclosure accesses the server 500 based on different ID information, and can share the same broadcast image and the chatting conversation content corresponding to the same broadcast image.

Meanwhile, the image display apparatus 100b different from the image display apparatus 100 of FIG. 1 can be a TV, a monitor, a tablet PC, or a vehicle display device.

Figure 2:
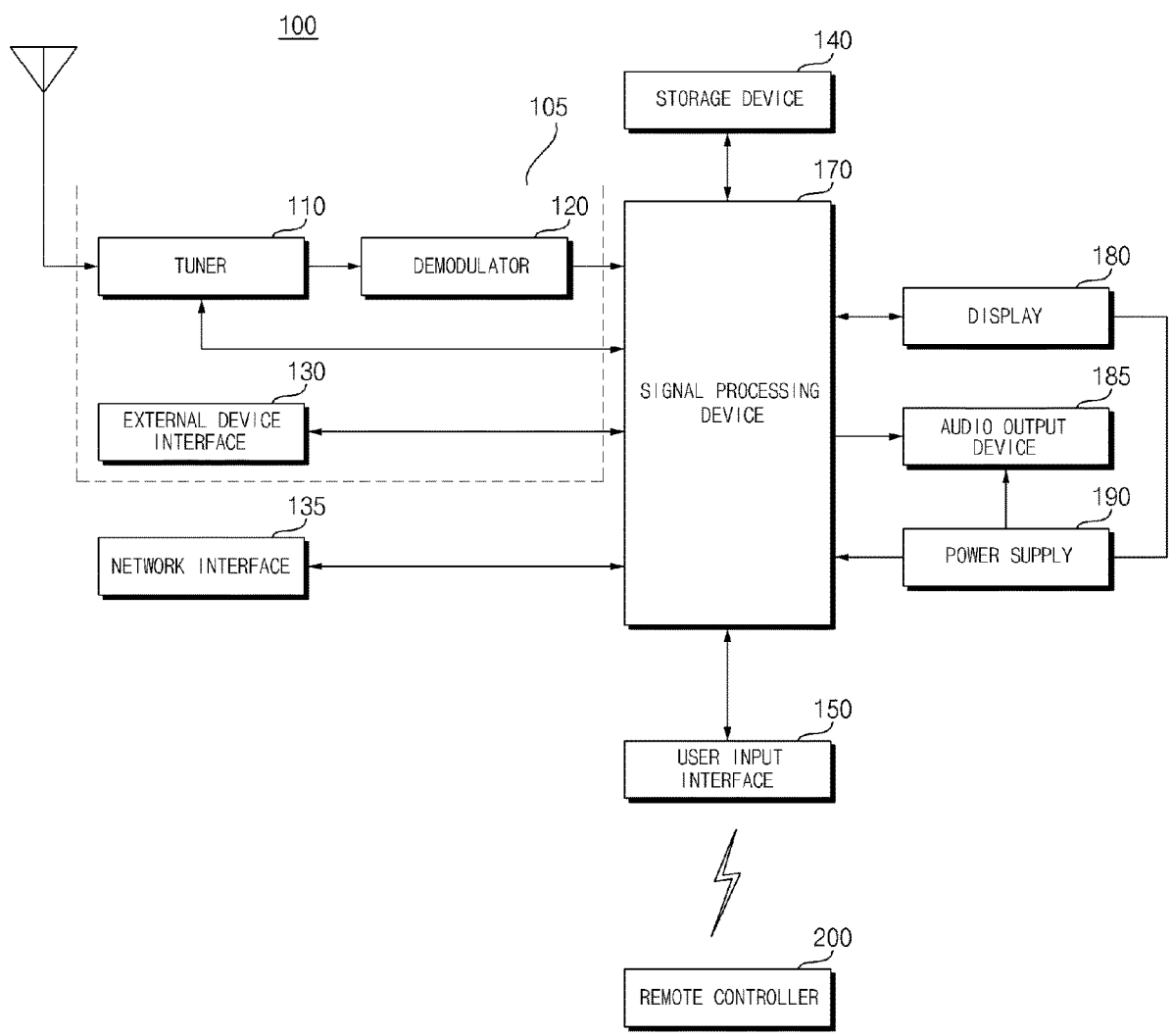
FIG. 2 is an internal block diagram illustrating an image display apparatus of FIG. 1 according to an embodiment of the present disclosure.

FIG. 2 is an internal block diagram illustrating the image display apparatus of FIG. 1.

Referring to the drawing, the image display apparatus 100 according to one embodiment of the present disclosure can include an image receiver 105, an external device interface 130, a network interface 135, a storage device 140, a user input interface 150, a sensor device, a signal processing device 170, a display 180, and an audio output device 185.

The image receiver 105 can receive an input image. For example, the image receiver 105 can receive a broadcast image, an HDMI image, or an external input image such as a streamed image.

The image receiver 105 can include a tuner 110, a demodulator 120, and an external device interface 130.

Unlike the drawing, the image receiver 105 can include the tuner 110, the demodulator 120, the external device interface 130, and a network interface 135.

The tuner 110 selects a channel selected by a user from among radio frequency (RF) broadcast signals received through an antenna or an RF broadcast signal corresponding to all pre-stored channels. In addition, the tuner 110 converts the selected RF broadcast signal into a middle-frequency signal, a baseband image, or a voice signal.

To receive broadcast signals of a plurality of channels, a plurality of tuners 110 can be provided. Alternatively, a single tuner to receive a plurality of channels simultaneously can be provided.

The demodulator 120 receives and demodulates a digital IF (DIF) signal converted by the tuner 110.

After performing demodulation and channel decoding, the demodulator 120 can output a stream signal (TS). Herein, the stream signal can be a signal obtained by multiplexing an image signal, voice signal or data signal.

The stream signal output from the demodulator 120 can be input to the signal processing device 170. After performing demultiplexing and image/voice signal processing, the signal processing device 170 outputs an image to the display 180 and voice to the audio output device 185.

The external device interface 130 can transmit or receive data to or from a connected external device, for example, a set-top box 50.

To this end, the external device interface 130 can include an audio/video (A/V) input/output device, a wireless transceiver, and the like.

The external device interface 130 can be connected to external devices such as a digital versatile disc (DVD) player, a BLU-RAY player, a gaming device, a camera, a camcorder, a computer (laptop), and a set-top box in a wired/wireless manner, and perform input/output operations with external devices.

The A/V input/output device in the external device interface 130 can receive the image and voice signal of the external device. Meanwhile, the wireless transceiver in the external device interface 130 can perform short-range wireless communication with other electronic devices.

The external device interface 130 can exchange data with a neighboring mobile terminal 600 via the wireless transceiver. In particular, in the mirroring mode, the external device interface 130 can receive device information, information about an executed application and an application image from the mobile terminal 600.

The network interface 135 provides an interface for connecting the image display apparatus to a wired/wireless network including the Internet. For example, the network interface 135 can receive content or data provided by the Internet or a content provider or network operator through a network.

The network interface 135 can include a wireless transceiver.

The storage device 140 can store programs for processing and control of signals in the signal processing device 170, and also store a signal-processed image, voice signal or data signal.

The storage device 140 can function to temporarily store an image signal, a voice signal, or a data signal input through the external device interface 130. In addition, the storage device 140 can store information about a predetermined broadcast channel through the channel memorization function such as a channel map.

While it is illustrated in FIG. 2 that the storage device 140 is provided separately from the signal processing device 170, embodiments of the present disclosure are not limited thereto. The storage device 140 can be included in the signal processing device 170.

The user input interface 150 can transmit a signal input by the user to the signal processing device 170 or transmit a signal from the signal processing device 170 to the user.

For example, the user input interface 150 can transmit/receive user input signals such as power on/off, channel selection, and screen setting to/from the remote controller 200, deliver user input signals input through local keys such as a power key, a channel key, a volume key, or a setting key, deliver user input signals input through a sensor device to sense user gestures to the signal processing device 170, or transmit a signal from the signal processing device 170 to the sensor device.

The signal processing device 170 can demultiplex streams input through the tuner 110, demodulator 120, network interface 135, or external device interface 130, or process demultiplexed signals. Thereby, the signal processing device 170 can generate an output signal for outputting an image or voice.

For example, the signal processing device 170 can receive a broadcast signal or HDMI signal received from the image receiver 105, perform signal processing based on the received broadcast signal or HDMI signal, and output the signal-processed image signal.

An image signal image-processed by the signal processing device 170 can be input to the display 180 and an image corresponding to the image signal can be displayed. In addition, the image signal which is image-processed by the signal processing device 170 can be input to an external output device through the external device interface 130.

A voice signal processed by the signal processing device 170 can be output to the audio output device 185 in the form of sound. In addition, the voice signal processed by the signal processing device 170 can be input to an external output device through the external device interface 130.

Also, the signal processing device 170 can include a demultiplexer, an image processor, and the like. That is, the signal processing device 170 can perform various signal processing, and thus can be implemented in the form of a System On Chip (SOC). This will be described later with reference to FIG. 3.

Additionally, the signal processing device 170 can control overall operation of the image display apparatus 100. For example, the signal processing device 170 can control the tuner 110 to tune to an RF broadcast corresponding to a channel selected by the user or a pre-stored channel.

The signal processing device 170 can control the image display apparatus 100 according to a user command input through the user input interface 150 or an internal program.

The signal processing device 170 can control the display 180 to display an image. Herein, the image displayed on the display 180 can be a still image, a moving image, a 2D image, or a 3D image.

The signal processing device 170 can be configured to display the predetermined object in an image displayed on the display 180. For example, the object can be at least one of an accessed web page (a newspaper, a magazine, or the like), electronic program guide (EPG), various menus, a widget, an icon, a still image, a moving image, and text.

The signal processing device 170 can recognize the location of the user based on an image captured by a capture device. For example, the signal processing device 170 can recognize a distance (a z-axis coordinate) between the user and the image display apparatus 100. Additionally, the signal processing device 170 can recognize an x-axis coordinate and a y-axis coordinate corresponding to the location of the user in the display 180.

The display 180 generates drive signals by converting an image signal, data signal, OSD signal, and control signal processed by the signal processing device 170 or an image signal, data signal, and control signal received from the external device interface 130.

The display 180 can be configured as a touch screen and used as an input device in addition to an output device.

The audio output device 185 receives a voice signal processed by the signal processing device 170 and outputs voice.

The capture device captures the user. The capture device can be implemented with one camera, but is not limited thereto, and can be implemented with a plurality of cameras. Image information captured by the capture device can be input to the signal processing device 170.

The signal processing device 170 can sense user gestures based on an image captured by the capture device, a sensed signal from the sensor device, or a combination thereof.

The signal processing device 170 can be implemented in the form of a System On Chip (SOC).

The power supply 190 supplies corresponding power throughout the image display apparatus 100. In particular, the power supply 190 can supply power to the signal processing device 170 implemented in the form of a System On Chip (SOC), the display 180 for displaying images, an audio output device 185 for outputting audio, or the like.

Specifically, the power supply 190 can include a converter to convert alternating current (AC) power into direct current (DC) power and a DC-DC converter to change the level of the DC power.

The remote controller 200 transmits user input to the user input interface 150. To this end, the remote controller 200 can employ BLUETOOTH, radio frequency (RF) communication, infrared (IR) communication, ultra-wideband (UWB), or ZIGBEE. In addition, the remote controller 200 can receive an image signal, a voice signal, or a data signal output from the user input interface 150, and display the signals on the remote controller 200 or voice-output.

The image display apparatus 100 can be a fixed or mobile digital broadcast receiver capable of receiving digital broadcast services.

The block diagram of the image display apparatus 100 illustrated in FIG. 2 is a block diagram for one embodiment of the present disclosure. Constituents of the block diagram can be integrated, added or omitted according to the specifications of the image display apparatus 100 which is implemented in reality. That is, two or more constituents can be combined into one constituent, or one constituent can be subdivided into two or more constituents, when necessary. In addition, the function performed in each block is simply illustrative, and it should be noted that specific operations or devices of the blocks do not limit the scope of the present disclosure.

Figure 3:
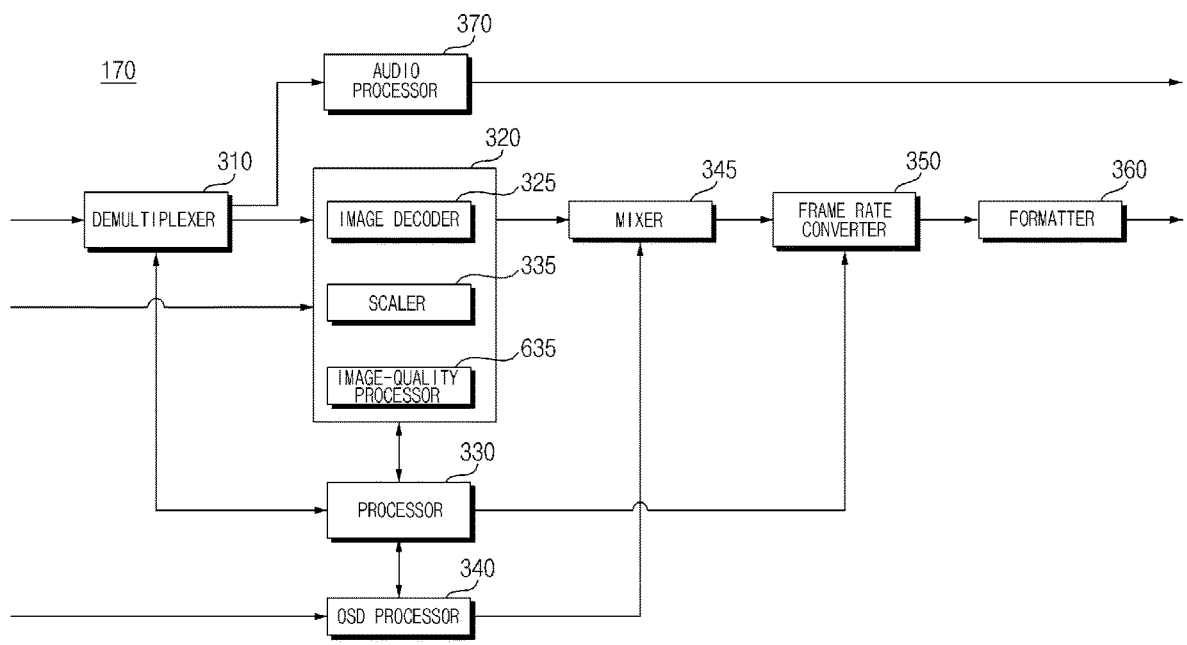
FIG. 3 is an internal block diagram illustrating a signal processing device of FIG. 2 according to an embodiment of the present disclosure.

FIG. 3 is an internal block diagram illustrating the signal processing device of FIG. 2.

Referring to the drawings, the signal processing device 170 according to one embodiment of the present disclosure can include a demultiplexer 310, an image processor 320, a processor 330, and an audio processor 370. In addition, the signal processing device 170 can further include a data processor.

The demultiplexer 310 demultiplexes an input stream. For example, when an MPEG-2 TS is input, the demultiplexer 310 can demultiplex the MPEG-2 TS to separate the MPEG-2 TS into an image signal, a voice signal and a data signal. Herein, the stream signal input to the demultiplexer 310 can be a stream signal output from the tuner 110, the demodulator 120 or the external device interface 130.

The image processor 320 can perform signal processing on an input image. For example, the image processor 320 can perform image processing of an image signal demultiplexed by the demultiplexer 310.

To this end, the image processor 320 includes an image decoder 325, a scaler 335, an image-quality processor 635, an image encoder, an OSD processor 340, a frame rate converter 350, and a formatter 360, and the like.

The image decoder 325 decodes the demultiplexed image signal, and the scaler 335 scales the resolution of the decoded image signal such that the image signal can be output through the display 180.

The image decoder 325 can include decoders of various standards. For example, the image decoder 325 can include an MPEG-2 decoder, an H.264 decoder, a 3D image decoder for color images and depth images, and a decoder for multi-viewpoint images.

The scaler 335 can scale an input image signal that has been image decoded by the image decoder 325 or the like.

For example, the scaler 335 can perform up-scaling when the size or resolution of the input image signal is small, and down-scaling when the size or resolution of the input image signal is large.

The image-quality processor 635 can perform image quality processing on an input image signal that has been image decoded in the image decoder 325 or the like.

For example, the image-quality processor 635 can perform noise removal processing of the input image signal, expand the resolution of gray levels of an input image signal, improve image resolution, performs high dynamic range (HDR) based signal processing, change the frame rate, or perform image quality processing corresponding to panel characteristics, particularly organic light emitting panels or the like.

The OSD processor 340 generates an OSD signal automatically or according to user input. For example, the OSD processor 340 can generate a signal for display of various kinds of information in the form of images or text on the screen of the display 180 based on a user input signal. The generated OSD signal can include various data including the user interface screen window of the image display apparatus 100, various menu screen windows, widgets, and icons. The generated OSD signal can also include a 2D object or a 3D object.

The OSD processor 340 can generate a pointer which can be displayed on the display, based on a pointing signal input from the remote controller 200. In particular, the pointer can be generated by a pointing signal processing device, and the OSD processor 340 can include the pointing signal generator. Of course, it is possible to provide the pointing signal processing device separately from the OSD processor 340.

The frame rate converter (FRC) 350 can convert the frame rate of an input image. The FRC 350 can output frames without performing separate frame rate conversion.

The formatter 360 can change the format of an input image signal into an image signal for display on a display and output the changed image signal.

In particular, the formatter 360 can change the format of the image signal to correspond to the display panel.

Meanwhile, the formatter 360 can change the format of an image signal. For example, the format of the 3D image signal can be changed to any one format of various 3D formats such as a Side by Side format, a Top/Down format, a Frame Sequential format, an Interlaced format, a Checker Box format.

The processor 330 can control overall operations within the image display apparatus 100 or signal processing device 170.

For example, the processor 330 can control the tuner 110 to select (tuning) an RF broadcast corresponding to a channel selected by a user or a pre-stored channel.

The processor 330 can control the image display apparatus 100 according to a user command input through the user input interface 150 or an internal program.

The processor 330 can perform data transfer control with the network interface 135 or the external device interface 130.

The processor 330 can control operations of the demultiplexer 310 and the image processor 320 within the signal processing device 170.

An audio processor 370 in the signal processing device 170 can voice-process a demultiplexed voice signal. To this end, the audio processor 370 can include various decoders.

The audio processor 370 in the signal processing device 170 can perform processing such as adjustment of bass, treble, and volume.

The data processor in the signal processing device 170 can perform data processing on a demultiplexed data signal. For example, when the demultiplexed data signal is a coded data signal, the data processor can decode the data signal. The coded data signal can be electronic program guide information including broadcast information such as a start time and end time of a broadcast program broadcast on each channel.

The block diagram of the signal processing device 170 illustrated in FIG. 3 is a block diagram for one embodiment of the present disclosure. Constituents of the block diagram can be integrated, added, or omitted according to the specifications of the signal processing device 170 which is implemented in reality.

In particular, the frame rate converter 350 and the formatter 360 can be separately provided in addition to the image processor 320.

Figure 4A:
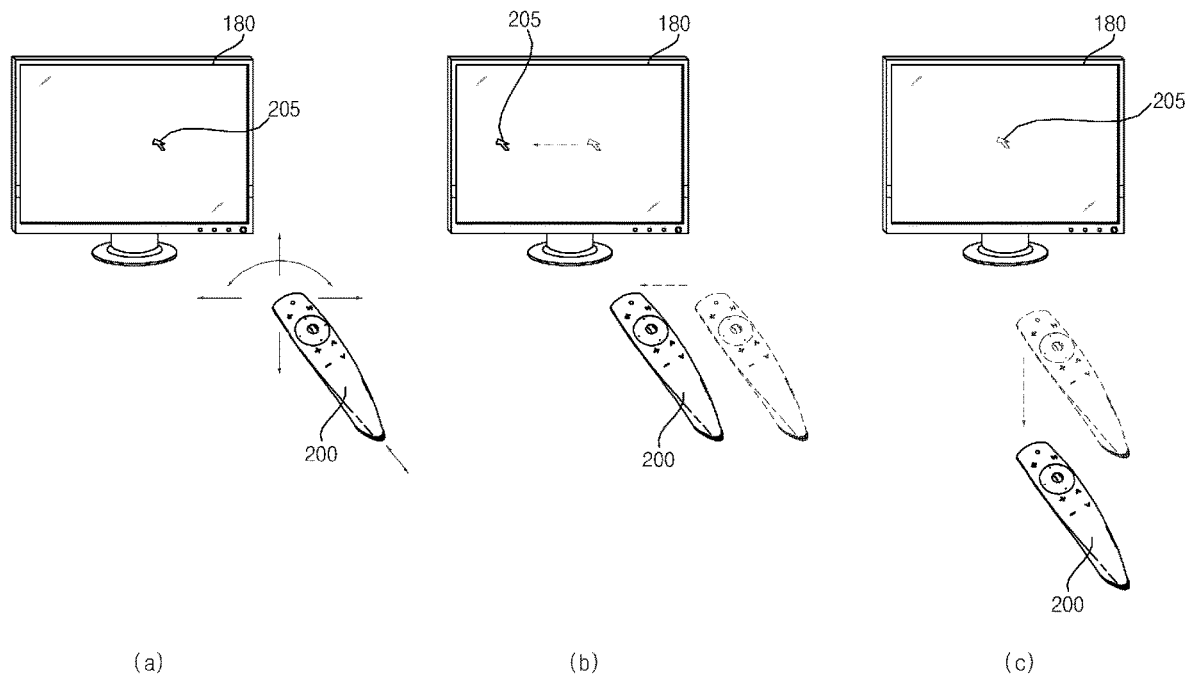
FIG. 4A, including parts (a)-(c), illustrates a method for controlling a remote controller of FIG. 2 according to an embodiment of the present disclosure.

FIG. 4A illustrates a method for controlling the remote controller of FIG. 2.

As illustrated in FIG. 4A(a), a pointer 205 corresponding to the remote controller 200 can be displayed on the display 180.

The user can move the remote controller 200 up and down, left and right (FIG. 4A(b)), or back and forth (FIG. 4A(c)) or rotate the same. The pointer 205 displayed on the display 180 of the image display apparatus corresponds to movement of the remote controller 200. As illustrated in the drawings, since the pointer 205 moves according to movement of the remote controller 200 in the 3D space, the remote controller 200 can be referred to as a spatial remote control or a 3D pointing device.

FIG. 4A(b) illustrates a case where the pointer 205 displayed on the display 180 of the image display apparatus moves to the left when the user moves the remote controller 200 to the left.

Information about movement of the remote controller 200 sensed through a sensor of the remote controller 200 is transmitted to the image display apparatus. The image display apparatus can calculate coordinates of the pointer 205 based on the information about the movement of the remote controller 200. The image display apparatus can display the pointer 205 such that the pointer 205 corresponds to the calculated coordinates.

FIG. 4A(c) illustrates a case where the user moves the signal processing device 170 away from display 180 in a state where the user presses down a specific button in the remote controller 200. In this case, a selected area on the display 180 corresponding to the pointer 205 can be zoomed in and displayed with the size thereof increased. On the other hand, when the user moves the remote controller 200 closer to the display 180, the selected area in the display 180 corresponding to the pointer 205 can be zoomed out and displayed with the size thereof reduced. Alternatively, the selected area can be zoomed out when the remote controller 200 moves away from the display 180, and can be zoomed in when the remote controller 200 moves closer to the display 180.

Vertical and lateral movement of the remote controller 200 may not be recognized while the specific button in the remote controller 200 is pressed down. That is, when the remote controller 200 approaches or moves away from the display 180, vertical and lateral movements thereof may not be recognized, but back-and-forth movement thereof can be recognized. When the specific button in the remote controller 200 is not pressed down, the pointer 205 only moves according to vertical and lateral movements of the remote controller 200.

The speed and direction of movement of the pointer 205 can correspond to the speed and direction of movement of the remote controller 200.

Figure 4B:
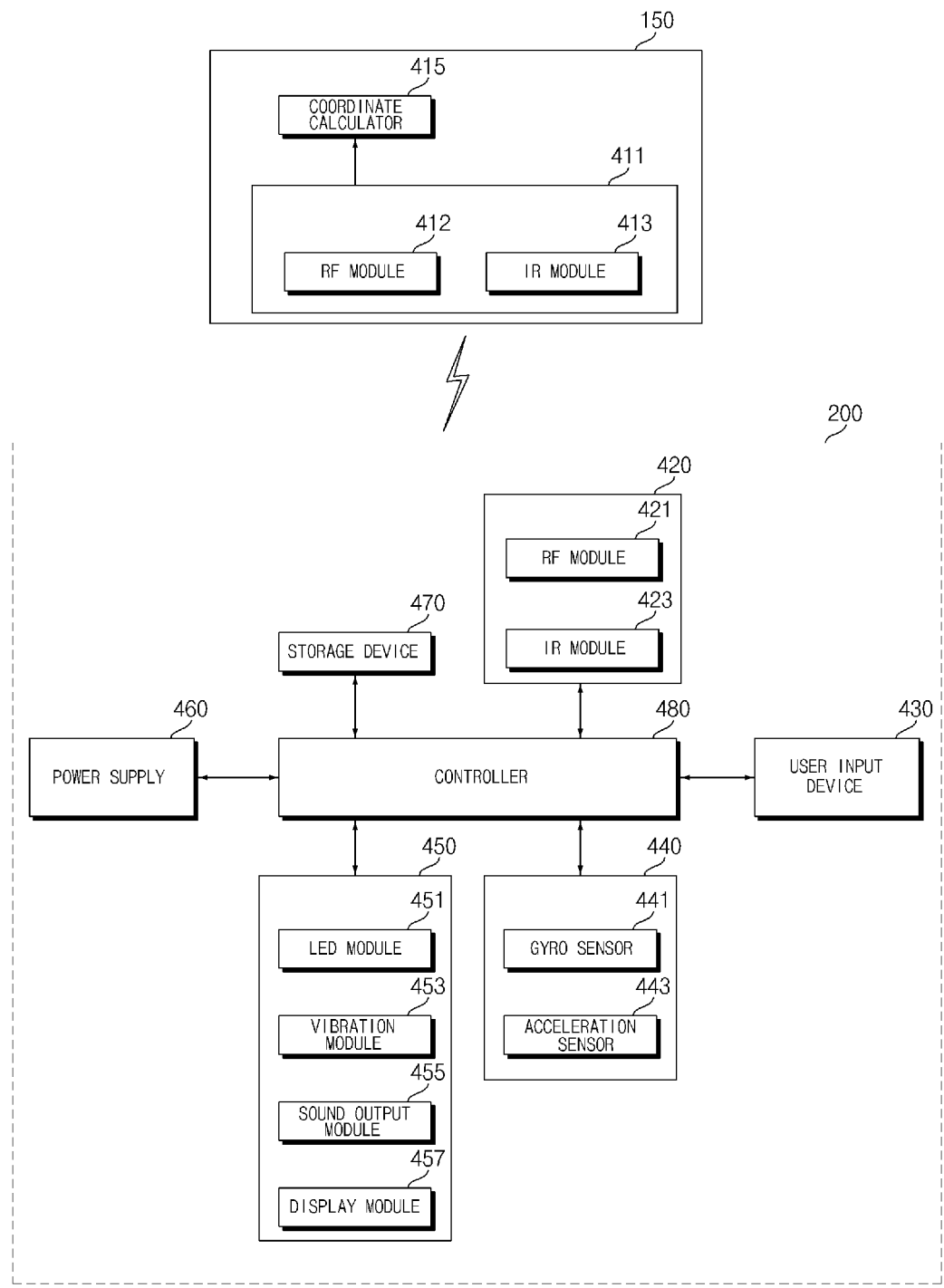
FIG. 4B is an internal block diagram illustrating the remote controller of FIG. 2 according to an embodiment of the present disclosure.

FIG. 4B is an internal block diagram illustrating the remote controller of FIG. 2.

Referring to the drawing, the remote controller 200 can include a wireless transceiver 425, a user input device 430, a sensor device 440, an output device 450, a power supply 460, a storage device 470, and a controller 480.

The wireless transceiver 425 transmits and receives signals to and from one of the image display apparatuses according to embodiments of the present disclosure described above. Hereinafter, one image display apparatus 100 according to one embodiment of the present disclosure will be described.

In this embodiment, the remote controller 200 can include an RF module 421 capable of transmitting and receiving signals to and from the image display apparatus 100 according to an RF communication standard. The remote controller 200 can further include an IR module 423 capable of transmitting and receiving signals to and from the image display apparatus 100 according to an IR communication standard.

In this embodiment, the remote controller 200 transmits a signal including information about movement of the remote controller 200 to the image display apparatus 100 via the RF module 421.

In addition, the remote controller 200 can receive a signal from the image display apparatus 100 via the RF module 421. When necessary, the remote controller 200 can transmit commands related to power on/off, channel change, and volume change to the image display apparatus 100 via the IR module 423.

The user input device 430 can include a keypad, a button, a touchpad, or a touchscreen. The user can input a command related to the image display apparatus 100 with the remote controller 200 by manipulating the user input device 435. When the user input device 435 includes a hard key button, the user can input a command related to the image display apparatus 100 with the remote controller 200 by pressing the hard key button. When the user input device 435 includes a touchscreen, the user can input a command related to the image display apparatus 100 with the remote controller 200 by touching a soft key on the touchscreen. The user input device 430 can include various kinds of input means such as a scroll key and a jog key which are manipulatable by the user, but it should be noted that this embodiment does not limit the scope of the present disclosure.

The sensor device 440 can include a gyro sensor 441 or an acceleration sensor 443. The gyro sensor 441 can sense information about movement of the remote controller 200.

For example, the gyro sensor 441 can sense information about movement of the remote controller 200 with respect to the X, Y and Z axes. The acceleration sensor 443 can sense information about the movement speed of the remote controller 200. The sensor device 440 can further include a distance measurement sensor to sense a distance to the display 180.

The output device 450 can output an image signal or voice signal corresponding to manipulation of the user input device 435 or a signal transmitted from the image display apparatus 100. The user can recognize, via the output device 450, whether the user input device 435 is manipulated or the image display apparatus 100 is controlled.

For example, the output device 450 can include an LED module 451 to be turned on when the user input device 35 is operated or signals are transmitted to and received from the image display apparatus 100 via the wireless transceiver 425, a vibration module 453 to generate vibration, a sound output module 455 to output sound, or a display module 457 to output an image.

The power supply 460 supplies power to the remote controller 200. When the remote controller 200 does not move for a predetermined time, the power supply 460 can stop supplying power to save power. The power supply 460 can resume supply of power when the predetermined key provided to the remote controller 200 is manipulated.

The storage device 470 can store various kinds of programs and application data necessary for control or operation of the remote controller 200. When the remote controller 200 wirelessly transmits and receives signals to and from the image display apparatus 100 via the RF module 421, the remote controller 200 and the image display apparatus 100 can transmit and receive signals in a predetermined frequency band. The controller 480 of the remote controller 200 can store, in the storage device 470, information about, for example, a frequency band enabling wireless transmission and reception of signals to and from the image display apparatus 100 which is paired with the remote controller 200, and reference the same.

The controller 480 controls overall operation related to control of the remote controller 200. The controller 480 can transmit, via the wireless transceiver 425, a signal corresponding to manipulation of a predetermined key in the user input device 435 or a signal corresponding to movement of the remote controller 200 sensed by the sensor device 440 to the image display apparatus 100.

The user input interface 150 of the image display apparatus 100 can include a wireless transceiver 151 capable of wirelessly transmitting and receiving signals to and from the remote controller 200 and a coordinate calculator 415 capable of calculating coordinates of the pointer corresponding to operation of the remote controller 200.

The user input interface 150 can wirelessly transmit and receive signals to and from the remote controller 200 via an RF module 412. In addition, the user input interface 150 can receive, via an IR module 413, a signal transmitted from the remote controller 200 according to an IR communication standard.

The coordinate calculator 415 can calculate coordinates (x, y) of the pointer 205 to be displayed on the display 180, by correcting hand tremor or an error in a signal corresponding to operation of the remote controller 200 which is received via the wireless transceiver 151.

The transmitted signal of the remote controller 200 input to the image display apparatus 100 via the user input interface 150 is transmitted to the signal processing device 170 of the image display apparatus 100. The signal processing device 170 can determine information about an operation of the remote controller 200 or manipulation of a key from the signal transmitted from the remote controller 200, and control the image display apparatus 100 according to the information.

As another example, the remote controller 200 can calculate coordinates of the pointer corresponding to movement thereof and output the same to the user input interface 150 of the image display apparatus 100. In this case, the user input interface 150 of the image display apparatus 100 can transmit, to the signal processing device 170, information about the received coordinates of the pointer without separately correcting hand tremor or the error.

As another example, in contrast with the example of the drawing, the coordinate calculator 415 can be provided in the signal processing device 170 rather than in the user input interface 150.

Figure 5:
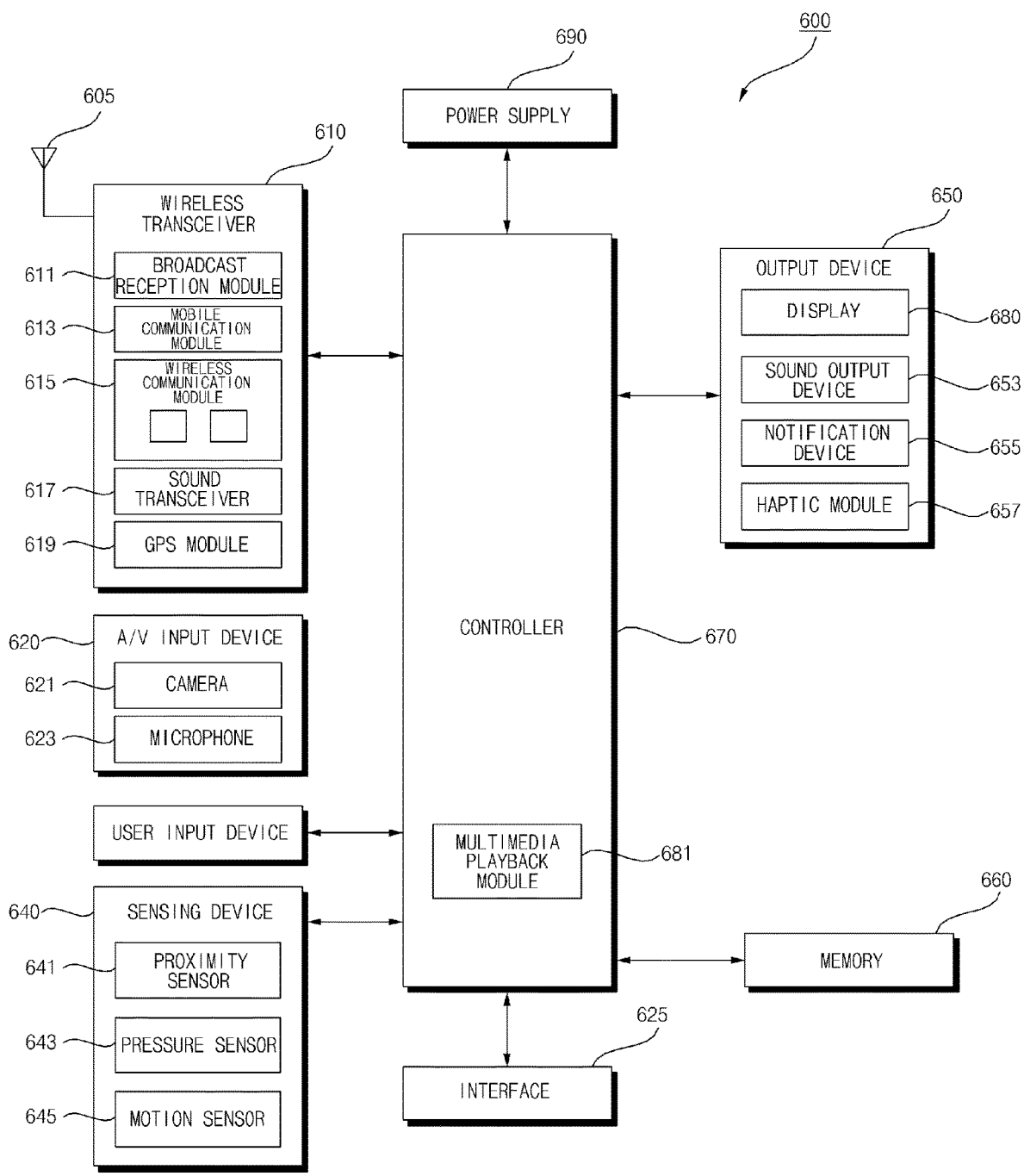
FIG. 5 is an internal block diagram illustrating a mobile terminal of FIG. 1 according to an embodiment of the present disclosure.

FIG. 5 is an internal block diagram illustrating the mobile terminal of FIG. 1.

Referring to the drawing, the mobile terminal 600 can include a wireless transceiver 610, an audio/video (A/V) input device 620, a user input device 630, a sensing device 640, and an output device 650, a memory 660, an interface 625, a controller 670 and a power supply 690.

The wireless transceiver 610 can include a broadcast reception module 611, a mobile communication module 613, a wireless communication module 615, a sound transceiver 617, and a GPS module 619.

The broadcast reception module 611 can receive at least one of a broadcast signal or broadcast-related information from an external broadcast management server over a broadcast channel. Herein, the broadcast channel can include a satellite channel and a terrestrial channel.

The broadcast signal and/or broadcast-related information received through the broadcaster reception module 611 can be stored in the memory 660.

The mobile communication module 613 transmits and receives a radio signal to and from at least one of a base station, an external terminal or a server over a mobile communication network. Herein, the radio signal can include a voice call signal, a video call signal, or various kinds of data according to transmission and reception of a text/multimedia message.

The wireless communication module 615, which refers to a module for wireless communication access, can be installed inside or outside the mobile terminal 600. For example, the wireless communication module 615 can perform Wi-Fi-based wireless communication or Wi-Fi Direct-based wireless communication.

The sound transceiver 617 can perform sound communication. In the sound communication mode, the sound transceiver 617 can add data of predetermined information to audio data which is to be output and output sound. In addition, in the sound communication mode, the sound transceiver 617 can extract data of predetermined information from received sound.

Applicable short-range communication technologies can include BLUETOOTH, radio frequency identification (RFID), Infrared Data Association (IrDA), Ultra-Wideband (UWB), and ZIGBEE.

The GPS module 619 can receive location information from a plurality of GPS satellites.

The A/V input device 620 is used for input of an audio signal or a video signal and can include a camera 621 and a microphone 623.

The user input device 630 generates key input data input by the user to control operation of a terminal of the user. To this end, the user input device 630 can include a keypad, a dome switch, and a touchpad (resistive touchpad/capacitive touchpad). In particular, the touchpad can form a layered architecture together with the display 680, thereby realizing a touchscreen.

The sensing device 640 can generate a sensing signal for controlling operation of the mobile terminal 600 by sensing the current state of the mobile terminal 600, for example by sensing whether the mobile terminal 600 is in the open or closed position, where the mobile terminal 600 is located, and whether the user contacts the mobile terminal 600.

The sensing device 640 can include a proximity sensor 641, a pressure sensor 643 and a motion sensor 645. The motion sensor 645 can employ an acceleration sensor, a gyro sensor, a gravity sensor and the like to sense movement or the location of the mobile terminal. In particular, the gyro sensor, which is used to measure an angular speed, can sense orientation (angle) of the mobile terminal with respect to a reference direction.

The output device 650 can include a display 680, an audio output device 653, a notification device 655, and a haptic module 657.

The display 680 outputs and displays information processed by the mobile terminal 600.

As described above, when the display 680 forms a layered architecture with the touchpad to implement a touchscreen, the display 680 can be used not only as an output device but also as an input device for input of information according to user touch.

The audio output device 653 outputs audio data received from the wireless transceiver 610 or stored in the memory 660. The audio output device 653 can include a speaker and a buzzer.

The notification device 655 outputs a signal for reporting occurrence of an event in the mobile terminal 600. For example, the notification device 655 can output a signal in the form of vibration.

The haptic module 657 generates various haptic effects which can be felt by the user. A typical example of the haptic effects generated by the haptic module 657 is vibration.

The memory 660 can store a program for processing and control of the controller 670, and functions to temporarily store input data or output data (e.g., a phonebook, a message, a still image, a moving image, or the like).

The interface 625 serves as an interface for all devices connected to the mobile terminal 600. The interface 625 can serve to receive data or power from external devices and transfer the same to the internal constituents of the mobile terminal 600 and to transmit data from the mobile terminal 600 to external devices.

The controller 670 typically controls operations of the aforementioned respective elements, thereby controlling overall operation of the mobile terminal. For example, the controller 670 can perform control or processing related to voice communication, data communication, video communication, and the like. The controller 670 can also include a multimedia playback module 681 to reproduce multimedia. The multimedia playback module 681 can be provided in the controller 670 as hardware or can be configured separately from the controller 670.

The power supply 690 supplies power necessary for operations of the respective constituents according to control of the controller 670 when external power or internal power is applied thereto.

Figure 6:
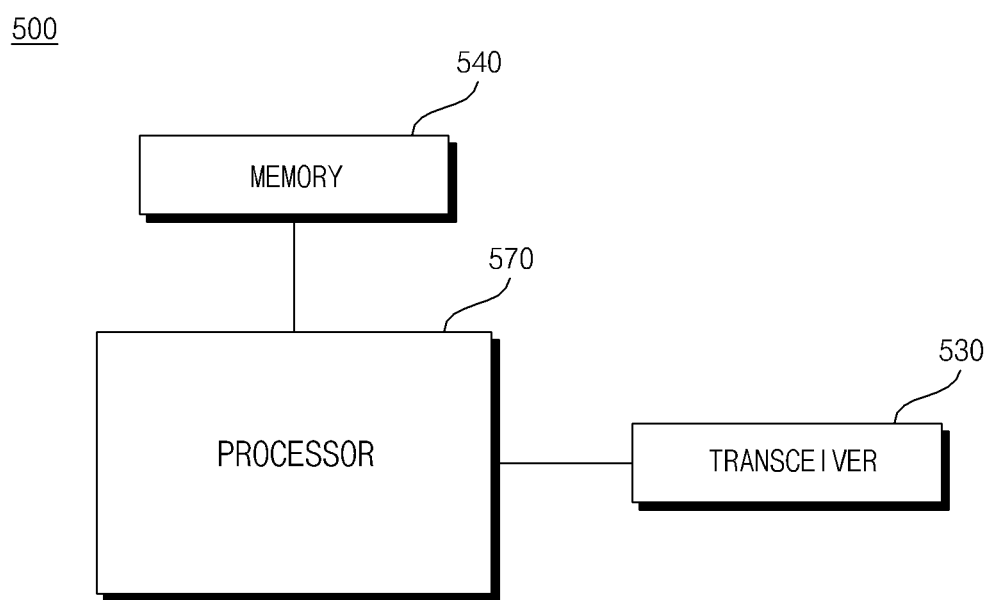
FIG. 6 is an internal block diagram of a server of FIG. 1 according to an embodiment of the present disclosure.

The block diagram of the mobile terminal 600 illustrated in FIG. 5 is simply illustrative. The respective constituents of the block diagram can be integrated, added or omitted according to the specifications of the mobile terminal 600. That is, two or more constituents can be combined into one constituent, or one constituent can be subdivided into two or more constituents, when necessary. In addition, the function performed in each block is simply illustrative, and it should be noted that specified operations or devices of the blocks do not limit the scope of the present disclosure. FIG. 6 is an internal block diagram of the server of FIG. 1.

Referring to the drawing, the server 500 includes a transceiver 530 exchanging data with the external image display apparatus 100 and the mobile terminal 600, a memory 540 storing various data, and a processor 570 processing data.

The processor 570 in the server 500 can be configured to the collected chatting conversation contents are arranged and transmitted to the outside in response to a request for chatting conversation content for a specific broadcast image from the image display apparatus 100 or the mobile terminal 600.

In particular, the processor 570 in the server 500 can perform a control operation to perform grouping by region based on location information received from the image display apparatus 100 or the mobile terminal 600, collect chatting conversation contents for a broadcast image based on a specific region, and transmit the collected chatting conversation contents to the image display apparatus 100 or the mobile terminal 600.

Alternatively, the processor 570 in the server 500 can perform a control operation to perform grouping by viewing age, grouping by viewing gender, or grouping by viewing propensity based on viewer information received from the image display apparatus 100 or the mobile terminal 600, collect chatting conversation contents for a broadcast image based on a specific region, and transmit the collected chatting conversation contents to the image display apparatus 100 or the mobile terminal 600.

When the conversation content information according to the conversation content input is received from the image display apparatus 100 or the mobile terminal 600, the processor 570 in the server 500 can perform a control operation to update the conversation content information and provide the updated chatting conversation content to the image display apparatus 100, the mobile terminal 600, or the like.

Figure 7A:
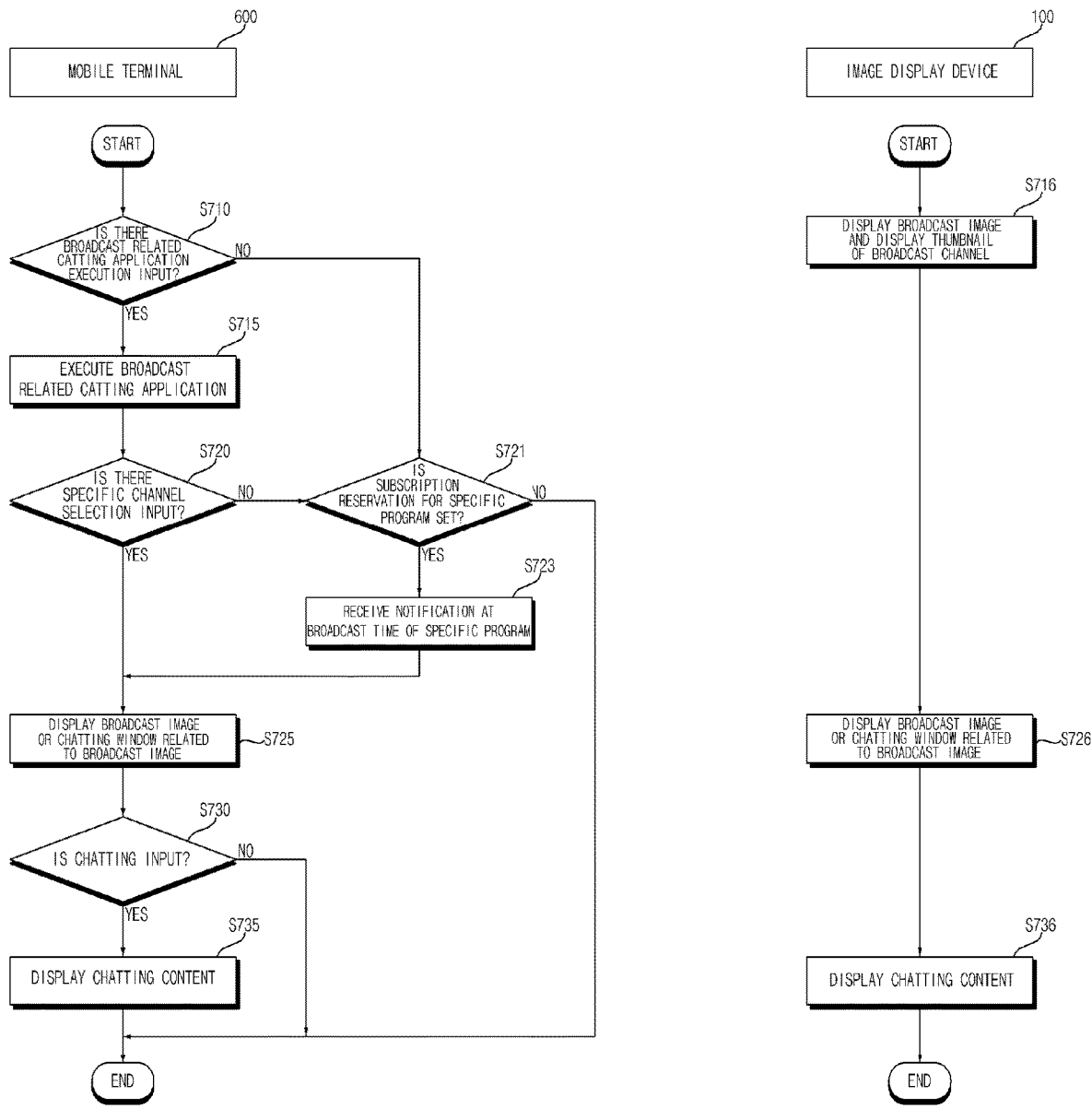
FIG. 7A is a flowchart illustrating an example of an operation method of the image display apparatus according to one embodiment of the present disclosure.

FIG. 7A is a flowchart illustrating an example of an operation method of the image display apparatus according to one embodiment of the present disclosure.

Referring to the drawing, the signal processing device 170 in the image display apparatus 100 determines whether there is a broadcast chatting application execution input based on the signal from the remote controller 200 (S710*b*), and when there is the broadcast chatting application execution input, the signal processing device 170 is configured to display the broadcast image and the plurality of broadcast channel thumbnails (S715*b*).

Figure 8A:
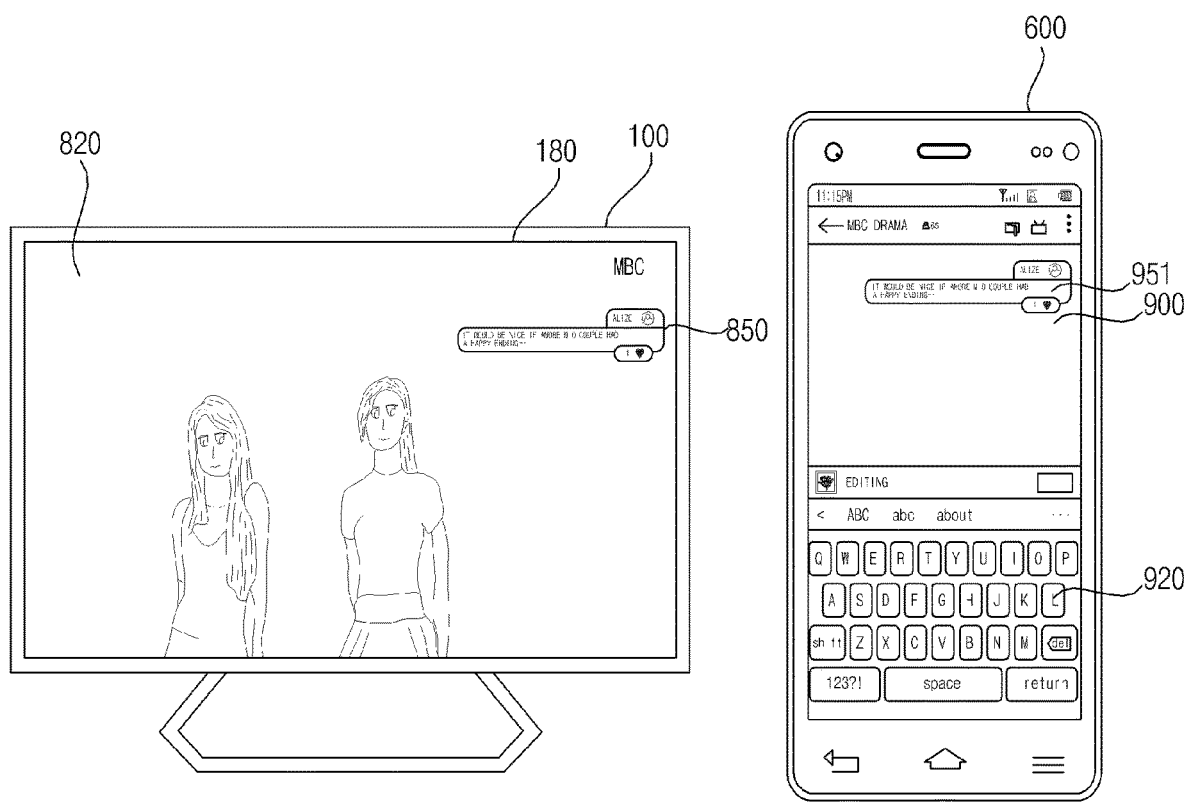
FIGS. 8A to 19B are diagrams referred for description of the operation method of FIG. 7A or 7B according to embodiments of the present disclosure.

For example, the signal processing device 170 in the image display apparatus 100 can be configured to display the broadcast image 820 of the first channel, as illustrated in FIG. 8A.

At this time, the broadcast image 800 of the first channel can be a broadcast image corresponding to a broadcast signal received by the tuner 110 in the image receiver 105 or a broadcast signal received through an external device interface 130 such as an HDMI terminal.

Alternatively, the broadcast image 800 of the first channel can be a stream-based broadcast image received through the network interface 135.

The signal processing device 170 in the image display apparatus 100 can receive an application display input based on a specific key operation or pointer operation in the remote controller 200.

When an application display input is received, the signal processing device 170 in the image display apparatus 100 can be configured to display an application list including a plurality of applications together with the broadcast image 800.

In this case, the application list can include a broadcast chatting application.

The signal processing device 170 in the image display apparatus 100 can receive a broadcast chatting application execution input based on a specific key operation or pointer operation in the remote controller 200.

Figure 9A:
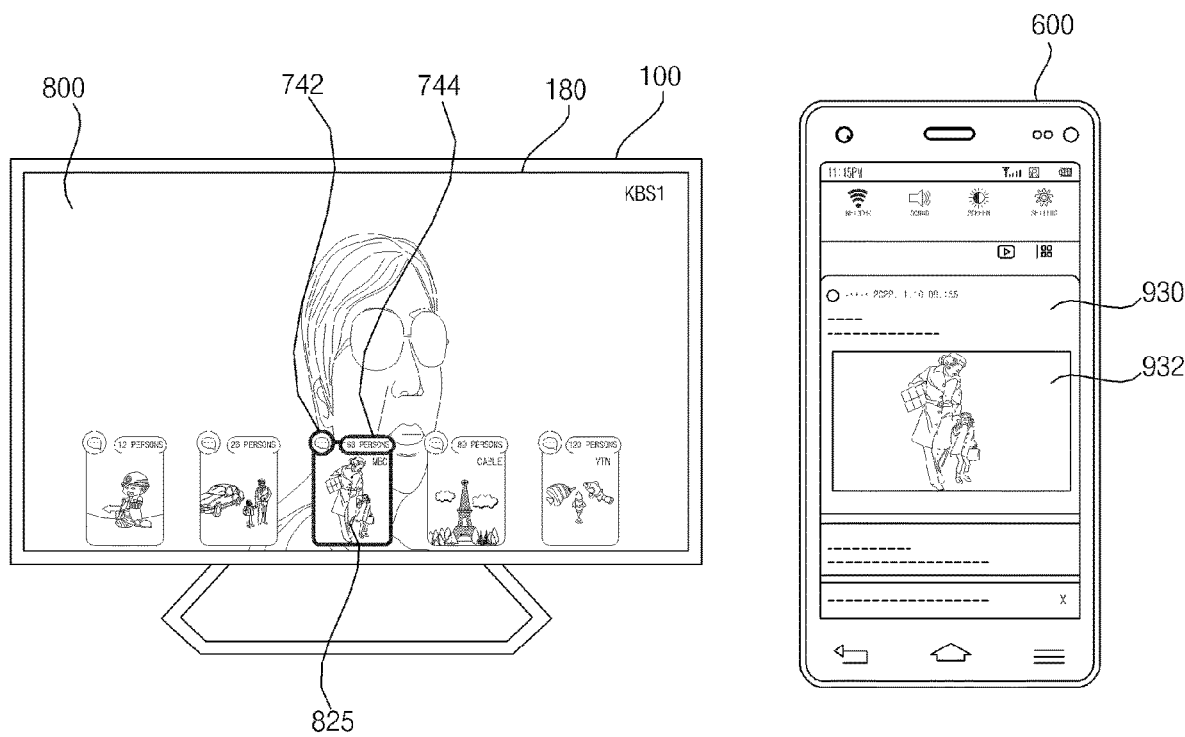

For example, when a broadcast chatting application in the application list is selected based on a specific key operation in the remote controller 200 or an operation of the pointer 205, the signal processing device 170 in the display device 100 can be configured to display the broadcast image 800 and the plurality of broadcast channel thumbnails 820, as illustrated in FIG. 9A. FIG. 9A illustrates five broadcast channel thumbnails, but various modifications are possible.

The plurality of broadcast channel thumbnails include a thumbnail of a broadcast channel received from the tuner 110 and a thumbnail of a broadcast channel received from an external device interface 130 such as an external input terminal.

The plurality of broadcast channel thumbnails can further include a thumbnail of the broadcast channel received from the network interface 135.

A portion 825 of the plurality of broadcast channel thumbnails can include a broadcast video image, an object 742 representing a chatting window, and information on the number of viewers 744.

FIG. 9A illustrates that each of the plurality of broadcast channel thumbnails includes the broadcast video image, the object representing the chatting window, and information on the number of viewers.

In this way, by displaying the object representing a chatting window, when a specific broadcast channel thumbnail is selected, it is possible to easily recognize that chatting conversation content related to the corresponding broadcast image can be provided.

By displaying information on the number of viewers, it is possible to easily recognize viewer interest or the like in a corresponding broadcast.

Among the plurality of broadcast channel thumbnails of FIG. 9A, a third broadcast channel thumbnail 825 can be a thumbnail of a channel corresponding to a broadcast signal received from the tuner 110, and another broadcast channel thumbnail can be a thumbnail of a channel corresponding to a broadcast signal received from the external device interface 130.

Next, the signal processing device 170 in the image display apparatus 100 determines whether there is a specific channel selection input based on the signal from the remote controller 200 (S720b), and when there is the specific channel selection input, the signal processing device 170 can be configured to display a chatting window including a broadcast image of the corresponding channel and a chatting conversation content of the corresponding broadcast (S725b).

When there is no specific channel selection input, the signal processing device 170 in the image display apparatus 100 determines whether a broadcast program subscription reservation for a specific channel has been set (S721b), and when there is the broadcast program subscription reservation, the signal processing device 170 receives notification at the broadcast time of the corresponding broadcast program (S723b) and can be configured to a chatting window including the broadcast image of the corresponding broadcast program and a chatting conversation content of the broadcast image is displayed.

When the conversation content is input based on the signal from the remote controller 200 in a state where the broadcast image and the chatting conversation content are displayed (S730b), the signal processing device 170 in the image display apparatus 100 can be configured to transmit the conversation content input to the server 500, and highlight and display the input conversation content in the chatting window (S735b).

Accordingly, as illustrated in FIG. 8A, the signal processing device 170 can access the server 500 providing the chatting conversation content 850, and input or display the conversation content while displaying the broadcast image 820 corresponding to a selected channel among the plurality of broadcast channels and the chatting conversation content 850 together. Furthermore, selection of the broadcast channel and the chatting conversation content 750 can be performed conveniently through the plurality of broadcast channel thumbnails.

Figure 9B:
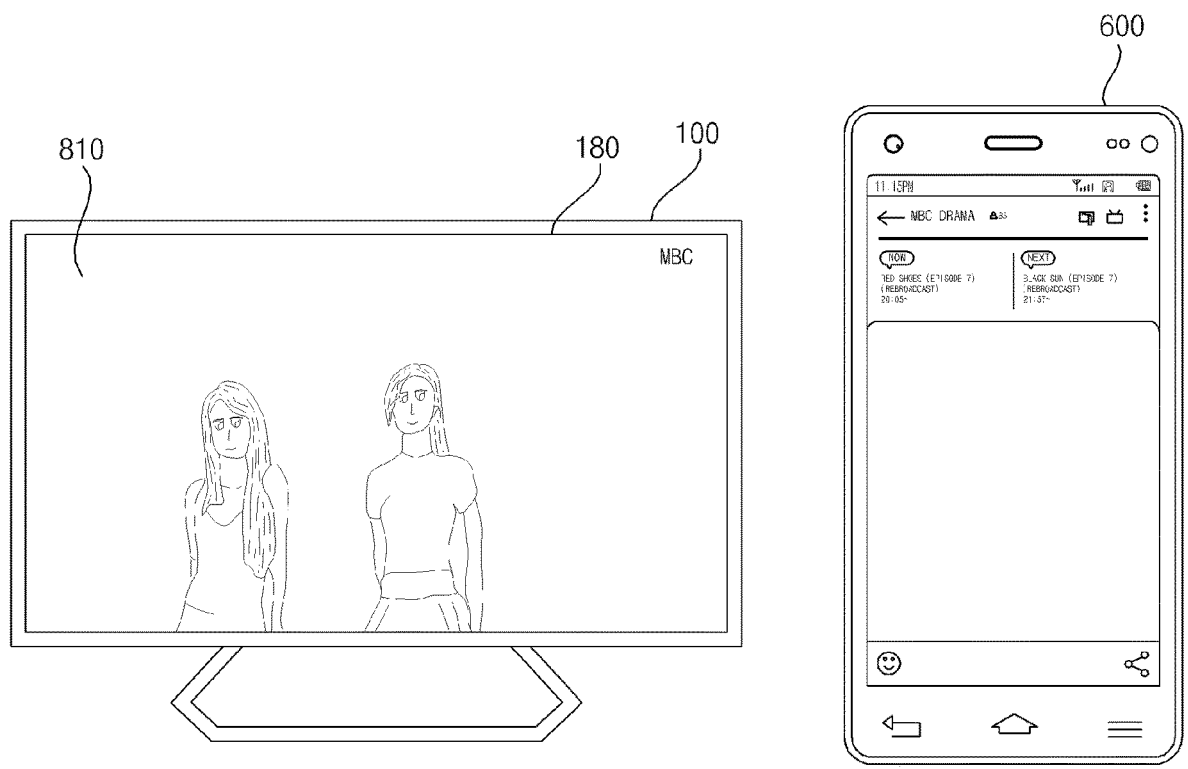
Figure 9C:
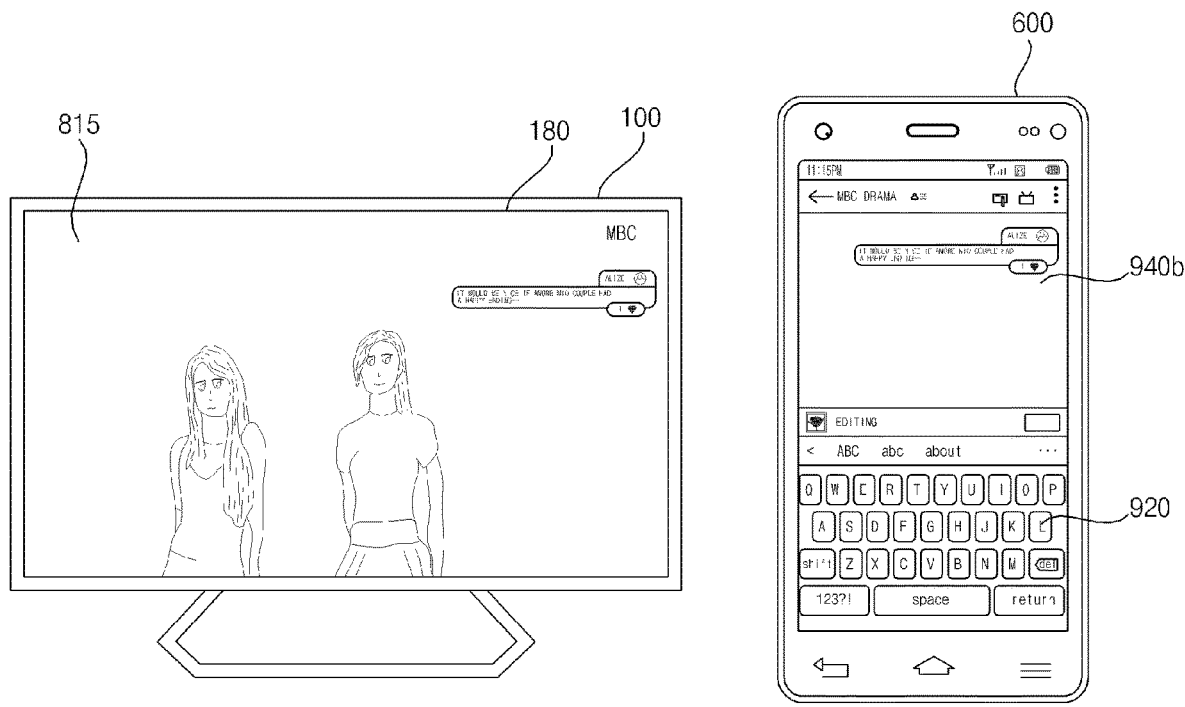
Figure 9D:
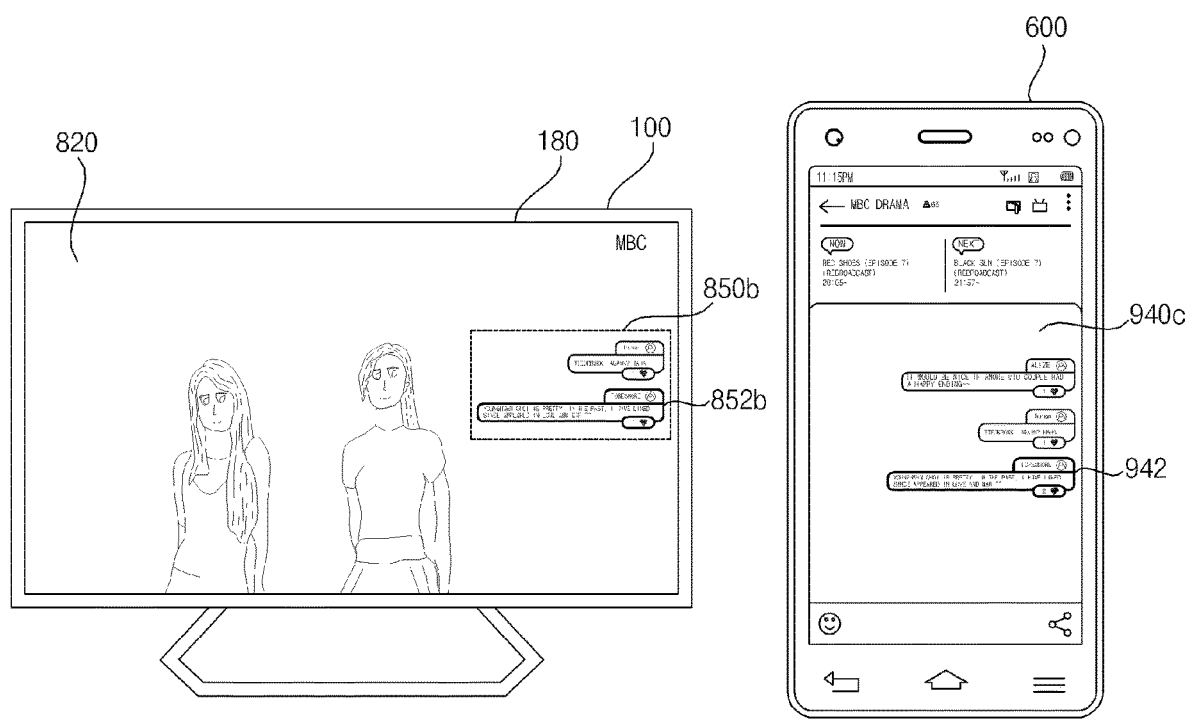

Meanwhile, as illustrated in FIG. 9A, when the broadcast channel thumbnail 825 of the second channel is selected based on a specific key operation or an operation of the pointer 205 in the remote controller 200 in a state where the broadcast image 800 and the plurality of broadcast channel thumbnails are displayed, as illustrated in FIG. 9D, the signal processing device 170 in the image display apparatus 100 receives the broadcast image 820 corresponding to the selected thumbnail from the image receiver 105, accesses the server 500 through the network interface 135 to receive the chatting conversation content 850b corresponding to the broadcast image 820, synchronize the broadcast image 820 and the chatting conversation content 850b, and overlays the chatting conversation content 850b on the broadcast image 820 and displayed as illustrated in FIG. 9C.

For synchronization of the broadcast image 820 and the chatting conversation content 850b, the signal processing device 170 can synchronize the timing information of the chatting conversation content 850b from the server 500 received from the interface 135 with the timing information of the broadcast image 820 received from the image receiver 105. Accordingly, it is possible to share the chatting conversation content with other users while watching the same broadcast image 820.

Meanwhile, in response to execution of a broadcast chatting application based on a first login account, and the broadcast chatting application in the mobile terminal 600 is executed based on the same first login account, the signal processing device 170 in the image display apparatus 100 can perform a control operation to perform synchronization with the mobile terminal 600.

For example, the image display apparatus 100 and the mobile terminal 600 can access the server 500 with the same first login account, and thus receive the same chatting conversation content from the server 500.

Figure 8B:
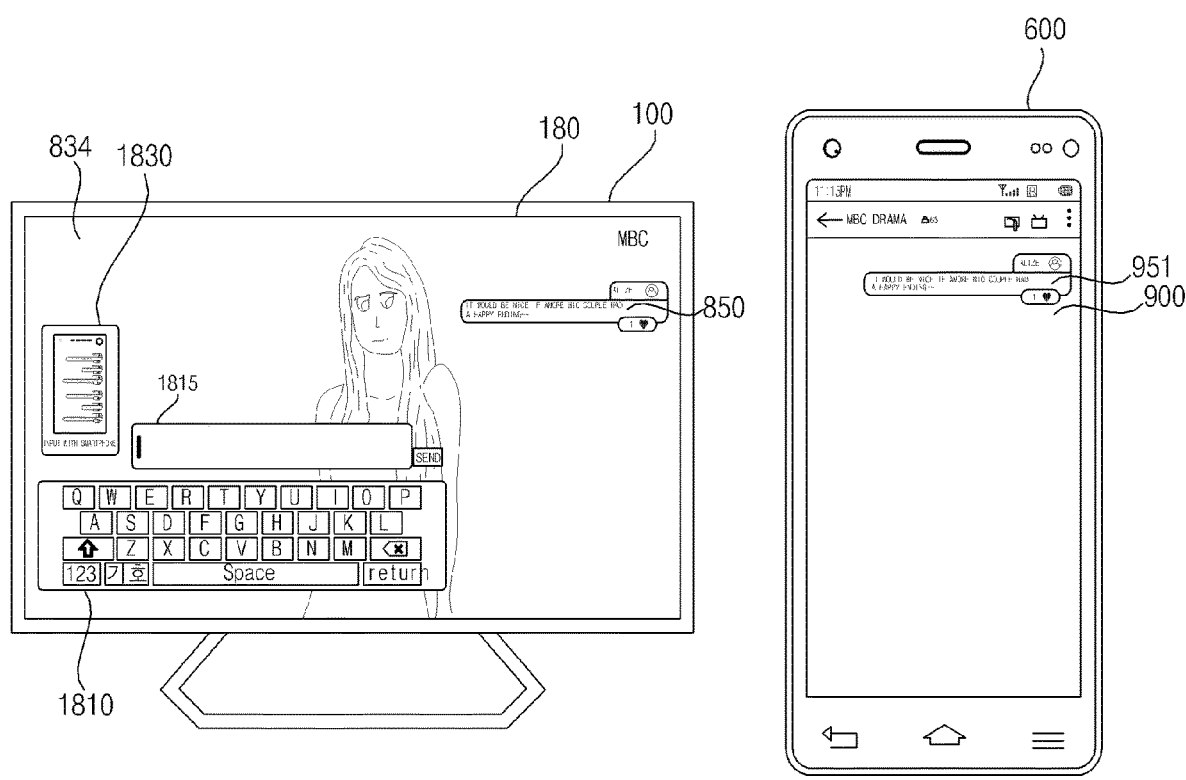

Therefore, according to the synchronization of Step 725b (S725b) of the image display apparatus 100, as illustrated in FIG. 8B, the same chatting window or the same chatting conversation content related to the broadcast image displayed on the image display apparatus 100 can be displayed (S731b).

Figure 8C:
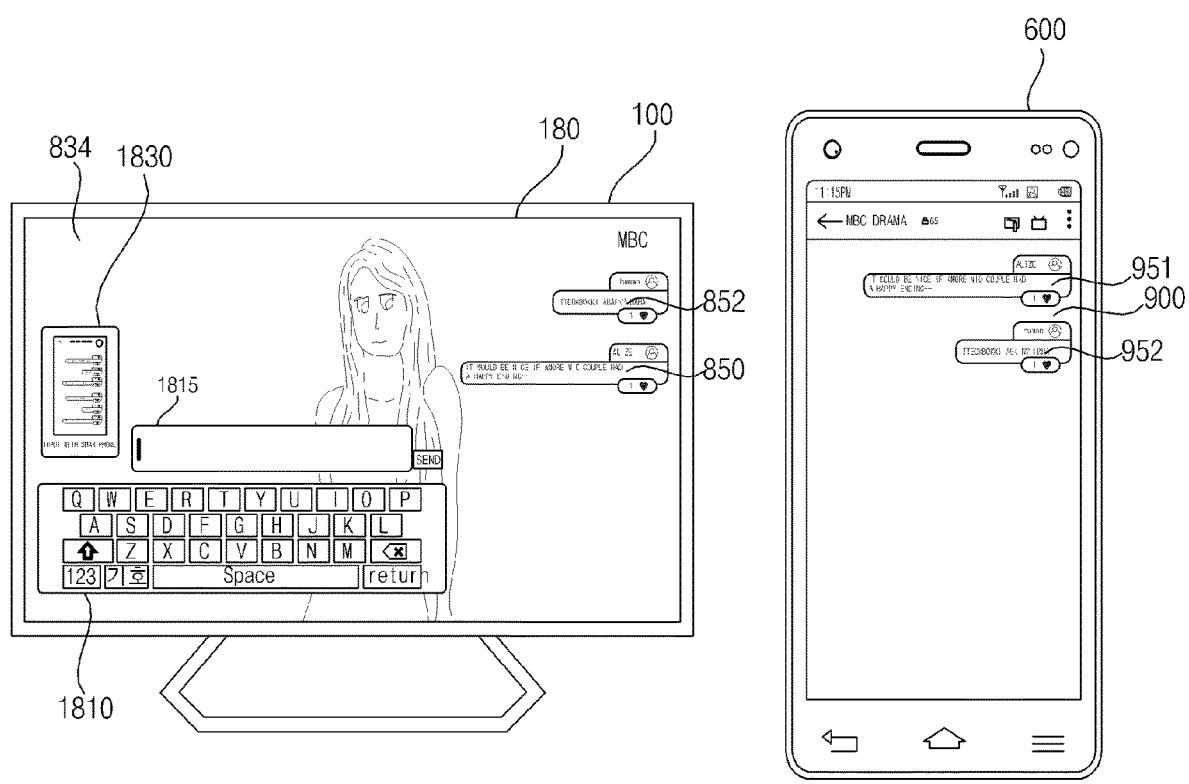

Meanwhile, when the chatting input is performed in the image display apparatus 100 in Step 730b (S730b) of the image display apparatus 100, according to the synchronization in Step 735b (S735b) of the image display apparatus 100, as illustrated in FIG. 8C, the mobile terminal 600 can display the same conversation input contents as those displayed on the image display apparatus 100 (S736b). Accordingly, the same chatting conversation content of the broadcast image can be provided to the image display apparatus and the mobile terminal 600.

Figure 7B:
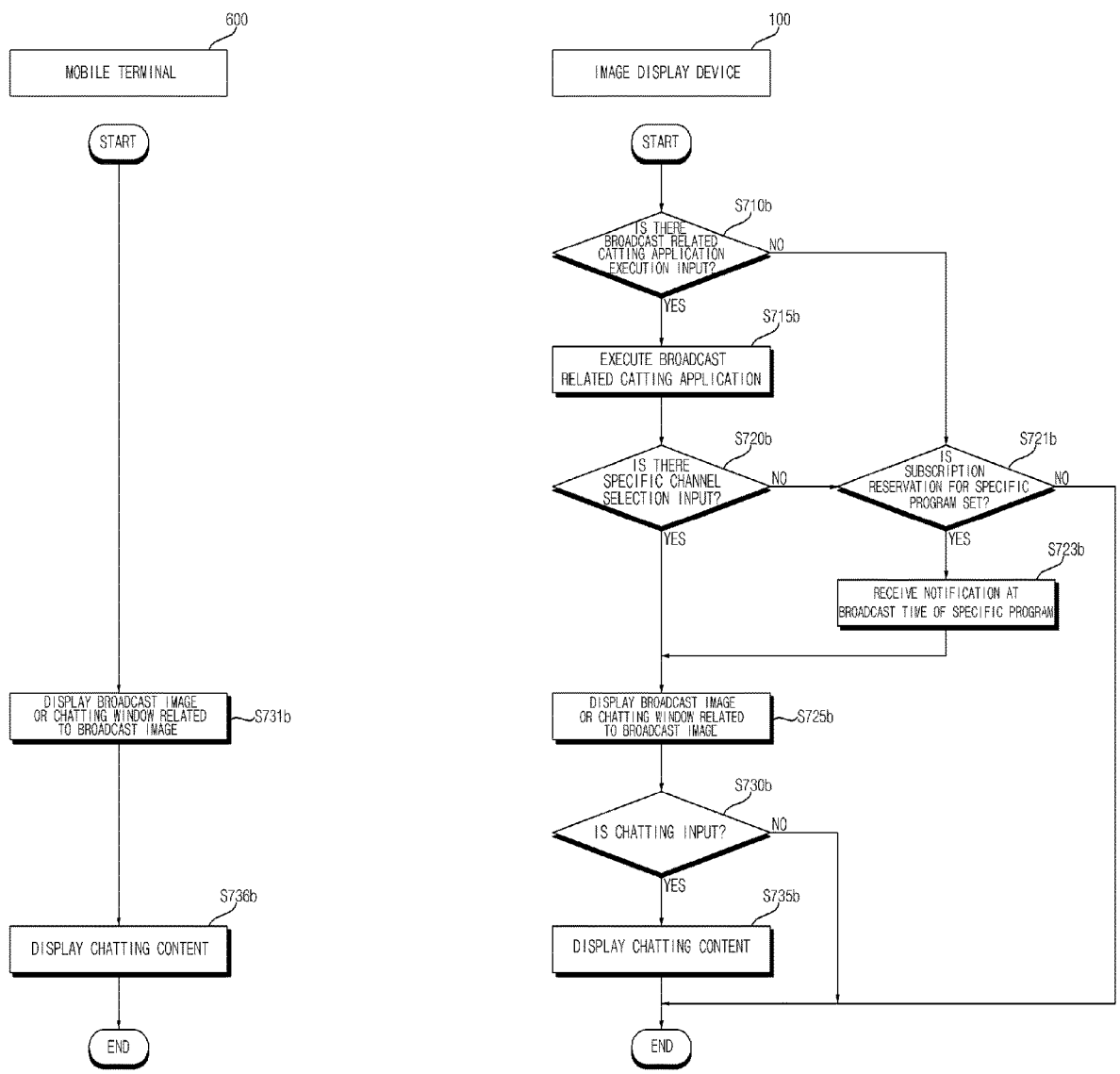
FIG. 7B is a flowchart illustrating an example of the operation method of the image display apparatus according to one embodiment of the present disclosure.

FIG. 7B is a flowchart illustrating an example of the operation method of the image display apparatus according to one embodiment of the present disclosure.

Referring to the drawing, the controller 670 in the mobile terminal 600 determines whether there is the broadcast chatting application execution input based on the input signal (S710), and when there is the broadcast chatting application execution input, the controller 670 executes the broadcast chatting application (S715).

For example, the controller 670 in the mobile terminal 600 can be configured to display a screen including a plurality of application items.

Meanwhile, the controller 670 in the mobile terminal 600 can execute a broadcast chatting application when a broadcast chatting application item in a screen including a plurality of application items is selected.

The controller 670 in the mobile terminal 600 determines whether there is a specific broadcast program selection input of a specific channel in the broadcast chatting application screen (S720), and when there is a specific broadcast program selection input, the controller 670 can be configured to display a chatting window related to the corresponding broadcast image or a broadcast related chatting screen (S725).

When there is no specific channel selection input, the controller 670 in the mobile terminal 600 determines whether a broadcast program subscription reservation for a specific channel has been set (S721), and when the broadcast program subscription reservation has been set, the controller 670 receives notification at the broadcast time of the corresponding broadcast program (S723) and can be configured to display the chatting window related to the corresponding broadcast image or the broadcast related chatting screen.

When the conversation content is input based on an input signal in a state where the chatting window or the broadcast related chatting screen are displayed, the controller 670 in the mobile terminal 600 can be configured to transmit the conversation content input to the server 500 and display the input conversation content in the chatting window or the broadcast related chatting screen (S735).

Accordingly, it is possible to input or display the chatting conversation content related to the broadcast image.

Meanwhile, when the broadcast chatting application in the image display apparatus 100 is executed based on the first login account and the broadcast chatting application in the mobile terminal 600 is executed based on the same first login account, the controller 670 in the mobile terminal 600 is configured to synchronize with the image display apparatus 100.

For example, the image display apparatus 100 and the mobile terminal 600 can access the server 500 with the same first login account, and thus, receive the same chatting conversation content from the server 500.

According to Step 710 (S710) of the mobile terminal 600, when the broadcast chatting application is executed, the signal processing device 170 of the image display apparatus 100 can be configured to display the broadcast images of a specific channel and the plurality of broadcast channel thumbnails (S716). Accordingly, a desired channel and broadcast conversation content can be displayed through the plurality of broadcast channel thumbnails.

According to the synchronization in Step 725 (S725) of the mobile terminal 600, as illustrated in FIG. 8A, the image display apparatus 100 can display the broadcast image 820 displayed in the image display apparatus 100 and the same chatting window or the same chatting conversation content 850 related to the broadcast image 820 (S728).

When the chatting input is performed in the mobile terminal 600 in Step 730b (S735) of the mobile terminal 600, the image display apparatus 100, the image display apparatus 100 is synchronized with Step 730 (S730) of the mobile terminal 600 and can display the same conversation input content as the conversation input content displayed in the mobile terminal 600 (S736), as illustrated in FIG. 8A. Accordingly, the chatting conversation content of the same broadcast image can be provided to the image display apparatus and the mobile terminal 600.

FIGS. 8A to 19B are diagrams referred for description of the operation method of FIG. 7A or 7B.

FIG. 8A is a diagram illustrating an example in which the signal processing device 170 and the mobile terminal 600 execute the broadcast chatting application with the same login account.

Referring to the drawing, when the broadcast chatting application is executed based on the first login account and the broadcast chatting application in the mobile terminal 600 is executed based on the first login account, the signal processing device 170 of the image display apparatus 100 can be configured to synchronize with the mobile terminal 600.

In FIG. 8A, the synchronization is performed between the image display apparatus 100 and the mobile terminal 600, the broadcast image 820 of a predetermined broadcast channel and the chatting conversation content 850 are displayed together in the image display apparatus 100, and the chatting window 900 including the chatting conversation content 951 is displayed in the mobile terminal 600.

In the mobile terminal 600, when there is a keyboard window display input for inputting a conversation, a keyboard window 920 and the chatting window 900 can be displayed together in the mobile terminal 600, as illustrated in FIG. 8A.

When a first conversation content is input through the keyboard window of the mobile terminal 600, the mobile terminal 600 can display the first conversation content and transmit the first conversation content to the server 500.

Correspondingly, the signal processing device 170 of the image display apparatus 100 can receive the first conversation content from the server 500 and display the first conversation content. Accordingly, the same conversation content can be quickly displayed based on the same login account.

FIG. 8B is a diagram illustrating another example in which the image display apparatus 100 and the mobile terminal 600 execute the broadcast chatting application with the same login account.

Referring to the drawing, the signal processing device 170 of the image display apparatus 100 can be configured to synchronize with the mobile terminal 600, and display the broadcast image 834 of a predetermined broadcast channel and the chatting conversation content 850 together.

At this time, the mobile terminal 600 can display the chatting window including the chatting conversation content 951 of the corresponding broadcast channel.

The signal processing device 170 of the image display apparatus 100 can be configured to display a keyboard display window 1810 and a text input window 1815 according to a keyboard display input, as illustrated in the drawing.

The signal processing device 170 of the image display apparatus 100 can be configured to further display, based on the keyboard display input, as illustrated in the drawing, in addition to the keyboard display window 1810 and the text input window 1815, a mobile terminal input item 1830.

FIG. 8C illustrates that the first conversation content 850 is input to the image display apparatus 100 and the first conversation content 850 is displayed.

Referring to the drawing, when the first conversation content 850 is input based on the signal from the remote controller 200, the signal processing device 170 of the image display apparatus 100 is configured to display the first conversation content, transmit the first conversation content 850 to the sever 500, and display first conversation content 850 in the mobile terminal 600. Accordingly, the same first conversation content can be provided to the image display apparatus and the mobile terminal 600.

When the first conversation content 850 is input based on the signal from the remote controller 200, the signal processing device 170 of the image display apparatus 100 is configured to transmit the first conversation content 850 input to the server 500, and highlight and display the input first conversation content 850 in the chatting window. Accordingly, it is possible to input or display conversation content while displaying the broadcast image and the chatting conversation content together.

When the second conversation content is input from the mobile terminal 600, the signal processing device 170 of the image display apparatus 100 is configured to receive the second conversation content from the server 500 and display the second conversation content. Accordingly, the same second conversation content can be provided to the image display apparatus and the mobile terminal 600.

FIG. 9A illustrates that the broadcast image 800 and the plurality of broadcast channel thumbnails are displayed together when the broadcast chatting application is executed in the image display apparatus 100.

Referring to the drawing, a portion 825 of the plurality of broadcast channel thumbnails can include the broadcast video image, the object 742 representing the chatting window, and information on the number of viewers 744.

FIG. 9A illustrates that each of the plurality of broadcast channel thumbnails includes the broadcast video image, the object representing the chatting window, and the information on the number of viewers.

In this way, by displaying the object representing the chatting window, when a specific broadcast channel thumbnail is selected, it is possible to easily recognize that the chatting conversation content related to the corresponding broadcast image can be provided.

By displaying the information on the number of viewers, it is possible to easily recognize viewer interest or the like in a corresponding broadcast.

Among the plurality of broadcast channel thumbnails of FIG. 9A, the third broadcast channel thumbnail 825 can be the thumbnail of the channel corresponding to the broadcast signal received from the tuner 110, and another broadcast channel thumbnail can be the thumbnail of the channel corresponding to the broadcast signal received from the external device interface 130.

Meanwhile, when the third broadcast channel thumbnail 825 among the plurality of broadcast channel thumbnails is focused, the signal processing device 170 in the image display apparatus 100 can transmit focusing information on the second broadcast channel corresponding to the third broadcast channel thumbnail to the server 500.

The server 500 can transmit focusing information on the second broadcast channel to the mobile terminal 600 accessed through the same login account.

Accordingly, the mobile terminal 600 can be configured to display the screen 930 related to the second broadcast channel including the image 932, based on the focusing information on the second broadcast channel.

When the image 932 in the screen 930 related to the second broadcast channel is selected, the second broadcast channel selection information can be transmitted to the server 500, and the server 500 can transmit second broadcast channel selection information to the image display apparatus 100.

The signal processing device 170 in the image display apparatus 100 can be configured to receive the second broadcast channel selection information, convert the first channel to the second channel as illustrated in FIG. 9B, and display the broadcast image 810 of the second channel. Correspondingly, a broadcast chatting window of the second channel can be displayed on the mobile terminal 600.

FIG. 9B illustrates that the broadcast image 810 of the second channel is displayed.

When the first conversation content 940*b* is input through the keyboard window 920 of the mobile terminal 600, as illustrated in FIG. 9C, the signal processing device 170 in the image display apparatus 100 can be configured to receive the corresponding first conversation content information from the server 500, and display the first conversation content on the broadcast image 810 of the second channel.

FIG. 9B illustrates that the first conversation content is displayed on the broadcast image 810 of the second channel.

When the second conversation content is input from another external device, as illustrated in FIG. 9D, the signal processing device 170 in the image display apparatus 100 can be configured to display the chatting conversation content 850*b* including a second conversation content 852*b* updated on the broadcast image 810 of the second channel.

FIG. 9D illustrates that chatting conversation content 850*b* including the updated second conversation content 852*b* is displayed on the broadcast image 810 of the second channel.

Correspondingly, the mobile terminal 600 logged in with the same login account can be configured to display the updated second conversation content 942 in the chatting window 940*c*.

The signal processing device 170 in the image display apparatus 100 can be configured to adjust a display speed of the updated conversation content.

For example, the signal processing device 170 in the image display apparatus 100 can be configured to decrease the display speed of the updated conversation content as the updated conversation content increases. Accordingly, it is possible to control the visibility of the conversation content to be improved despite an increase in the updated conversation content.

The signal processing device 170 in the image display apparatus 100 can be configured to delay a display time of the updated conversation content from a display time of the updated conversation content of the mobile terminal 600. Accordingly, the visibility of the updated conversation content displayed together with the broadcast image can be improved.

The signal processing device 170 in the image display apparatus 100 can be configured to increase a display time delay of the updated conversation content of the mobile terminal 600 as the updated conversation content increases. Accordingly, the visibility of the updated conversation content displayed together with the broadcast image can be improved.

When the first channel is selected in the mobile terminal 600, the signal processing device 170 of the image display apparatus 100 can be configured to receive first channel information from the server 500 and display the broadcast image of the first channel based on the received first channel information. Accordingly, it is possible to provide the broadcast image of the first channel selected in the mobile terminal 600. This will be described with reference to FIGS. 10A to 10D.

The signal processing device 170 of the image display apparatus 100 can be configured to display the chatting conversation content of the first channel in response to display of the broadcast image of the first channel. Accordingly, it is possible to provide both the broadcast image of the first channel and the chatting conversation content.

Figure 10A:
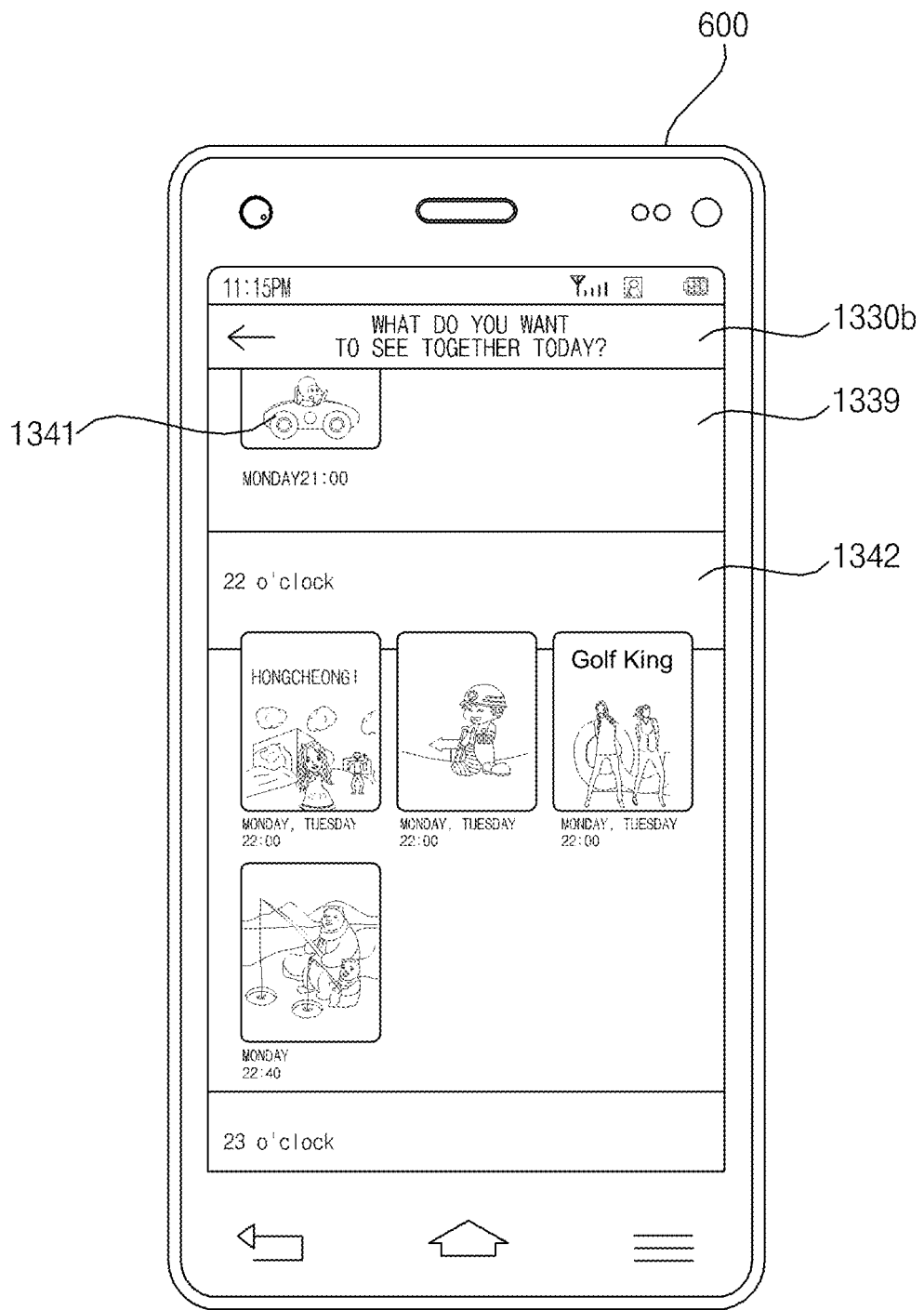

FIG. 10A illustrates that a broadcast chatting application screen 1330*b* is displayed in the mobile terminal 600.

Referring to the drawing, the controller 670 of the mobile terminal 600 can be configured to display a broadcast chatting application screen 1330*b* including a plurality of broadcast program items in time order or channel by channel.

In the drawing, a first program item 1341 of a first time zone 1339 and a plurality of program items of a second time zone 1342 are displayed.

Figure 10B:
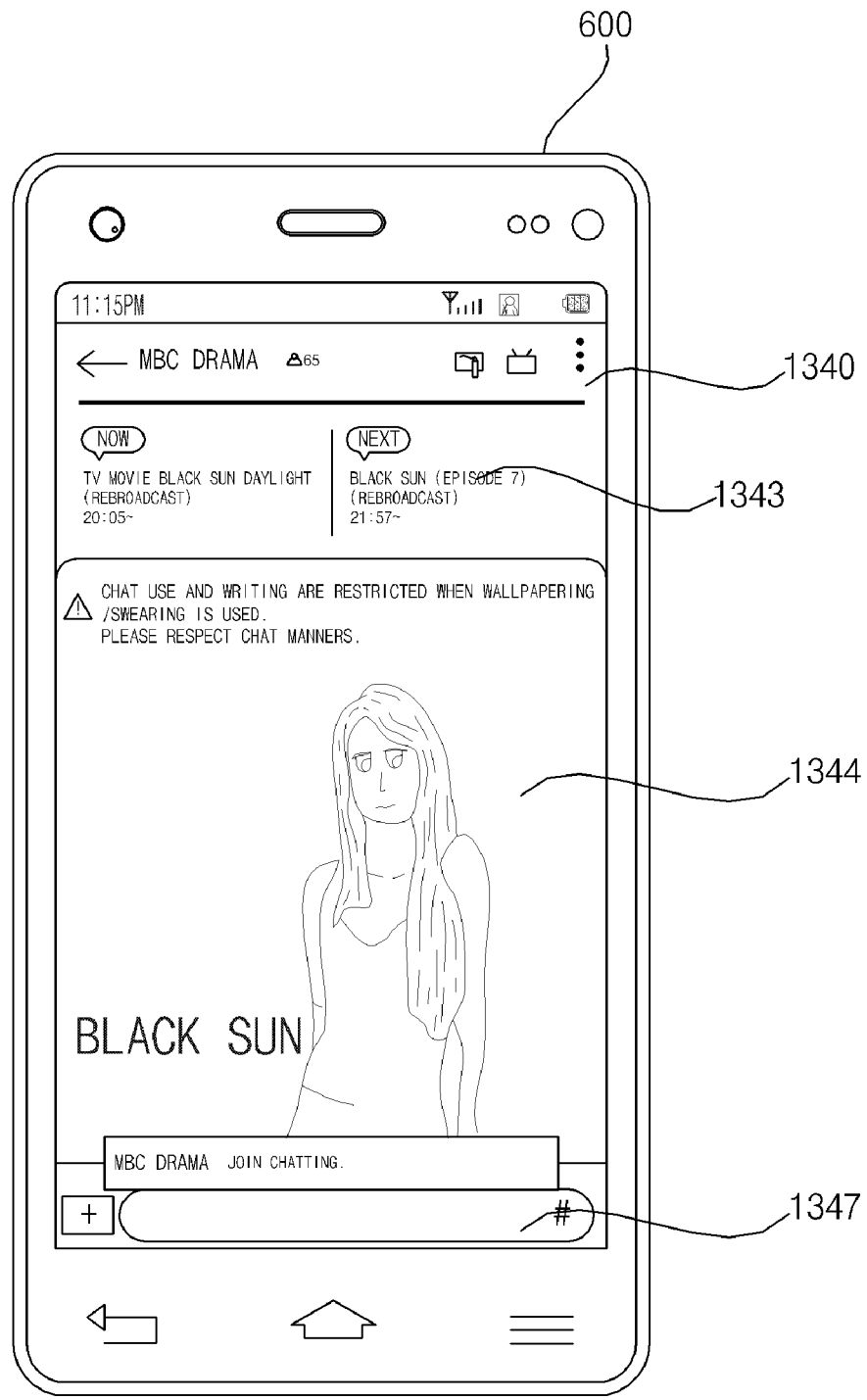

When the first program item 1341 is selected, the controller 670 of the mobile terminal 600 can be configured to display a broadcast related chatting screen 1340 corresponding to the first program item 1341, as illustrated in FIG. 10B.

FIG. 10B illustrates a broadcast related chatting screen 1340 corresponding to the first program item 1341.

The controller 670 of the mobile terminal 600 can be configured to display the broadcast related chatting screen 1340 including a broadcast program related image 1344, a next program item 1343, and a broadcast program related chatting input window 1347 in the broadcast program related screen 1340.

Figure 10C:
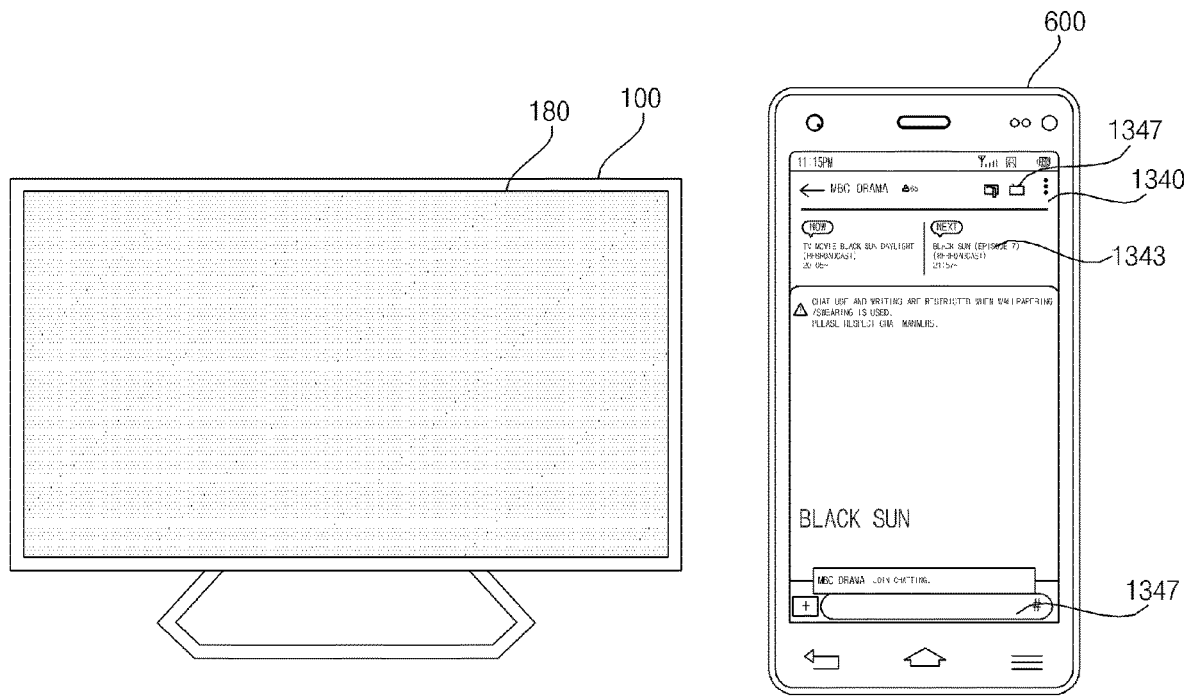

When the broadcast program related image 1344 is selected, the controller 670 of the mobile terminal 600 can transmit corresponding broadcast program selection information to the server 500, and as illustrated in FIG. 10C, can be configured to display the chatting window for the corresponding broadcasting program from the server 500.

FIG. 10C illustrates that the chatting window is displayed instead of the image 1344 in the broadcast related chatting screen.

The server 500 can transmit broadcast program selection information to the image display apparatus 100 in a display off mode.

Figure 10D:
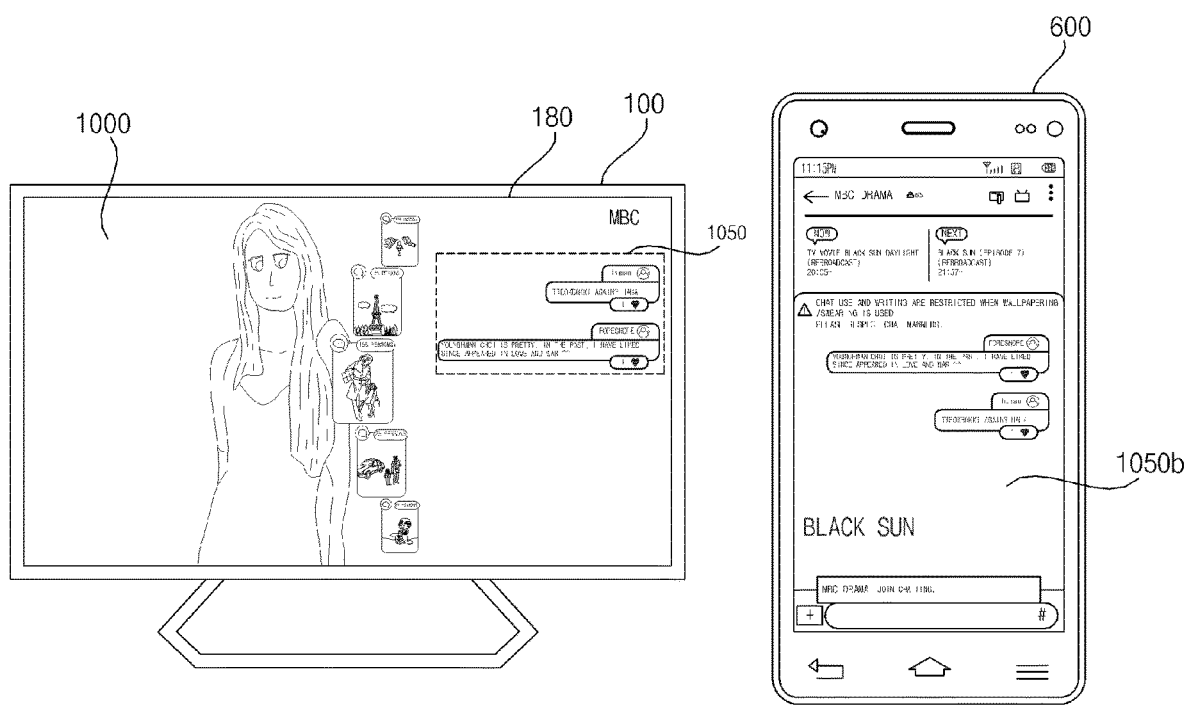

Accordingly, the image display apparatus 100 in the display off mode can be configured to terminate the display off mode after receiving the broadcast program selection information, and display the corresponding broadcast program, as illustrated in FIG. 10D (e.g., the user selection in the mobile terminal 600 can turn on the image display apparatus 100 via the server and control the image display apparatus 100 to start displaying the corresponding broadcast program that was selected by the user via the mobile terminal 600).

FIG. 10D illustrates that a broadcast image 1000 of the selected first channel and a chatting conversation content 1050 of the first channel are displayed in the image display apparatus 100.

That is, the signal processing device 170 in the image display apparatus 100 can be configured to terminate the display off mode after receiving the broadcast program selection information, and display the broadcast image 1000 of the selected first channel and the chatting conversation content 1050 of the first channel.

The mobile terminal 600 logged in with the same account can display the chatting conversation content 1050b of the first channel on the chatting window in the broadcast related chatting screen 1340.

Based on the signal from the remote controller 200, as illustrated in FIG. 10d, the signal processing device 170 can be configured to display the broadcast image 1000 of the first channel and the plurality of broadcast channel thumbnails aligned in the vertical direction together.

The plurality of broadcast channel thumbnails are aligned in the vertical direction, and one of the thumbnails can be focused and displayed in the largest size.

Figure 11A:
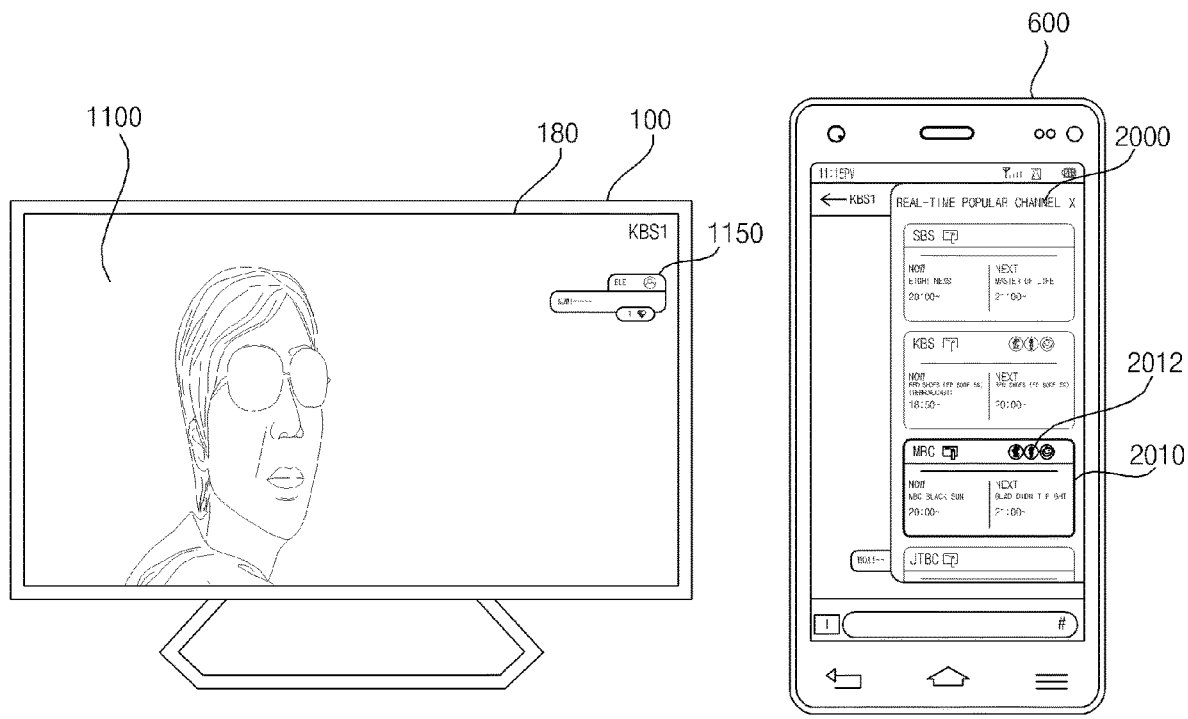

FIG. 11A illustrates that a broadcast image 1100 and a chatting conversation content 1050b are displayed in the image display apparatus 100, and a channel list 2000 including a plurality of channels is displayed in the mobile terminal 600.

When a first channel item 2010 is selected from the channel list 2000 displayed in the mobile terminal 600, the controller 670 of the mobile terminal 600 can transmit the first channel information to the server 500 and the server 500 can transmit the first channel information to the image display apparatus 100.

Figure 11B:
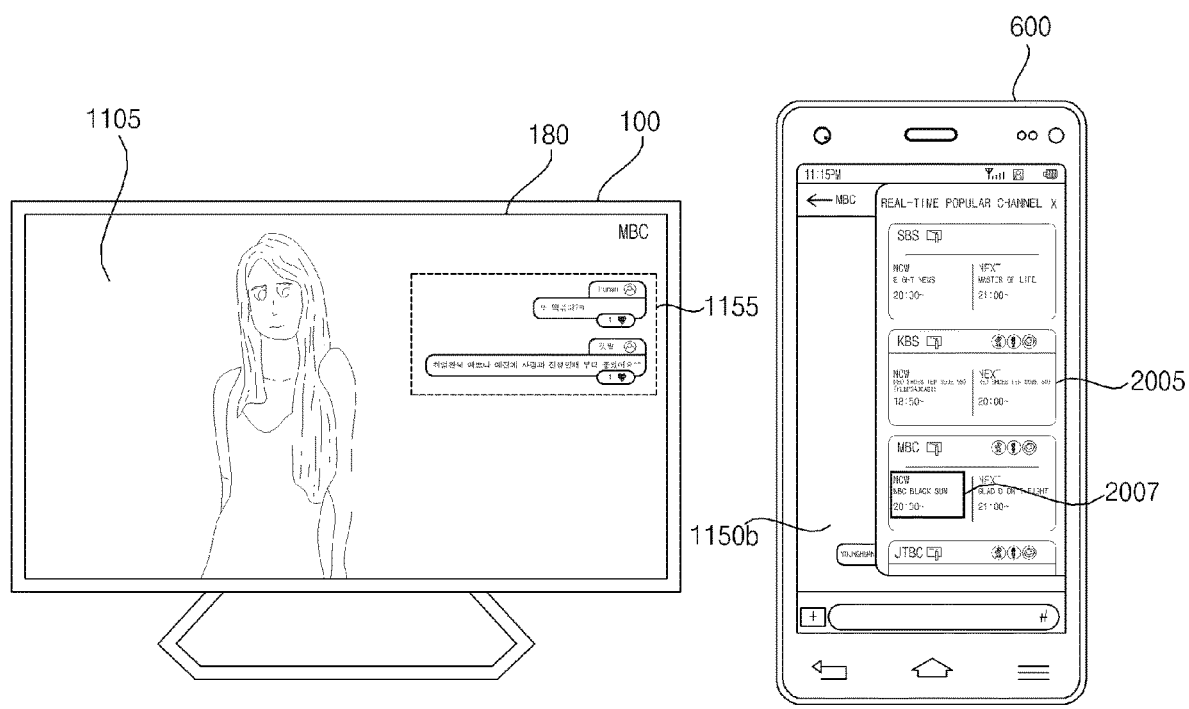

That is, when the first channel is selected in the mobile terminal 600, the signal processing device 170 of the image display apparatus 100 can be configured to receive the first channel information from the server 500 and display the broadcast image 1105 of the first channel, based on the received first channel information, as illustrated in FIG. 11B. Accordingly, it is possible to provide the broadcast image of the first channel selected in the mobile terminal 600.

When the broadcast image 1155 of the first channel is displayed, the signal processing device 170 of the image display apparatus 100 can be configured to display the chatting conversation content 1155 of the first channel together, as illustrated in FIG. 11B. Accordingly, the broadcast image 1105 of the first channel and the chatting conversation content 1155 can be provided together.

FIG. 11B illustrates that the broadcast image 1105 of the first channel and the chatting conversation content 1155 are displayed together in the image display apparatus 100.

When the broadcast image 1105 of the first channel and the chatting conversation content 1155 are displayed in the image display apparatus 100, it is also possible that the first broadcast program item 2007 in the first channel item 2010 of the mobile terminal 600 is highlighted and displayed. Accordingly, it is possible to intuitively check that the broadcast image of the first channel is displayed in the image display apparatus 100.

When the second channel item 2005 is selected from the channel list 2000 displayed in the mobile terminal 600, the controller 670 of the mobile terminal 600 can transmit the second channel information to the server 500, and the server 500 can transmit the second channel information to the image display apparatus 100.

Figure 11C:
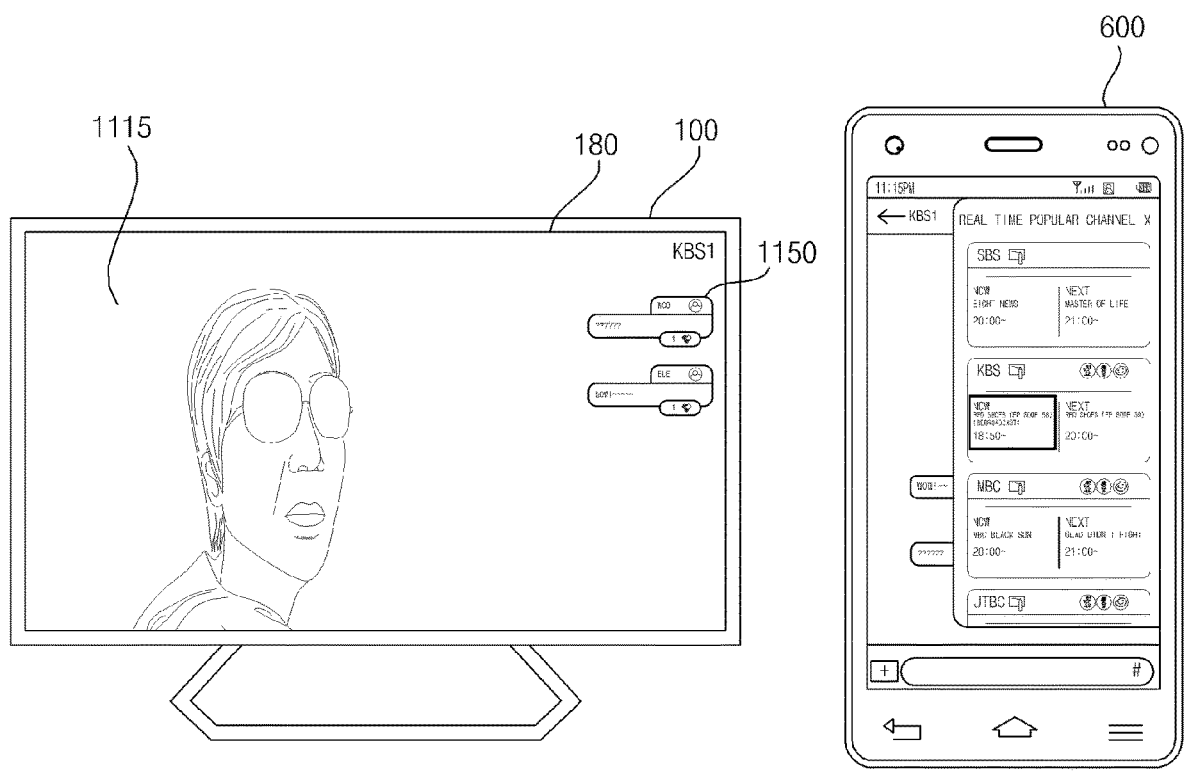

That is, when the mobile terminal 600 selects the second channel, the signal processing device 170 of the image display apparatus 100 can be configured to receive the second channel information from the server 500 and display the broadcast image 1115 of the second, based on the received second channel information, as illustrated in FIG. 11C. Accordingly, it is possible to provide the broadcast image of the second channel selected in the mobile terminal 600.

When the broadcast image 1115 of the second channel is displayed, the signal processing device 170 of the image display apparatus 100 can be configured to display the chatting conversation content 1150 of the second channel together, as illustrated in FIG. 11C. Accordingly, the broadcast image 1115 of the second channel and the chatting conversation content 1150 can be provided together.

FIG. 11C illustrates that the broadcast image 1115 of the second channel and the chatting conversation content 1150 are displayed together in the image display apparatus 100.

Figure 12A:
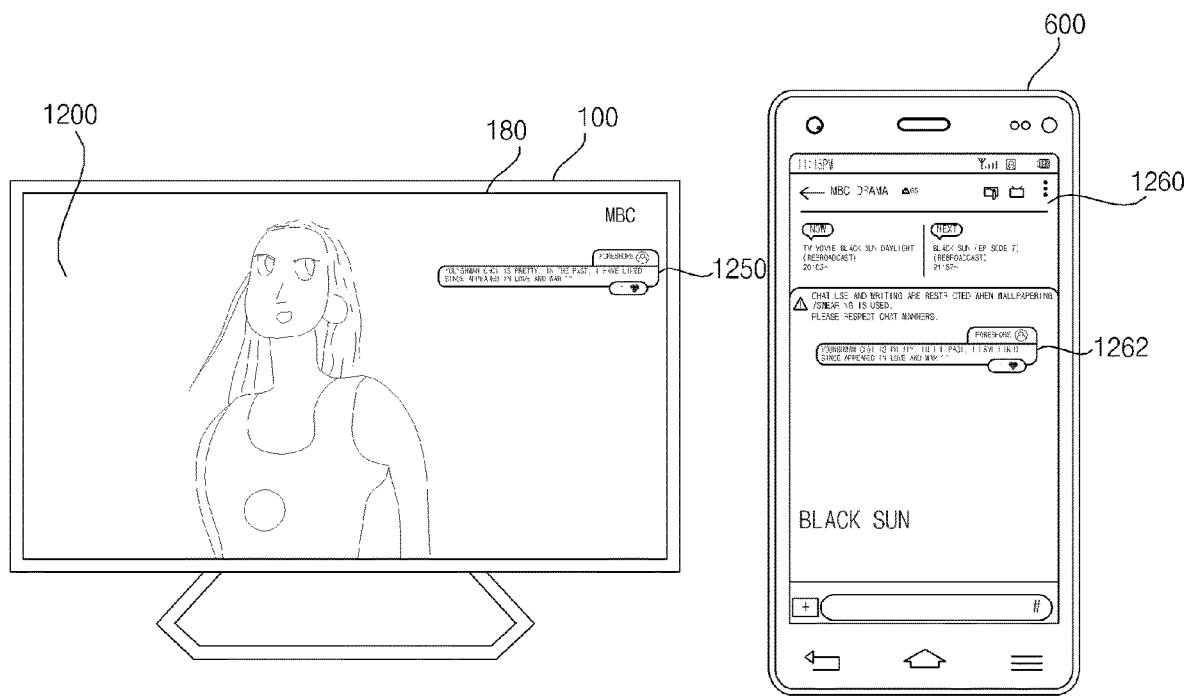

FIG. 12A illustrates that the broadcast image 1200 of the first channel and the chatting conversation content 1250 displayed together in the image display apparatus 100, and the chatting conversation content 1260 of the first channel is displayed in the mobile terminal 600.

When a preference item or recommendation item for the first chatting conversation content is selected from among the displayed chatting conversation contents 1250, based on the signal from the remote controller 200, the signal processing device 170 of the image display apparatus 100 can be configured to transmit preference or recommendation information for the first chatting conversation content to the server 500, and display an increased number of preferences or recommendations for the first chatting conversation content. Accordingly, it is possible to provide the increased number of preferences or recommendations for the first chatting conversation content.

Figure 12B:
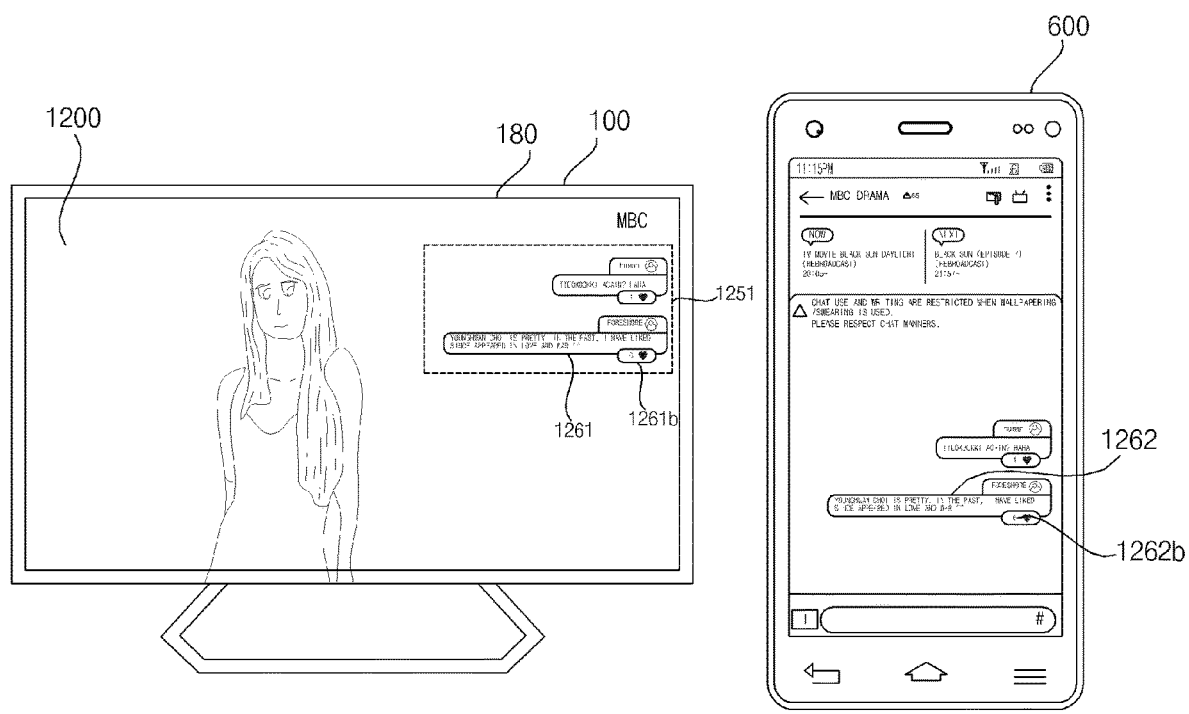
Figure 12C:
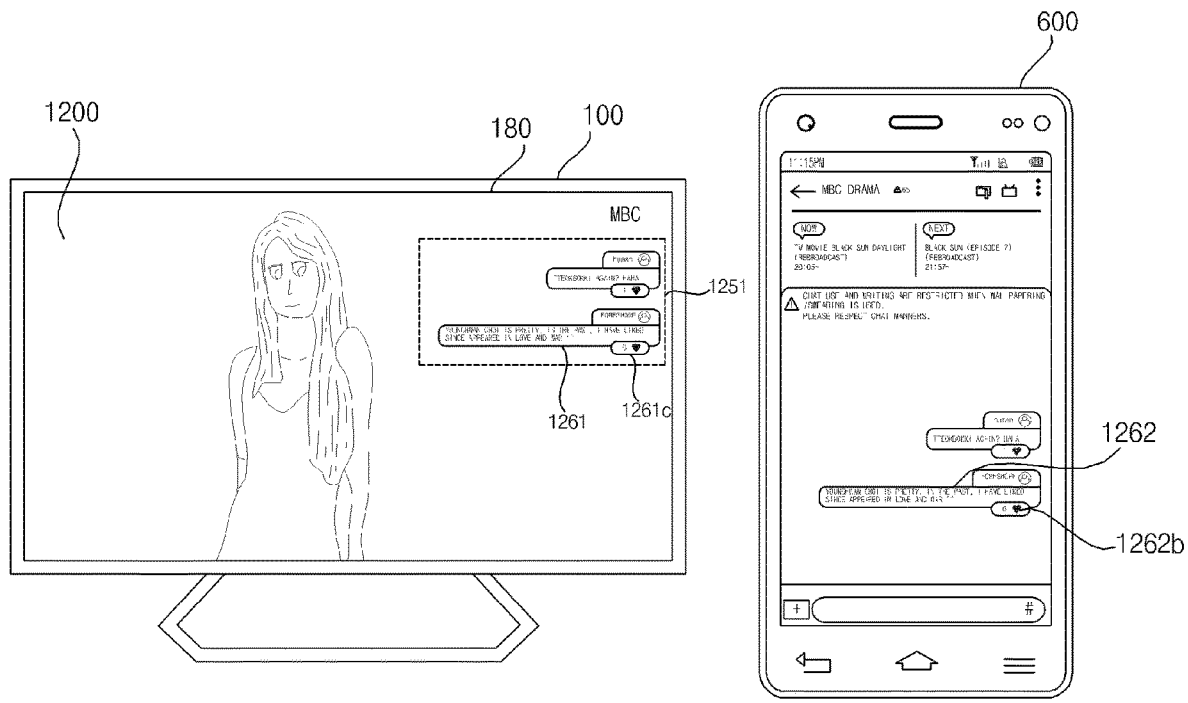

As illustrated in FIG. 12B, when the preference item or recommendation item 1262b for the first chatting conversation content 1262 is selected from among the plurality of chatting conversation contents displayed in the mobile terminal 600, the signal processing device 170 of the image display apparatus 100 can be configured to display the increased number of preferences or recommendations of the first chatting conversation content, as illustrated in FIG. 12C. Accordingly, it is possible to provide the increased number of preferences or recommendations for the first chatting conversation content.

FIG. 12B illustrates that the number of preference items or recommendation items 1262*b* of the first chatting conversation content 1262 among the plurality of chatting conversation contents displayed in the mobile terminal 600 is six.

When the preference item or a recommendation item 1262*b* of the first chatting conversation content 1262 is selected from among the plurality of chatting conversation contents, the controller 670 of the mobile terminal 600 can transmit selection information of the first chatting conversation content item to the server 500, receive an increased number of preferences or recommendations from the server 500, and display the increased number of preferences or recommendations, as illustrated in FIG. 12C.

Correspondingly, the signal processing device 170 of the image display apparatus 100 can receive the increased number of preferences or recommendations from the server 500, and as illustrated in FIG. 12C, can be configured to increase the number of preferences or recommendations of preference items or recommendation items 1261*b* of the first chatting conversation content 1261 among the plurality of chatting conversation contents.

FIG. 12C illustrates that the number of preference items or recommendation items 1262*b* of the first chatting conversation content 1262 among a plurality of chatting conversation contents displayed in the mobile terminal 600 is nine.

That is, in addition to selection of the preference item or recommendation item 1262*b* of the first chatting conversation content 1262 of the mobile terminal 600, the preference item or recommendation item 1262*b* of the first chatting conversation content 1262 is selected from another external device, and thus, compared to FIG. 12B, the number of preference items or recommendation items 1262*b* can increase from six to nine.

Figure 13A:
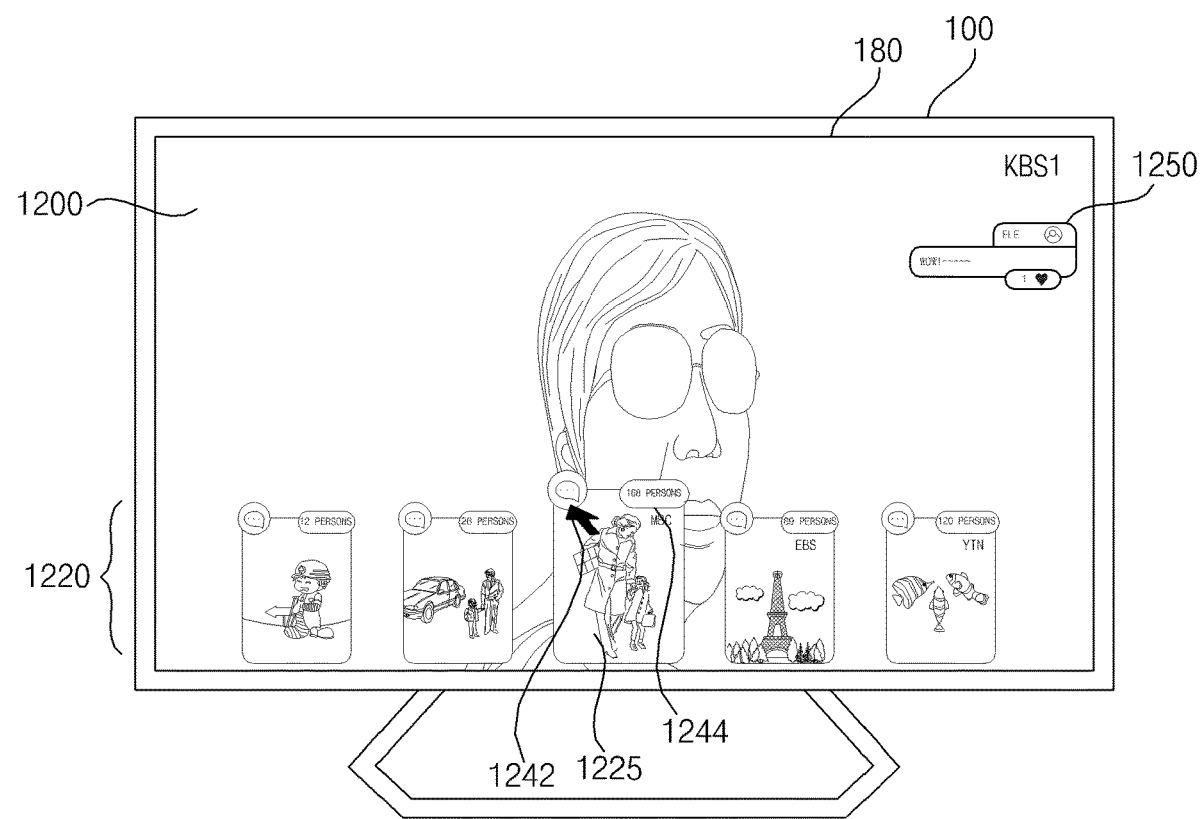
Figure 13B:
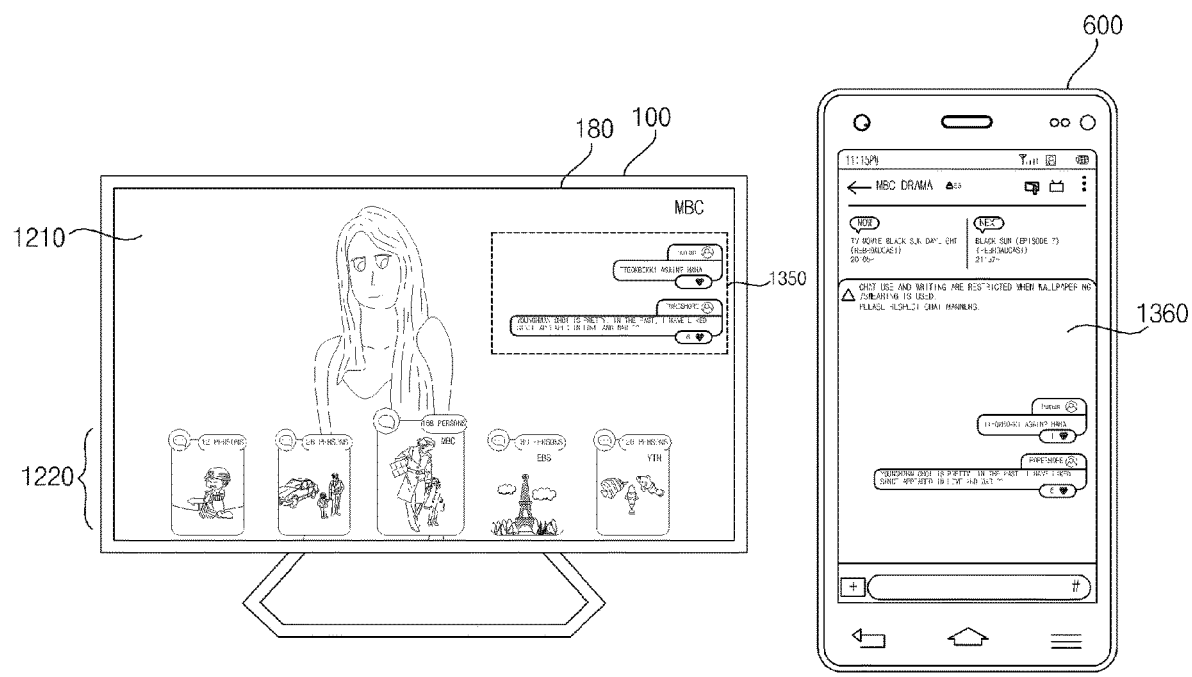

FIGS. 13A to 13B illustrate that the image display apparatus 100 and the mobile terminal 600 access the server 500 with the same login account.

FIG. 13A illustrates that the broadcast image 1200 and the plurality of broadcast channel thumbnails 1220 are displayed in the image display apparatus 100 based on a broadcast chatting application.

At this time, the signal processing device 170 of the image display apparatus 100 can be configured to display the chatting conversation content 1250 corresponding to the broadcast image 1200 together.

The signal processing device 170 of the image display apparatus 100 can be configured to include some of the plurality of broadcast channel thumbnails 1220 the broadcast video image 1225, the object 1242 representing the chatting window, and the information on the number of viewers 1244.

In this way, by displaying the object 1242 representing the chatting window, when a specific broadcast channel thumbnail is selected, it is possible to easily recognize that the chatting conversation content related to the corresponding broadcast image can be provided.

By displaying the information on the number of viewers 1244, it is possible to easily recognize the interest of the viewer in the corresponding broadcast.

The signal processing device 170 of the image display apparatus 100 can be configured to display the chatting conversation content on the preview screen when the object 1242 representing the chatting window is focused.

When the object 1242 representing the chatting window is selected by the remote controller 200 as illustrated in FIG. 13A, the signal processing device 170 of the image display apparatus 100 can be configured to perform a broadcasting screen conversion to a corresponding channel, as illustrated in FIG. 13*b*.

FIG. 13B illustrates that the broadcast image 1210 corresponding to the channel selected by the image display apparatus 100 and the chatting conversation content 1350 corresponding to the corresponding channel are displayed.

That is, the signal processing device 170 of the image display apparatus 100 can be configured to display the broadcast image 1210 corresponding to the channel selected in the image display apparatus 100 and the chatting conversation content 1350 corresponding to the corresponding channel together.

The mobile terminal 600 logged in with the same account can synchronize with the image display apparatus 100 and display chatting conversation content 1360 corresponding to the selected channel. Accordingly, the chatting conversation content of the same broadcast image can be provided to the image display apparatus 100 and the mobile terminal 600.

Figure 14A:
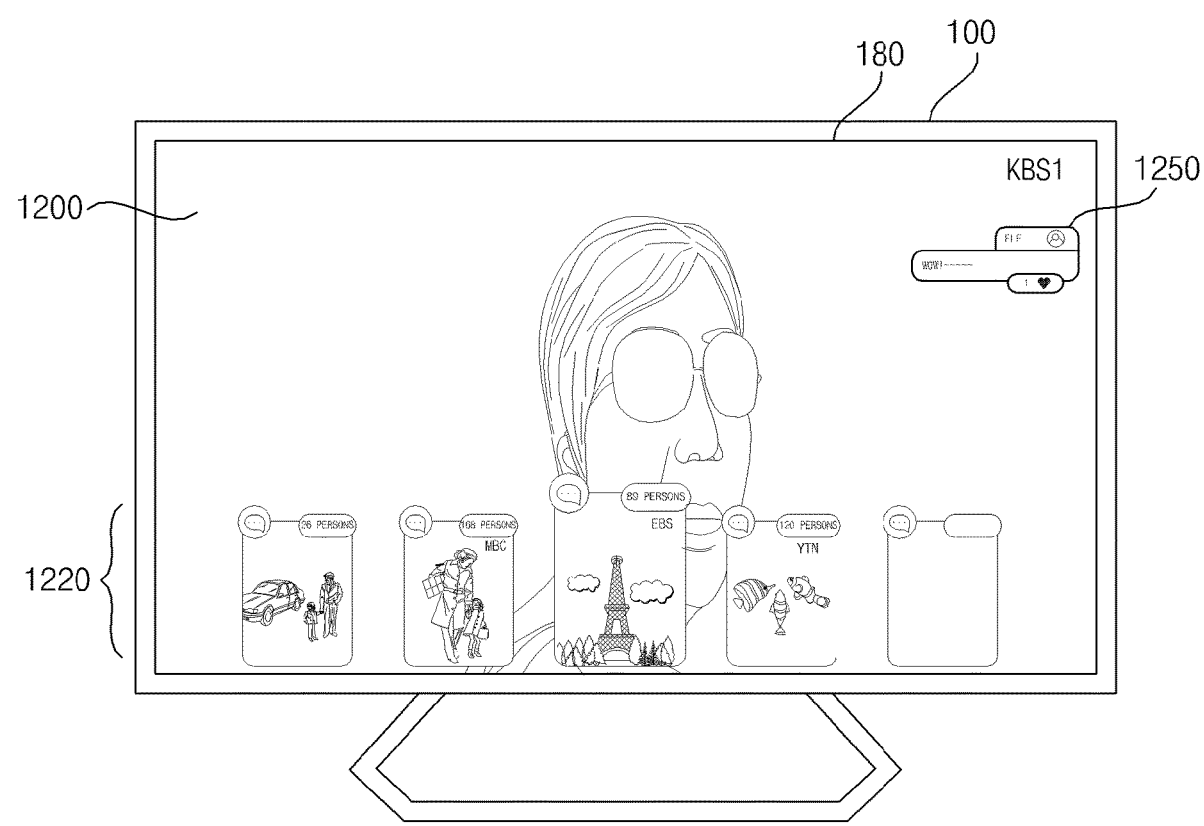
Figure 14B:
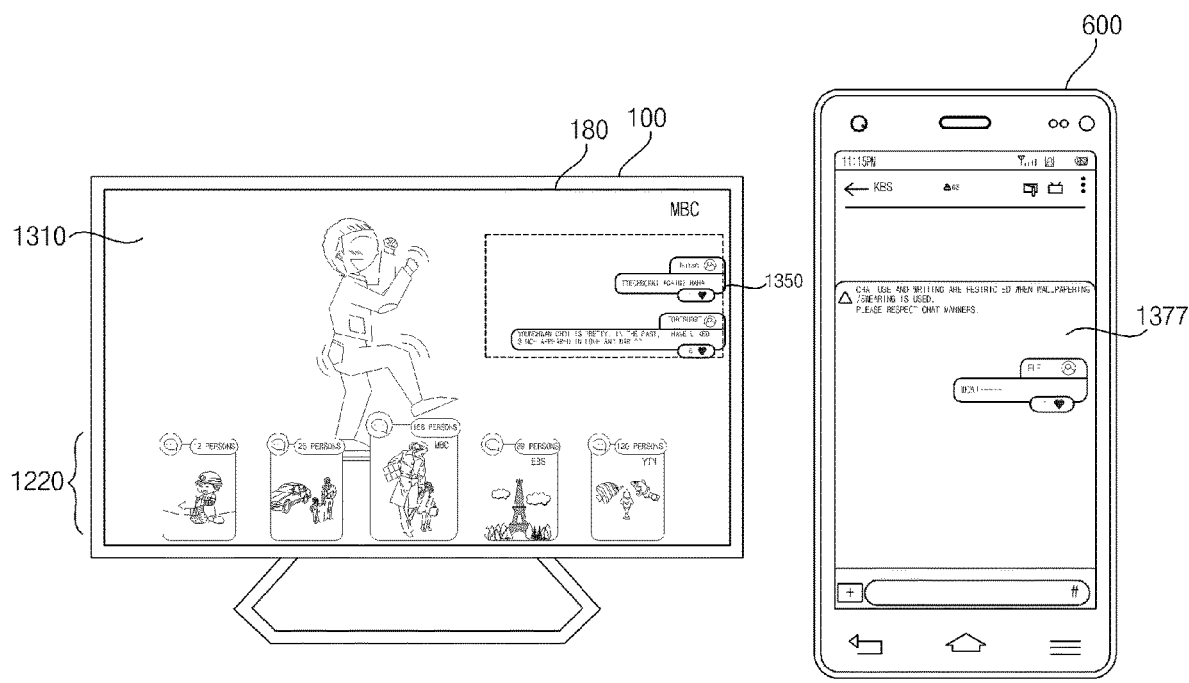

FIGS. 14A to 14B illustrate that the image display apparatus 100 and the mobile terminal 600 access the server 500 with different login accounts.

FIG. 14A illustrates that the broadcast image 1200 and the plurality of broadcast channel thumbnails 1220 are displayed in the image display apparatus 100 based on a broadcast chatting application.

In this case, the signal processing device 170 of the image display apparatus 100 can be configured to display the chatting conversation content 1250 corresponding to the broadcast image 1200 together.

When any one of the plurality of broadcast channel thumbnails 1220 is selected by the remote controller 200, as illustrated in FIG. 14B, the signal processing device 170 of the image display apparatus 100 can be configured to perform the broadcasting screen conversion to the corresponding channel.

FIG. 14B illustrates that the broadcast image 1310 corresponding to a channel selected by the image display apparatus 100 and the chatting conversation content 1350 corresponding to the corresponding channel are displayed.

That is, the signal processing device 170 of the image display apparatus 100 can be configured to display the broadcast image 1310 corresponding to the channel selected in the image display apparatus 100 and chatting conversation content 1350 corresponding to the corresponding channel together.

The mobile terminal 600 logged in with another account may not be synchronized with the image display apparatus 100 and can display the chatting conversation content 1377 corresponding to the channel before the selection as it is. Accordingly, the chatting conversation content of different broadcast images can be provided to the image display apparatus 100 and the mobile terminal 600.

Figure 15:
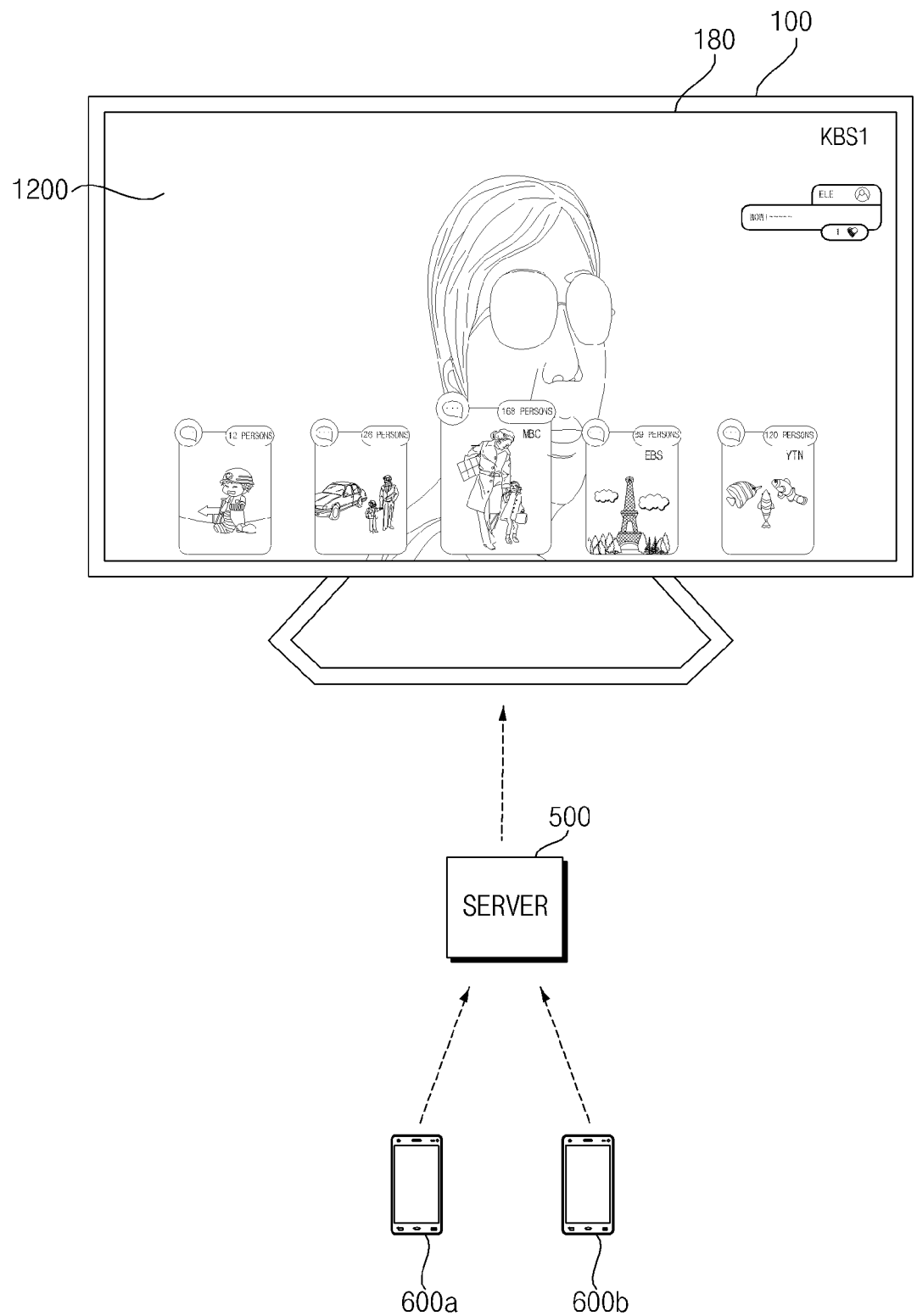

FIG. 15 illustrates accessing the server 500 based on the first login information of the first mobile terminal 600*a* and the second login information of the second mobile terminal 600*b*.

The signal processing device 170 of the image display apparatus 100 can receive the first login information of the first mobile terminal 600*a* and the second login information of the second mobile terminal 600*b* from the server 500, display a screen for selecting one of first login information of a first mobile terminal 600*a* and second login information of a second mobile terminal 600*b*, and select any one login information.

The signal processing device 170 of the image display apparatus 100 can receive the chatting conversation content based on the corresponding login information from the server 500 based on the selected login information.

The signal processing device 170 of the image display apparatus 100 can be configured to display the broadcast image 1200 corresponding to the channel selected in the corresponding mobile terminal, based on the selected login information.

For example, when the second login information of the second mobile terminal 600*b* is selected, the signal processing device 170 of the image display apparatus 100 accesses the server 500 based on the second login information of the second mobile terminal 600*b*, and can be configured to display the broadcast image 1200 corresponding to the channel selected in the second mobile terminal 600*b* and the chatting conversation content of the corresponding channel.

The signal processing device 170 of the image display apparatus 100 can select any one of the first login information of the first mobile terminal 600*a* and the second login information of the second mobile terminal 600*b* based on importance, priority, or first-come, first-served order.

The signal processing device 170 of the image display apparatus 100 can change the login information while viewing the broadcast image 1200.

When a product item or a music item is selected from the chatting conversation content, the signal processing device 170 of the image display apparatus 100 can be configured to display information on the product item or music item in the mobile terminal 600. Accordingly, information on a product item or a music item can be obtained using the mobile terminal 600. This will be described with reference to FIGS. 16A to 18D.

Figure 16A:
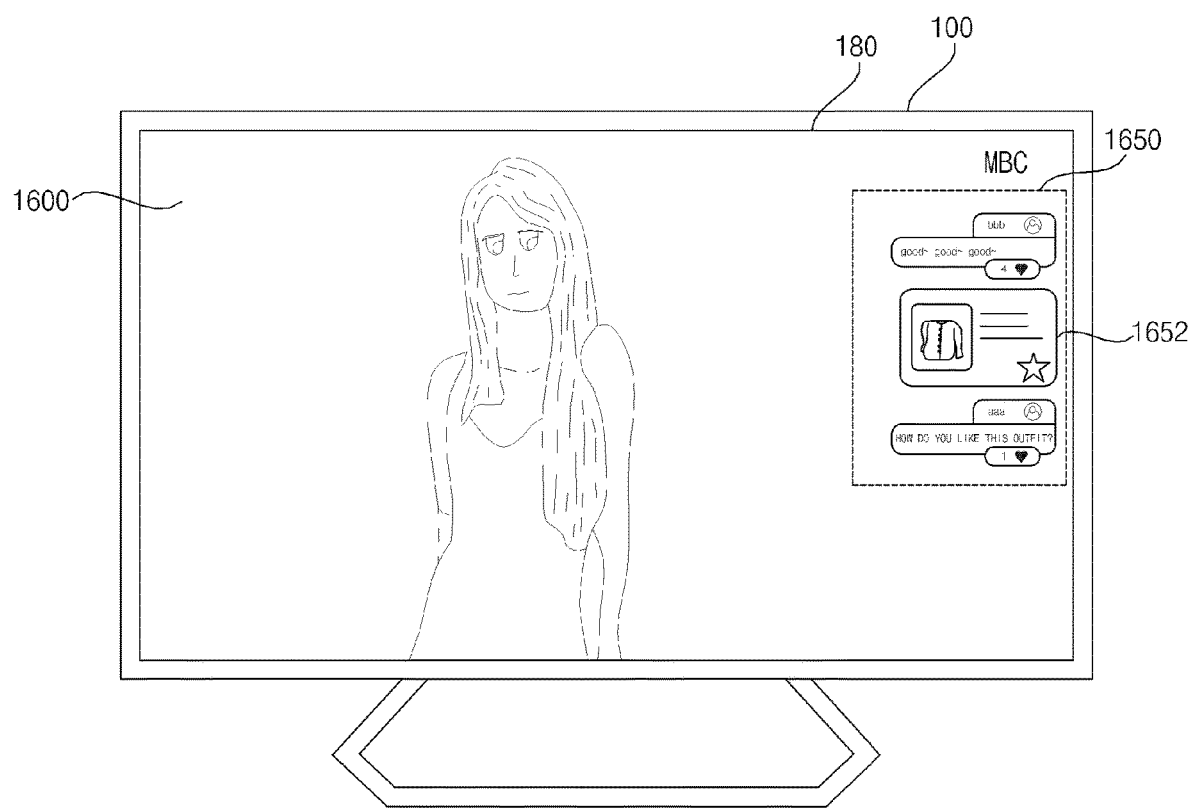

FIG. 16A illustrates that the broadcast image 1600 of a predetermined channel and the chatting conversation content 1650 of the corresponding channel are displayed in the image display apparatus 100.

When the product item 1652 is selected from the chatting conversation content 1650, the signal processing device 170 of the image display apparatus 100 can perform a control operation to transmit the information on the product item to the server 500.

Figure 16B:
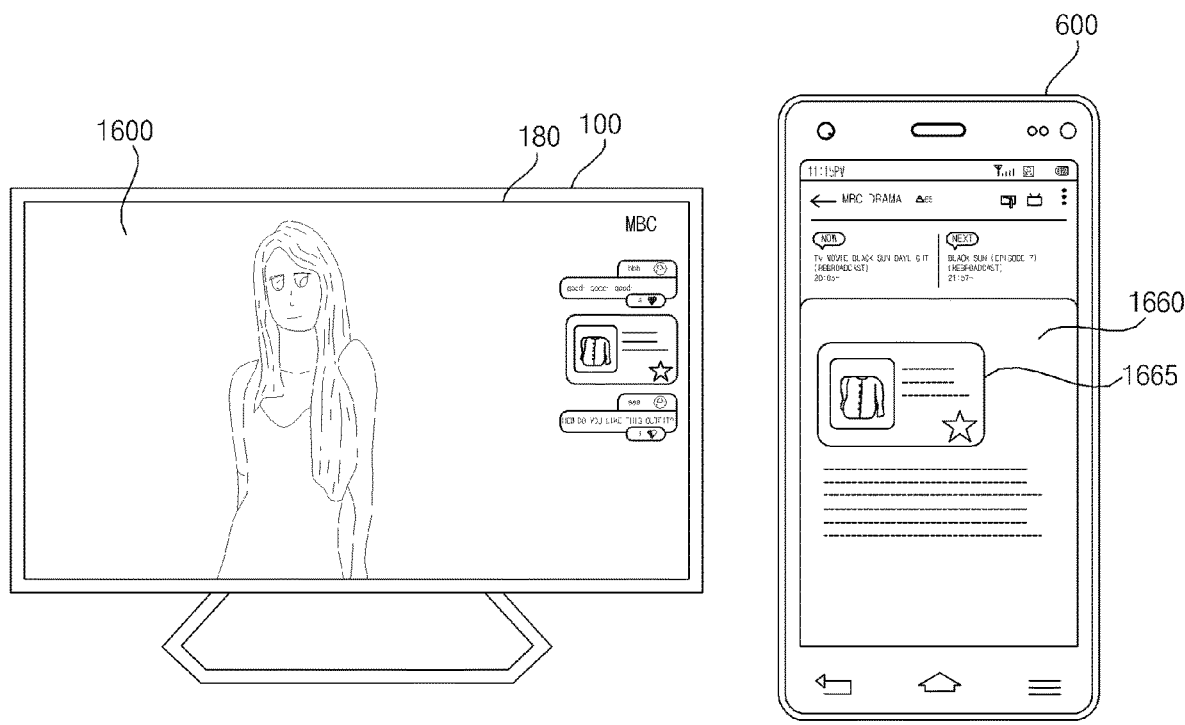

Accordingly, the mobile terminal 600 logged in with the same account can receive information on the selected product item and display a screen 1660 on the product item as illustrated in FIG. 16B.

Figure 16C:
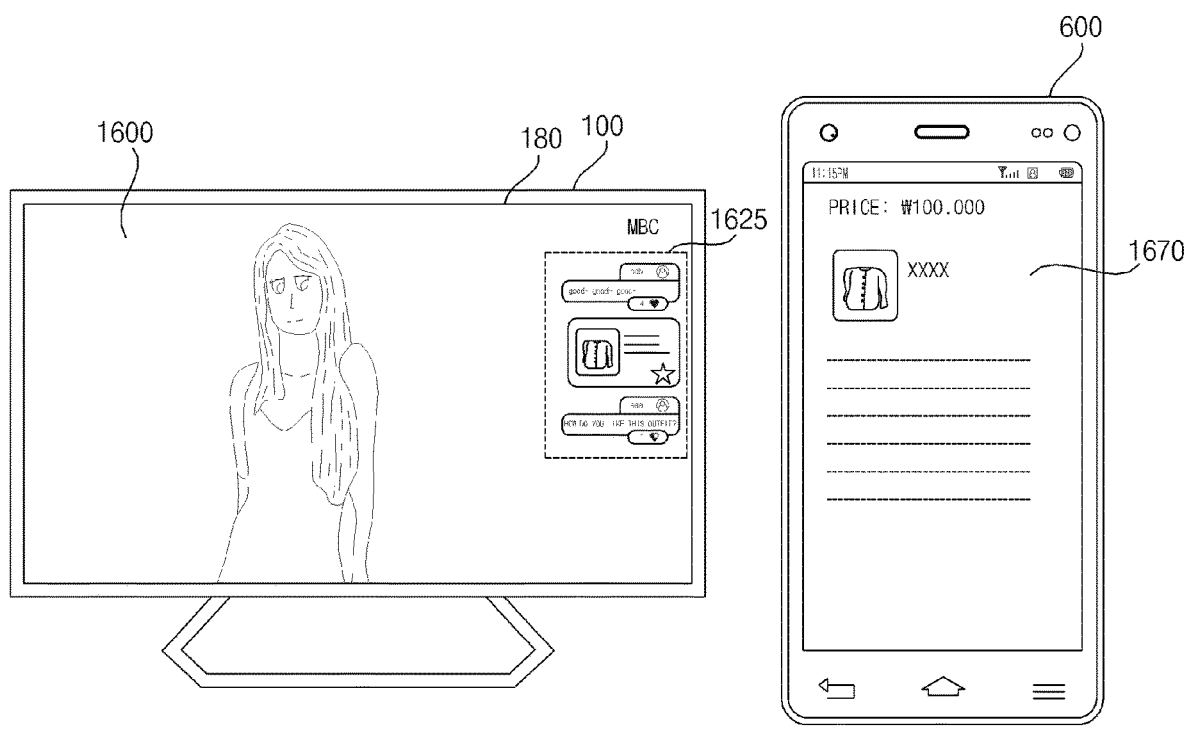

When a product image 1655 is selected from the screen 1660 for a product item, the mobile terminal 600 can be configured to a product screen 1670 is displayed, as illustrated in FIG. 16C.

Figure 17A:
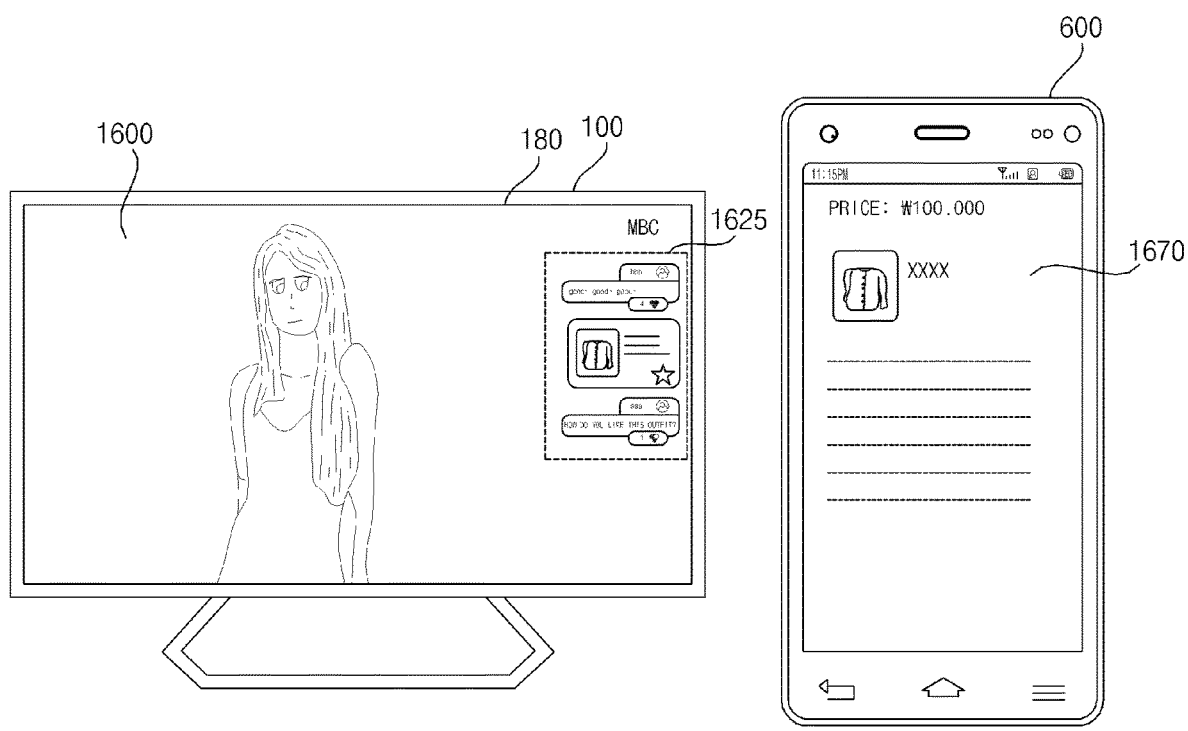

FIG. 17A illustrates that the product screen 1670 is displayed in the mobile terminal 600.

Figure 17B:
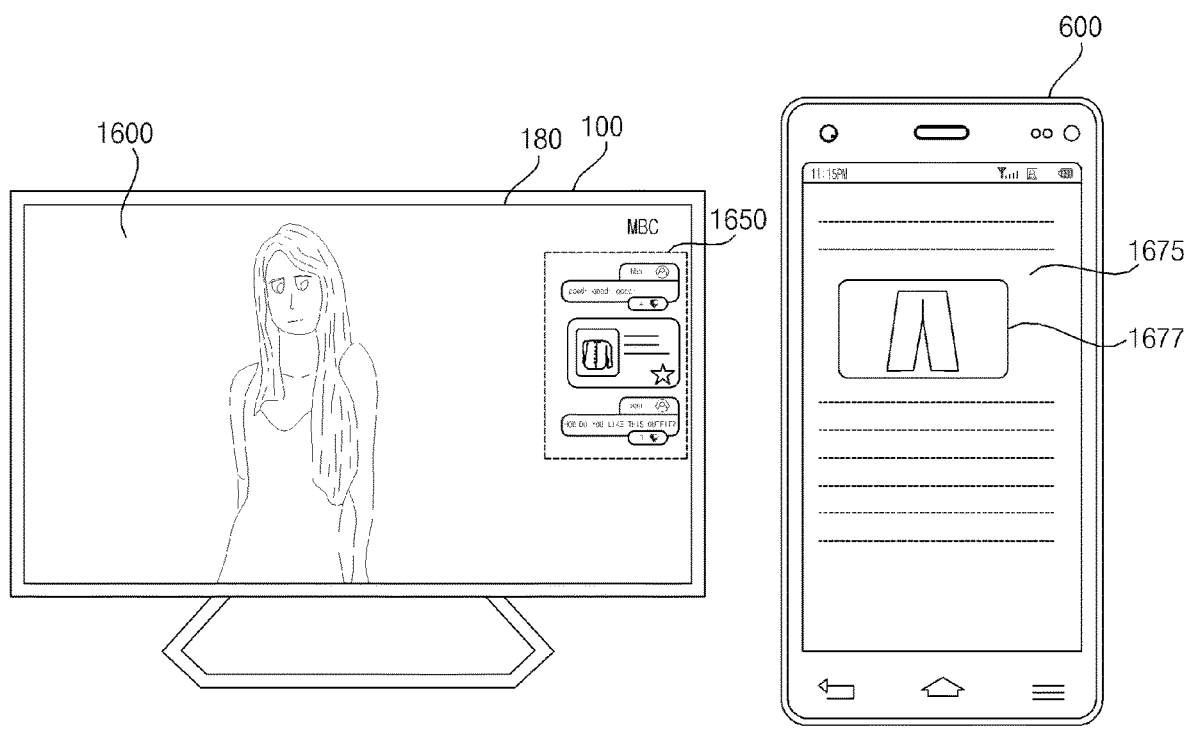

When a detailed information item in the product screen 1670 is selected, the mobile terminal 600 can be configured to display a product detailed information screen 1675 including product detailed information 1677, as illustrated in FIG. 17B.

Figure 17C:
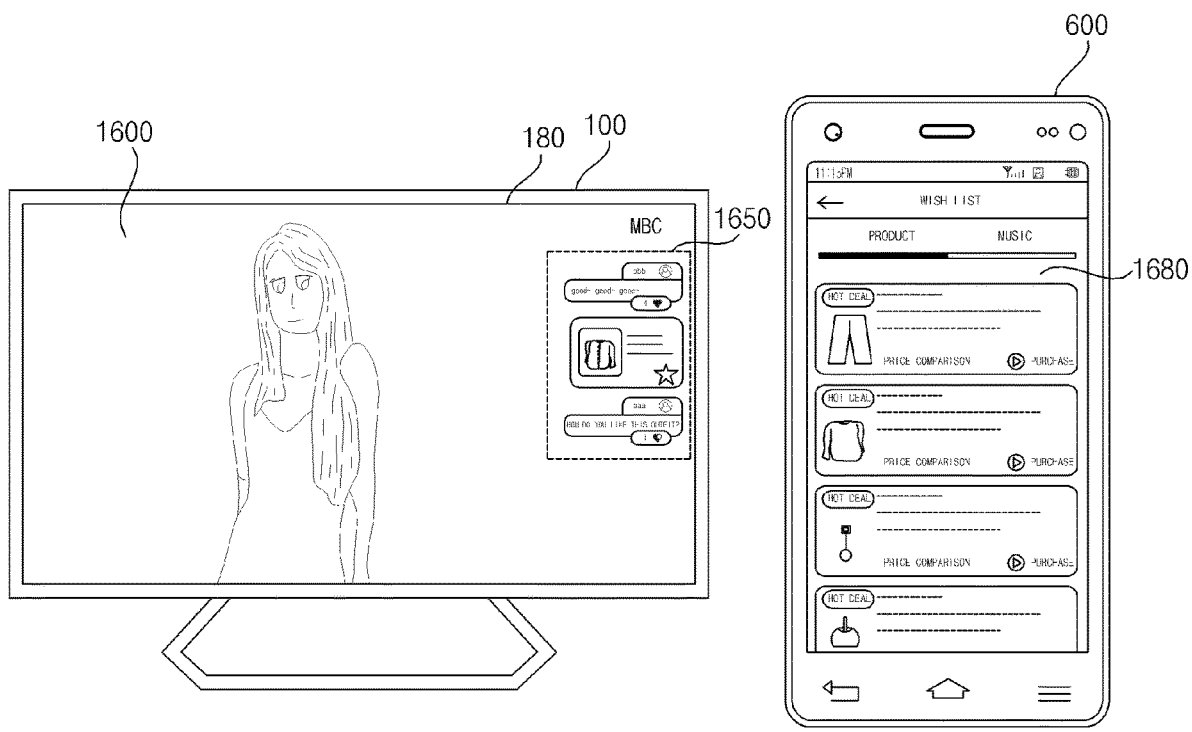

Alternatively, when a purchase item in the product screen 1670 is selected, the mobile terminal 600 can be configured to display a price comparison screen 1680 for price comparison when purchasing a product, as illustrated in FIG. 17C.

Figure 17D:
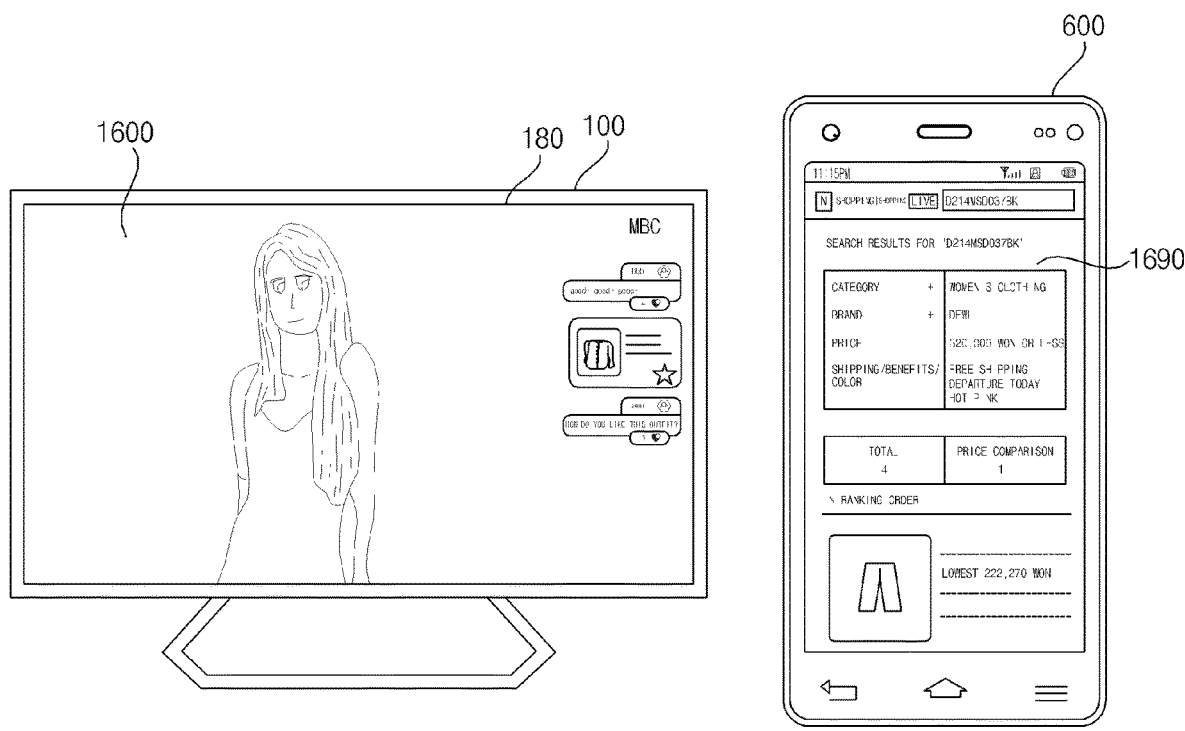

Alternatively, when the purchase item in the product screen 1670 is selected, the mobile terminal 600 can be configured to display the purchase screen 1690 for purchasing a product, as illustrated in FIG. 17D.

Accordingly, using the mobile terminal 600, it is possible to check detailed information on a product or purchase a product.

Figure 18A:
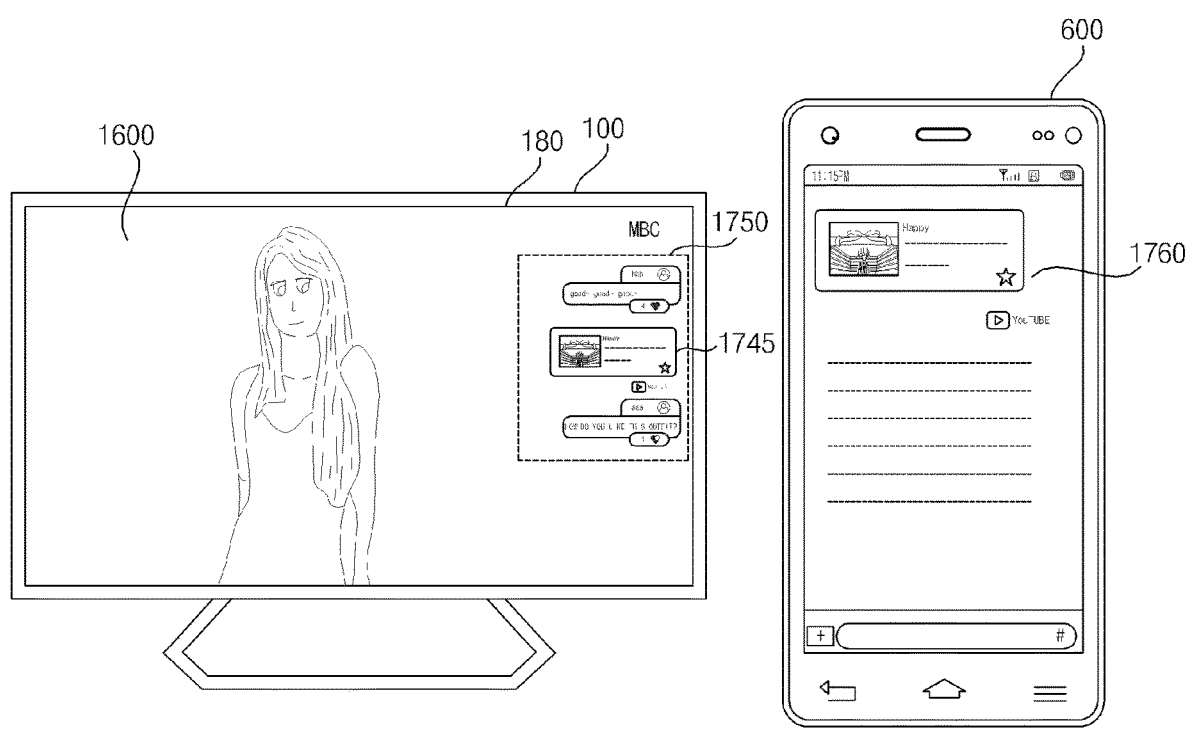

FIG. 18A illustrates that the broadcast image 1600 of a predetermined channel and the chatting conversation content 1750 of the corresponding channel are displayed in the image display apparatus 100.

When a music item 1745 is selected from the chatting conversation content 1750, the signal processing device 170 of the image display apparatus 100 can perform a control operation to transmit information on the music item to the server 500.

Accordingly, the mobile terminal 600 logged in with the same account can receive information on the selected music item and display the screen 1760 on the music item as illustrated in FIG. 18A.

When a favorite item is selected from the screen 1760 for music items of the mobile terminal 600, the mobile terminal 600 can transmit favorite information on the corresponding music to the server 500 and the server 500 can transmit the favorite information to the image display apparatus 100.

Accordingly, the signal processing device 170 of the image display apparatus 100 can perform a control operation to receive favorite information and store the corresponding music item as a favorite.

Figure 18B:
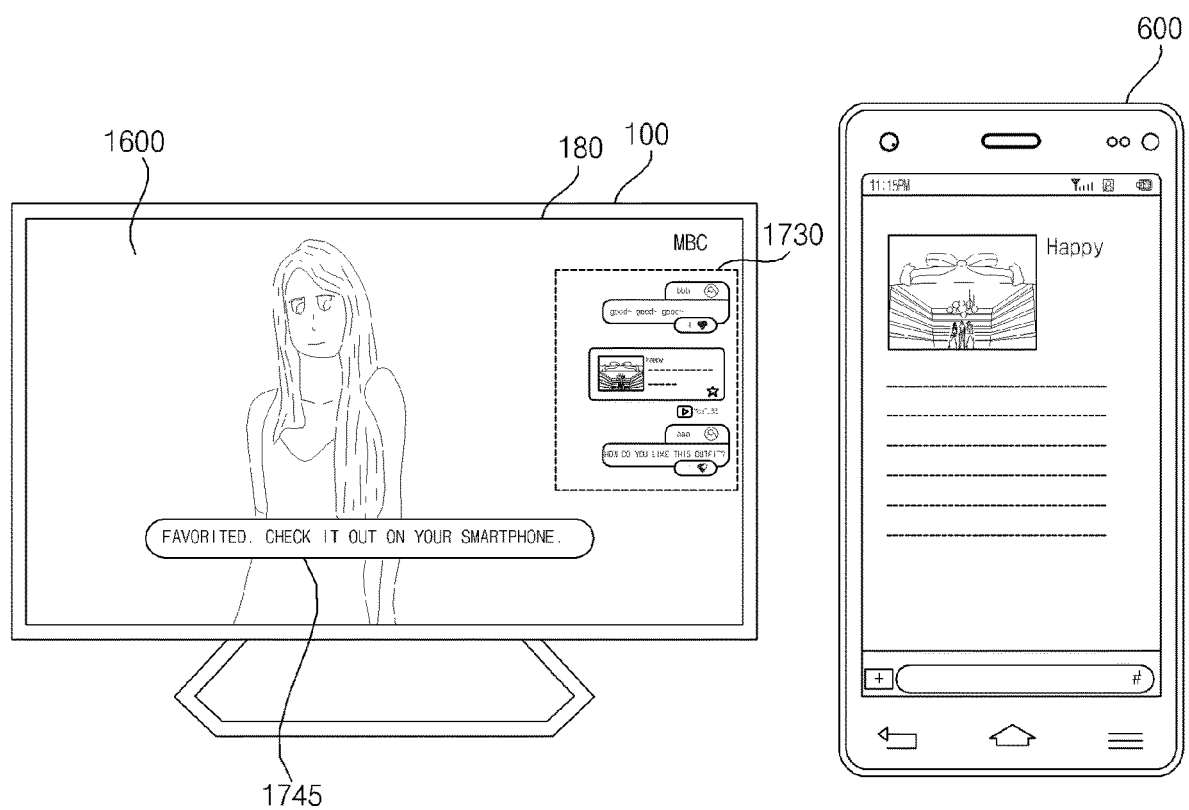

The signal processing device 170 of the image display apparatus 100 can be configured to display an object 1745 indicating that the corresponding music item is stored as a favorite as illustrated in FIG. 18B.

Alternatively, when there is a favorite save input for the music item 1745, the signal processing device 170 of the image display apparatus 100 can be configured to display the corresponding music item is stored as a favorite, and as illustrated in the drawing, the object 1745 indicating that the corresponding music item is saved as a favorite.

The signal processing device 170 of the image display apparatus 100 can perform a control operation to transmit favorite information on the music item 1745 to the server 500, and the server 500 can transmit the favorite information to the mobile terminal 600.

Figure 18C:
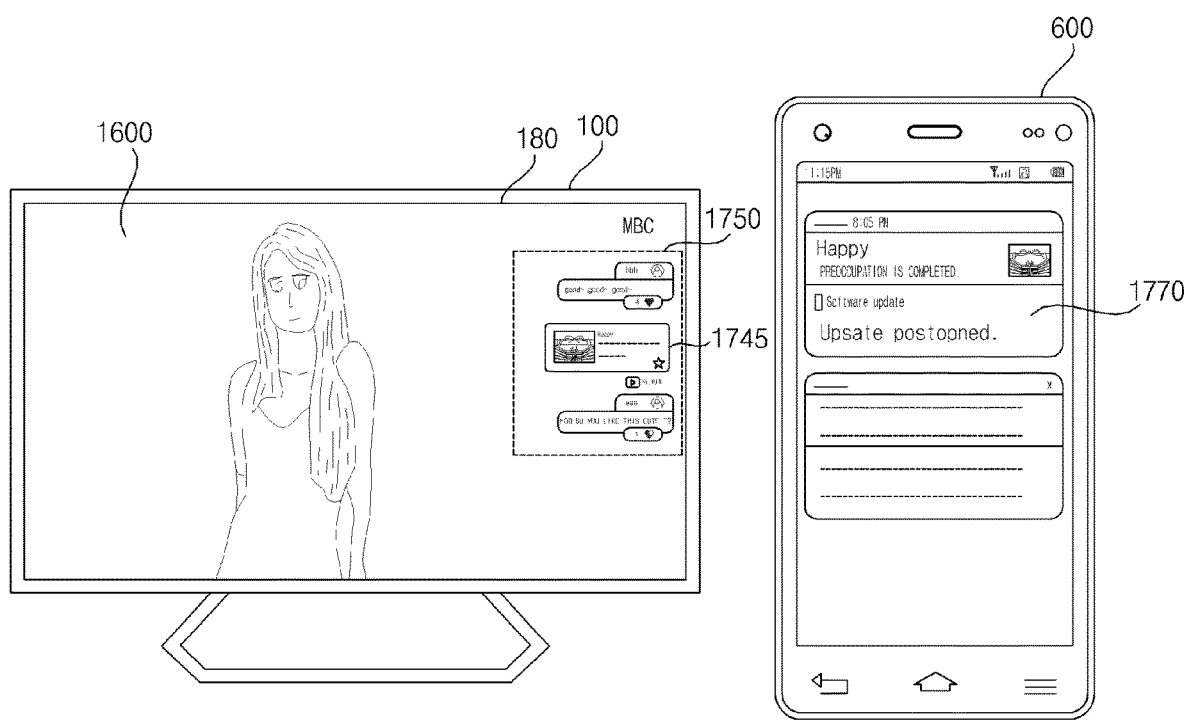

Correspondingly, the mobile terminal 600 can receive favorite information and store the corresponding music item 1770 as a favorite, as illustrated in FIG. 18C.

Accordingly, the image display apparatus 100 and the mobile terminal 600 logged in with the same account can share the same music information.

Figure 18D:
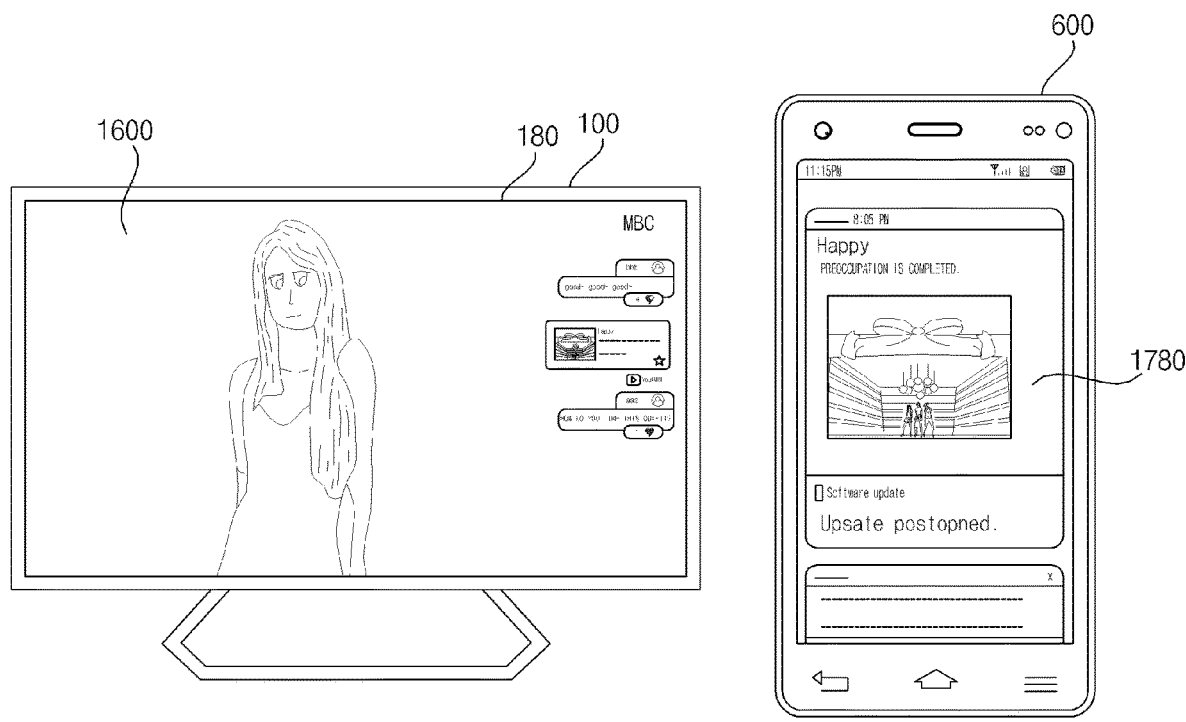

Meanwhile, when there is a selection of the corresponding music item 1770 in the mobile terminal 600, reproduction of the music item 1770 can be performed as illustrated in FIG. 18D. Accordingly, it is possible to simply reproduce and listen to the music item 1770 through the mobile terminal 600 instead of the image display apparatus 100.

Figure 19A:
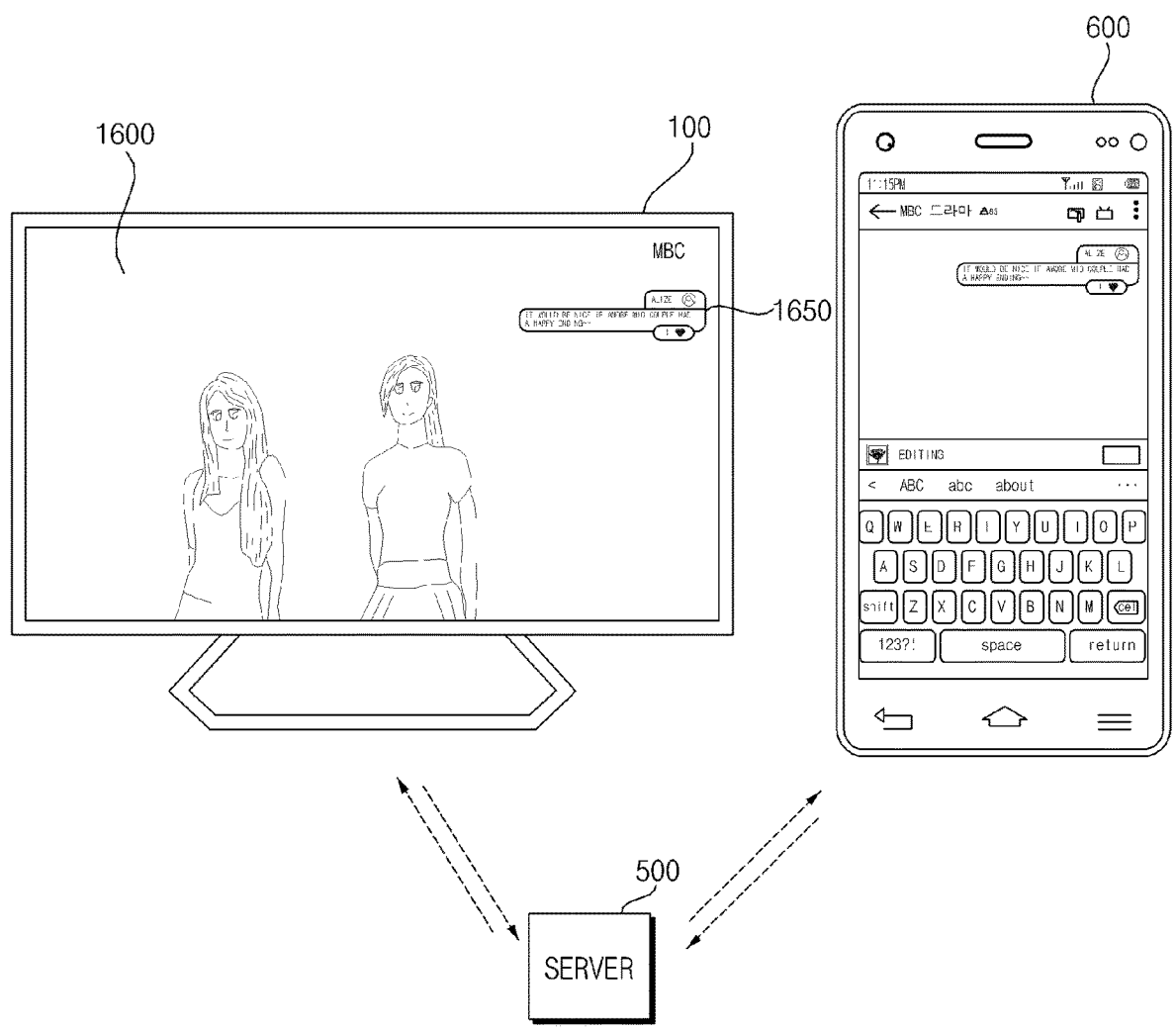
Figure 19B:
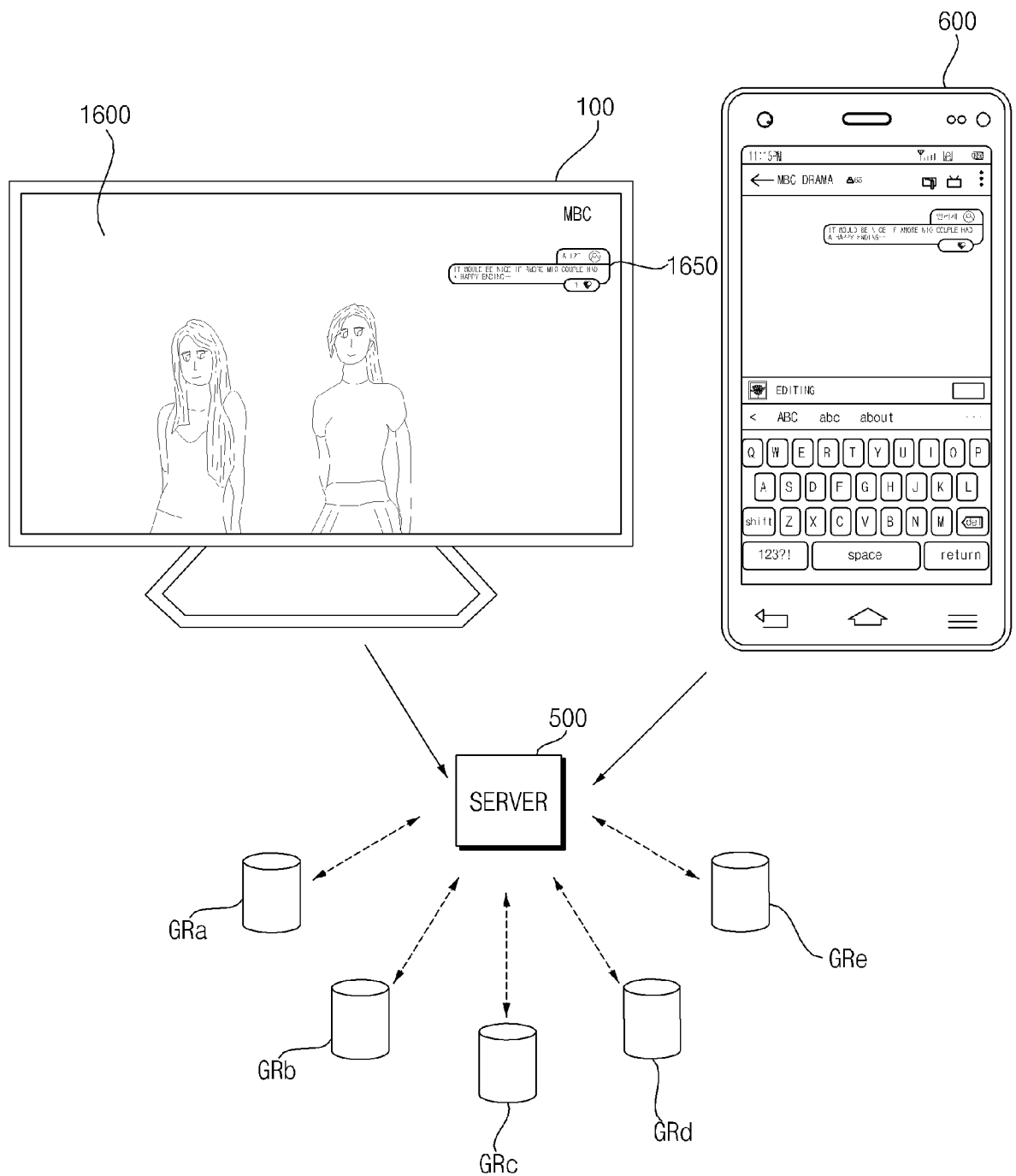

FIGS. 19A and 19B are diagrams referenced for describing the operation of the server 500 for the image display apparatus 100 and the mobile terminal 600.

Referring to FIG. 19A, when the image display apparatus 100 and the mobile terminal 600 are logged in with the same account, the server 500 can provide chatting conversation content of the same broadcast.

In this case, in order to secure visibility, a display time of the chatting conversation content 1650 displayed on the image display apparatus 100 and a display time of the chatting conversation content displayed in the mobile terminal 600 can be different.

Preferably, the display time of the chatting conversation content displayed on the mobile terminal 600 is preferably faster.

Meanwhile, a display interval of the displayed chatting conversation content 1650 can be adjusted based on the amount of the updated chatting conversation content 1650 to be displayed in the image display apparatus 100.

For example, as the amount of updated chatting conversation content 1650 to be displayed in the image display apparatus 100 increases, the display interval of the chatting conversation content 1650 can increase. Accordingly, the visibility of the chatting conversation content in the image display apparatus 100 can be improved.

FIG. 19B illustrates that a plurality of group servers GRa to GRe assess the server 500.

Referring to the drawing, in order to provide the chatting conversation content of the same broadcast, the server 500 can provide the chatting conversation content classified by region, age, gender, taste, preference, or number of recommendations using at least some of the plurality of group servers GRa to GRe.

For example, a first group server GRa among the plurality of group servers GRa to GRe can provide a chatting conversation content for each region adjacent to the image display apparatus 100.

As another example, a second group server GRb among the plurality of group servers GRa to GRe can provide a chatting conversation content centered on men in their 30s.

As another example, a third group server GRc among the plurality of group servers (GRa to GRe can provide an action-oriented chatting conversation content.

As another example, a fourth group server GRd among a plurality of group servers GRa to GRe can provide a chatting conversation content based on a number of preferences or recommendations.

Accordingly, a chatting conversation content suitable for viewers of the image display apparatus 100 can be provided.

The server 500 separates the chatting windows according to the number of image display apparatuses 100 or the number of mobile terminals 600 accessing the chatting window related to a predetermined broadcast image, and can be configured to execute a plurality of chatting windows.

Specifically, when the number of image display apparatuses 100 or mobile terminals 600 accessing a chatting window related to a predetermined broadcast image exceeds a reference value, the server 500 can create and provide a new chatting window. Accordingly, it is possible to prevent access overload of a specific chatting window.

For example, when the number of image display apparatuses 100 or mobile terminals 600 accessing a chatting window related to a predetermined broadcast image is 1999 and the reference value is set to 1000, the server 500 can be configured to access 1000 image display apparatuses or 1000 mobile terminals through the first chatting window, and access 999 image display apparatuses or 999 mobile terminals through a second chatting window.

The reference value can be changed and, for example, can be set to 667 instead of 1000.

For example, when the number of image display apparatuses 100 or mobile terminals 600 accessing the chatting window related to a predetermined broadcast image is 1999 and the reference value is set to 667, the server 500 can be configured to access 667 image display apparatuses or 667 mobile terminals through the first chatting window, and access 665 image display apparatuses or 665 mobile terminals through a third chatting window.

The server 500 can be configured to share the conversation content having a high number of preferences or recommendations in a first chatting window among the plurality of chatting windows with other chatting windows.

For example, while the image display apparatus 100 accesses the first chatting window and receives and displays the chatting conversation content from the server 500, the image display apparatus 1000 can be configured to receive, from the server 500, the conversation content for which the number of preferences or recommendations in the second chatting window is equal to or greater than the reference number, and display the conversation content at a specific location in the first chatting window at all times. Accordingly, it is possible to share the conversation content with a large number of preferences or recommendations.

The image display apparatus 100 can change the display speed of the chatting conversation content when the number of conversation content input from the outside is greater than or equal to the reference number.

For example, when the number of conversation contents input from the outside is equal to or greater than the reference number, the image display apparatus 100 can be configured to display one chatting conversation content every 3 seconds, and when the number of conversation contents is less than the reference number, the image display apparatus 100 can be configured to display one chatting conversation content every 5 seconds. Accordingly, the visibility of the conversation content can be improved.

The image display apparatus 100 can be configured to set the change in the display speed of chatting conversation content based on an on/off item on the chatting setting screen. Accordingly, it is possible to selectively change the display speed of chatting conversation content.

Although preferred embodiments of the present disclosure have been illustrated and described above, the present disclosure is not limited to the specific embodiments described above, various modifications can be made by those skilled in the art to which the invention pertains without departing from the gist of the present disclosure claimed in claims, and these modified embodiments should not be individually understood from the technical idea or perspective of the present disclosure.

What is claimed is:

1. An image display apparatus comprising:
a display configured to display an image;
an image receiver configured to receive a broadcast signal;
a signal processing device configured to output an image signal to the display based on the broadcast signal; and
an interface configured to exchange data with a mobile terminal or a server,
wherein the signal processing device is further configured to:
receive a broadcast image corresponding to a selected thumbnail from the image receiver, receive a chatting conversation content corresponding to the broadcast image from the server through the interface, and overlay the chatting conversation content on the broadcast image,
in response to receiving a conversation content based on a signal from a remote controller or the mobile terminal, display the conversation content, in response to execution of a broadcast chatting application based on a first login account in the image display apparatus and execution of the broadcast chatting application in the mobile terminal based on the first login account, synchronize the broadcast chatting application in the image display apparatus with the broadcast chatting application in the mobile terminal, and in response to receiving updated conversation content, delay a display time of the updated conversation content from a display time of the updated conversation content of the mobile terminal.

2. The image display apparatus of claim 1, wherein the signal processing device is further configured to:

synchronize the chatting conversation content from the server received through the interface with the broadcast image received from the image receiver, and overlay the chatting conversation content on the broadcast image in synchronization.

3. The image display apparatus of claim 1, wherein the signal processing device is configured to:

in response to receiving a first conversation content based on a signal from the remote controller, display the first conversation content on the display of the image display apparatus and display the first conversation content on the mobile terminal.

4. The image display apparatus of claim 3, wherein the signal processing device is configured to:

in response to receiving a second conversation in the mobile terminal, display the second conversation content on the display of the image display apparatus.

5. The image display apparatus of claim 1, wherein the signal processing device is further configured to:

in response to receiving a selection of a first channel in the mobile terminal, receive information on the first channel from the server and display a broadcast image of the first channel on the display of the image display apparatus based on the first channel information.

6. The image display apparatus of claim 5, wherein the signal processing device is further configured to:

in response to displaying the broadcast image of the first channel on the display of the image display apparatus, display a chatting conversation content of the first channel on the display of the image display apparatus.

7. The image display apparatus of claim 5, wherein the signal processing device is further configured to:

in response to receiving a selection of a second channel in the mobile terminal, receive information on the second channel from the server and display a broadcast image of the second channel on the display of the image display apparatus based on the second channel information.

8. The image display apparatus of claim 7, wherein the signal processing device is further configured to:

in response to displaying the broadcast image of the second channel on the display of the image display apparatus, display a chatting conversation content of the second channel on the display of the image display apparatus.

9. The image display apparatus of claim 1, wherein the signal processing device is configured to:

in response to receiving a selection of a product item or a music item from the chatting conversation content, display information on the product item or the music item in the mobile terminal.

10. The image display apparatus of claim 1, wherein the signal processing device is further configured to:

in response to execution of a broadcast chatting application in the image display apparatus, display a broadcast image and a plurality of broadcast channel thumbnails together on the display of the image display apparatus, and in response to receiving a selection of a chatting window object in a thumbnail of a second channel from among the plurality of broadcast channel thumbnails while displaying a broadcast image of a first channel and a chatting conversation content of the first channel, display a chatting conversation content of the second channel on a broadcast image of the first channel.

11. The image display apparatus of claim 10, wherein the plurality of broadcast channel thumbnails include a thumbnail of a broadcast channel received from a tuner and a thumbnail of a broadcast channel received from an external input terminal.

12. The image display apparatus of claim 1, wherein the signal processing device is further configured to:

display a broadcast image and a plurality of broadcast channel thumbnails together on the display of the image display apparatus, and in response to focusing on a first thumbnail among the plurality of broadcast channel thumbnails, display a chatting conversation content corresponding to the first thumbnail on a preview screen.

13. The image display apparatus of claim 1, wherein the signal processing device is further configured to:

display a broadcast image and a plurality of broadcast channel thumbnails together on the display of the image display apparatus, and in response to focusing on a first thumbnail among the plurality of broadcast channel thumbnails, display a most recommended conversation content or a most preferred conversation content among chatting conversation contents corresponding to the first thumbnail.

14. The image display apparatus of claim 1, wherein the signal processing device is further configured to:

in response to receiving the conversation content based on the signal from the remote controller or the mobile terminal, transmit the conversation content to the server, and highlight and display the conversation content in a chatting window on the display of the image display apparatus.

15. The image display apparatus of claim 1, wherein the signal processing device is further configured to:

in response to receiving a selection of a preference item or a recommendation item for a first chatting conversation content from among a plurality of chatting conversation contents displayed on the display of the image display apparatus based on the signal from the remote controller, transmit preference information or recommendation information for the first chatting conversation content to the server and display an increased number of preferences or recommendations of the first chatting conversation content on the display of the image display apparatus.

16. The image display apparatus of claim 1, wherein the signal processing device is further configured to:

in response to receiving a selection of a preference item or a recommendation item for a first chatting conversation content from among a plurality of chatting conversation contents displayed on the mobile terminal, display an increased number of preferences or recommendations of the first chatting conversation content.

17. The image display apparatus of claim 1, wherein the signal processing device is further configured to:
  synchronize timing information of the chatting conversation content from the server received through the interface with timing information of the broadcast image received from the image receiver.

18. A method of controlling an image display apparatus, the method comprising:
  exchanging, by a processor of the image display apparatus, data with a mobile terminal or a server;
  receiving, by the processor, a broadcast image corresponding to a selected thumbnail;
  receiving, by the processor, a chatting conversation content corresponding to the broadcast image from the server and displaying the chatting conversation content on a display of the image display apparatus; and
  in response to receiving an input conversation content from a user based on a signal from a remote controller or the mobile terminal, displaying the input conversation content,
  wherein in response to execution of a broadcast chatting application based on a first login account in the image display apparatus and execution of the broadcast chatting application in the mobile terminal based on the first login account, the broadcast chatting application in the image display apparatus is synchronized with the broadcast chatting application in the mobile terminal, and
  wherein in response to receiving updated conversation content, a display time of the updated conversation content is delayed from a display time of the updated conversation content of the mobile terminal.

19. The method of claim 18, further comprising:
  synchronizing, by the processor, the chatting conversation content displayed on the image display apparatus with a chatting conversation content displayed by the mobile terminal.

* * * * *